(12) United States Patent
Ando et al.

(10) Patent No.: US 7,932,334 B2
(45) Date of Patent: Apr. 26, 2011

(54) RESIN SUITABLE FOR AN ACID GENERATOR

(75) Inventors: Nobuo Ando, Toyonaka (JP); Ichiki Takemoto, Kawanishi (JP); Isao Yoshida, Ikeda (JP); Yukako Harada, Settu (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 1086 days.

(21) Appl. No.: 11/642,628

(22) Filed: Dec. 21, 2006

(65) Prior Publication Data

US 2007/0149702 A1      Jun. 28, 2007

(30) Foreign Application Priority Data

Dec. 27, 2005   (JP) ................. 2005-374255

(51) Int. Cl.
*C08F 12/30*   (2006.01)
(52) U.S. Cl. ............ 526/243; 430/270.1; 524/544; 526/287
(58) Field of Classification Search .......... 430/270.1; 524/544; 526/243, 287
See application file for complete search history.

(56) References Cited

U.S. PATENT DOCUMENTS 6,908,722 B2 * 6/2005 Ebata et al. ................ 430/270.1
2006/0042949 A1 * 3/2006 McCollum et al. ........... 204/471

FOREIGN PATENT DOCUMENTS

JP   2002-091002 A   *   3/2002

OTHER PUBLICATIONS

Ito, Hiroshi, Journal of Photopolymer Science and Technology, vol. 11, No. 3, pp. 379-394, (1998).
Stewart et al., Journal of Vacuum Science Technology B, vol. 20, No. 6, pp. 2946-2952, Nov./Dec. 2002.
Wu et al., Advanced Materials, vol. 13, No. 9, pp. 670-672, (May 3, 2001).

* cited by examiner

*Primary Examiner* — David Wu
*Assistant Examiner* — Marie Reddick
(74) *Attorney, Agent, or Firm* — Birch, Stewart, Kolasch & Birch, LLP

(57) ABSTRACT

The present invention provides a resin which generates an acid by irradiation and is a salt of an organic cation and an anionic polymer wherein the anionic polymer has no carbon-carbon unsaturated bond. The present invention further provides a chemically amplified resist composition comprising the same.

7 Claims, No Drawings

US 7,932,334 B2

RESIN SUITABLE FOR AN ACID GENERATOR

This nonprovisional application claims priority under 35 U.S.C. §119(a) on Patent Application No. 2005-374255 filed in JAPAN on Dec. 27, 2005, the entire contents of which are hereby incorporated by reference.

FIELD OF THE INVENTION

The present invention relates to a resin used for a chemically amplified positive resist composition, and a chemically amplified positive resist composition containing the same.

BACKGROUND OF THE INVENTION

A chemically amplified positive resist composition is used for semiconductor microfabrication. As the chemically amplified positive resist composition, a chemically amplified positive resist composition comprising a resin which contains a structural unit having an acid-labile group and which itself is insoluble or poorly soluble in an alkali aqueous solution but becomes soluble in an alkali aqueous solution by the action of an acid and an acid generator comprising a compound which is not a polymer and which generates an acid by irradiation has been used (e.g. J. Photopolym. Sci. Technol., 11, 1998, 379).

In semiconductor microfabrication, it is desirable to form patterns having high resolution, and especially, in ArF excimer laser lithography process, extreme ultraviolet (EUV) lithography process and electron lithography process, it is desirable to give patterns having higher resolution, and it is expected for a chemically amplified resist composition to give such patterns. In liquid immersion lithography process, the cation and anion components derived from the acid generator usually elute in water or a solvent having a high refractive index and it is expected for suppressing the elution of the cation and anion components.

SUMMARY OF THE INVENTION

An object of the present invention is to provide a novel resin used as an acid generator in a chemically amplified resist composition.

Another object of the present invention is to provide a chemically amplified resist composition suitable for ArF excimer laser lithography, extreme ultraviolet (EUV) lithography and electron lithography, showing excellent various resist abilities, and giving good pattern profile and line edge roughness.

Still another object of the present invention are to provide a novel optionally substituted acrylic compound useful as a monomer of the resin above.

Yet another object of the present invention is to provide a production method for the optionally substituted acrylic compound above.

These and other objects of the present invention will be apparent from the following description.

The present invention relates to the followings:
<1> A resin which generates an acid by irradiation and is a salt of an organic cation and an anionic polymer wherein the anionic polymer has no carbon-carbon unsaturated bond.
<2> The resin according to <1>, wherein the anionic polymer comprises a structural unit derived from an optionally substituted acrylic compound having an anionic group or a structural unit derived from an alicyclic compound having an anionic group.
<3> The resin according to <2>, wherein the structural unit derived from the optionally substituted acrylic compound having the anionic group is a structural unit represented by the formula (Ia):

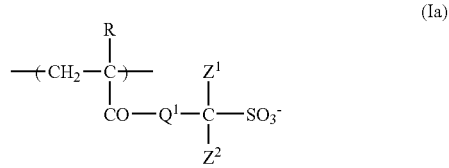

wherein R represents a hydrogen atom, a C1-C4 alkyl group or a C1-C4 perfluoroalkyl group, $Q^1$ represents a divalent connecting group having no carbon-carbon unsaturated bond, and $Z^1$ and $Z^2$ are the same or different and each independently represent a fluorine atom or a C1-C4 perfluoroalkyl group, and
the structural unit derived from the alicyclic compound having the anionic group is a structural unit represented by the formula (Ib):

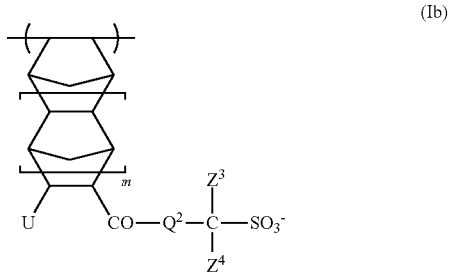

wherein $Q^2$ represents a divalent connecting group having no carbon-carbon unsaturated bond, $Z^3$ and $Z^4$ are the same or different and each independently represent a fluorine atom or a C1-C4 perfluoroalkyl group, U represents a hydrogen atom, a C1-C4 alkyl group, a monovalent polar group having at least one atom selected from a oxygen atom and a nitrogen atom and no carbon-carbon unsaturated bond, and m represents 0, 1 or 2.
<4> The resin according to <2>, wherein the structural unit derived from the optionally substituted acrylic compound having the anionic group is a structural unit represented by the formula (IIIa):

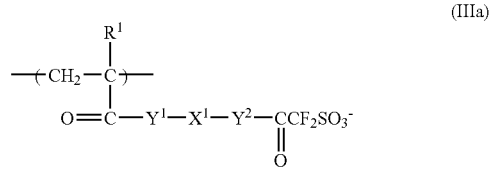

wherein $R^1$ represents a hydrogen atom, a methyl group or a trifluoromethyl group, $X^1$ represents a C1-C20 alkylene group in which at least one —$CH_2$— other than terminal —$CH_2$— may be replaced with a divalent saturated cyclic group, —CO—, —O—, —S—, and —$NR^{11}$— in which $R^{11}$ represents a hydrogen atom or a C1-C6 alkyl group, and $Y^1$ and $Y^2$ each independently represent —O—, —S— or —$NR^{12}$— in which $R^{12}$ represents a hydrogen atom or a C1-C6 alkyl group.
<5> The resin according to any one of <2> to <4>, wherein the anionic polymer comprises a structural unit having at least one selected from an acid-labile group, a lactone ring and a hydroxyl group and no carbon-carbon unsaturated bond, in addition to the structural unit derived from an optionally substituted acrylate having an anionic group or a structural unit derived from an alicyclic compound having an anionic group.

<6> The resin according to <2> to <4>, wherein the anionic polymer comprises a structural unit having an acid-labile group, in addition to the structural unit derived from an optionally substituted acrylate having an anionic group or a structural unit derived from an alicyclic compound having an anionic group, and the resin is insoluble or poor soluble in an alkali aqueous solution but becomes soluble in an alkali aqueous solution by the action of an acid generated by irradiation to the resin.

<7> The resin according to any one of <1> to <4>, wherein the organic cation is a cation represented by the formula (IIa):

wherein $P^1$, $P^2$ and $P^3$ each independently represent a C1-C20 alkyl group which is optionally substituted with at least one selected from a hydroxyl group and a C1-C12 alkoxy group, or a C3-C30 cyclic hydrocarbon group which is optionally substituted with at least one selected from a hydroxyl group and a C1-C12 alkoxy group, a cation represented by the formula (IIb):

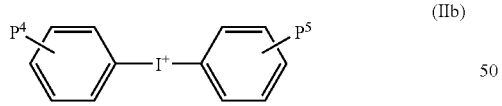

wherein $P^4$ and $P^5$ each independently represent a hydrogen atom, a hydroxyl group, a C1-C12 alkyl group or a C1-C12 alkoxy group, a cation represented by the formula (IIc):

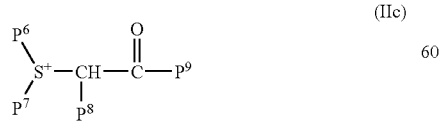

wherein $P^6$ and $P^7$ each independently represent a C1-C12 alkyl group or a C3-C12 cycloalkyl group, or $P^6$ and $P^7$ bond to form a C3-C12 divalent hydrocarbon group which forms a ring together with the adjacent $S^+$, and at least one —$CH_2$— in the divalent hydrocarbon group is optionally replaced with —CO—, —O— or —S—, $P^8$ represents a hydrogen atom, $P^9$ represents a C1-C12 alkyl group, a C3-C12 cycloalkyl group or an aromatic group optionally substituted, or $P^8$ and $P^9$ bond to form a divalent hydrocarbon group which forms a 2-oxocycloalkyl group together with the adjacent —CHCO—, and at least one —$CH_2$— in the divalent hydrocarbon group is optionally replaced with —CO—, —O— or —S—, or a cation represented by the formula (IId):

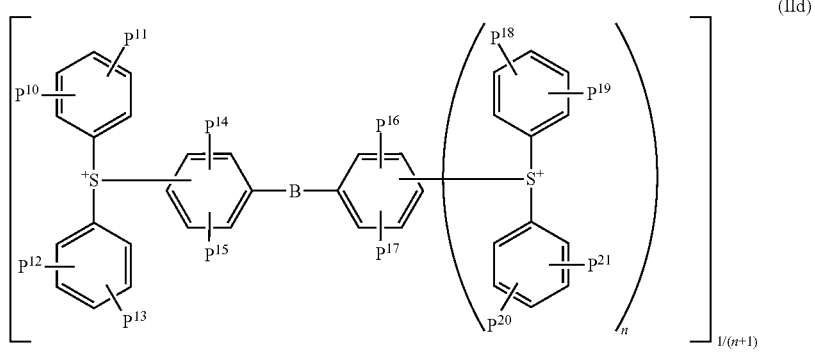

wherein $P^{10}$ $P^{11}$ $P^{12}$ $P^{13}$ $P^{14}$ $P^{15}$ $P^{16}$ $P^{17}$ $P^{18}$ $P^{19}$ $P^{20}$ and $P^{21}$ each independently represent a hydrogen atom, a hydroxyl group, a C1-C12 alkyl group or a C1-C12 alkoxy group, B represents a sulfur or oxygen atom and n represents 0 or 1.

<8> The resin according to <7>, wherein the cation represented by the formula (IIa) is a cation of the formula (IIf), (IIg) or (IIh):

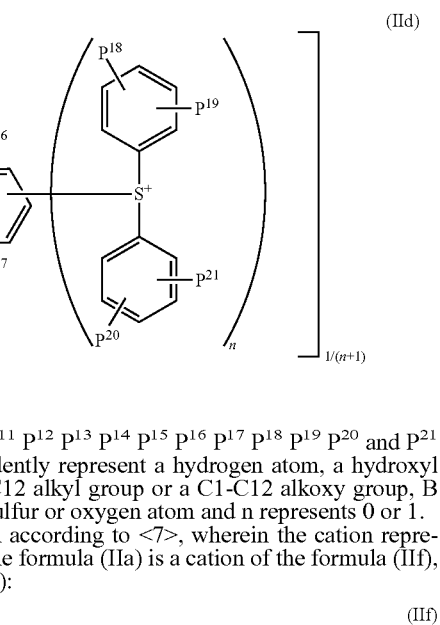

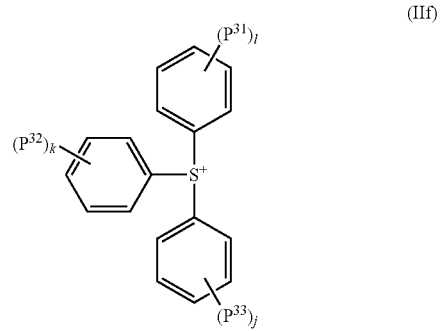

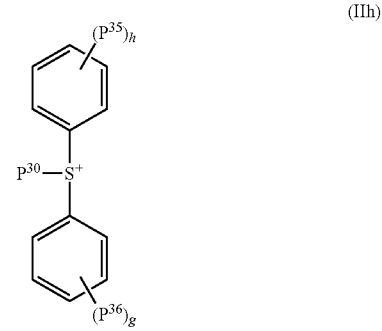

wherein P²⁸, P²⁹ and P³⁰ each independently represent a C1-C20 alkyl group which is optionally substituted with at least one selected from a hydroxyl group and a C1-C12 alkoxy group, or a C3-C30 cyclic hydrocarbon group except a phenyl group which is optionally substituted with at least one selected from a hydroxyl group and a C1-C12 alkoxy group; and P³¹, P³² P³³, P³⁴, P³⁵ and P³⁶ each independently represent a hydroxyl group, a C1-C12 alkyl group, a C1-C12 alkoxy group or a C3-C12 cyclic hydrocarbon group; and l, k, j, i, h and g each independently represent an integer of 0 to 5.

<9> The resin according to <7>, wherein the cation represented by the formula (IIa) is a cation of the formula (IIi):

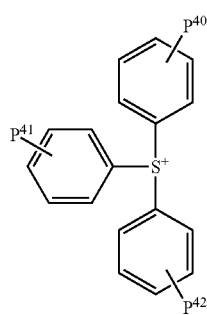

(IIi)

wherein P⁴⁰, P⁴¹ and P⁴² each independently represent a hydrogen atom, a hydroxyl group, a C1-C12 alkyl group or a C1-C12 alkoxy group.

<10> The resin according to <9>, wherein the cation represented by the formula (IIi) is a cation of the formula (IIj):

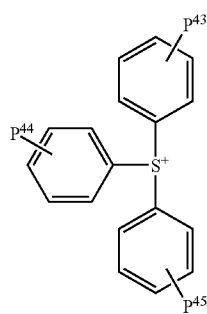

(IIj)

wherein P⁴³, P⁴⁴ and P⁴⁵ each independently represent a hydrogen atom or a C1-C4 alkyl group.

<11> An optionally substituted acrylic compound represented by the formula (IV):

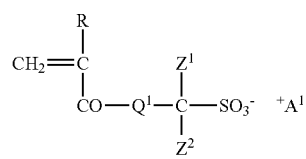

(IV)

wherein R represents a hydrogen atom, a C1-C4 alkyl group or a C1-C4 perfluoroalkyl group, Q¹ represents a divalent connecting group having no carbon-carbon unsaturated bond, Z¹ and Z² are the same or different and each independently represent a fluorine atom or a C1-C4 perfluoroalkyl group and ⁺A¹ represents an organic cation.

<12> The optionally substituted acrylic compound according to <11>, wherein the optionally substituted acrylic compound represented by the formula (IV) is an optionally substituted acrylic compound represented by the formula (Va):

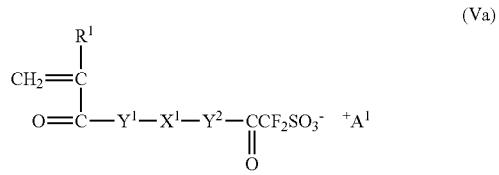

(Va)

wherein R¹ represents a hydrogen atom, a methyl group or a trifluoromethyl group, X¹ represents a C1-C20 alkylene group in which at least one —CH₂— other than terminal —CH₂— may be replaced with a divalent saturated cyclic group, —CO—, —O—, —S—, and —NR¹¹— in which R¹¹ represents a hydrogen atom or a C1-C6 alkyl group, and Y¹ and Y² each independently represent —O—, —S— or —NR¹²— in which R¹² represents a hydrogen atom or a C1-C6 alkyl group, and ⁺A¹ represents an organic cation.

<13> The optionally substituted acrylic compound according to <11> or <12>, wherein the organic cation is a cation represented by the formula (IIa):

(IIa)

wherein P¹, P² and P³ each independently represent a C1-C20 alkyl group which is optionally substituted with at least one selected from a hydroxyl group and a C1-C12 alkoxy group, or a C3-C30 cyclic hydrocarbon group which is optionally substituted with at least one selected from a hydroxyl group and a C1-C12 alkoxy group, a cation represented by the formula (IIb):

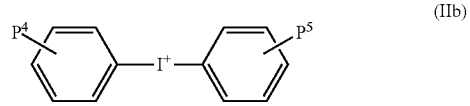

(IIb)

wherein P⁴ and P⁵ each independently represent a hydrogen atom, a hydroxyl group, a C1-C12 alkyl group or a C1-C12 alkoxy group, a cation represented by the formula (IIc):

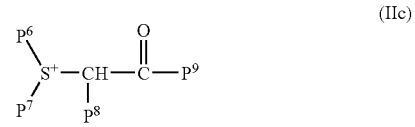

(IIc)

wherein P⁶ and P⁷ each independently represent a C1-C12 alkyl group or a C3-C12 cycloalkyl group, or P⁶ and P⁷ bond to form a C3-C12 divalent hydrocarbon group which forms a ring together with the adjacent S⁺, and at least one —CH$_2$—
in the divalent hydrocarbon group is optionally replaced with
—CO—, —O— or —S—, P$^8$ represents a hydrogen atom, P$^9$ represents a C1-C12 alkyl
group, a C3-C12 cycloalkyl group or an aromatic group
optionally substituted, or P$^8$ and P$^9$ bond to form a divalent
hydrocarbon group which forms a 2-oxocycloalkyl group
together with the adjacent —CHCO—, and at least one
—CH$_2$— in the divalent hydrocarbon group is optionally
replaced with —CO—, —O— or —S—,
or a cation represented by the formula (IId):

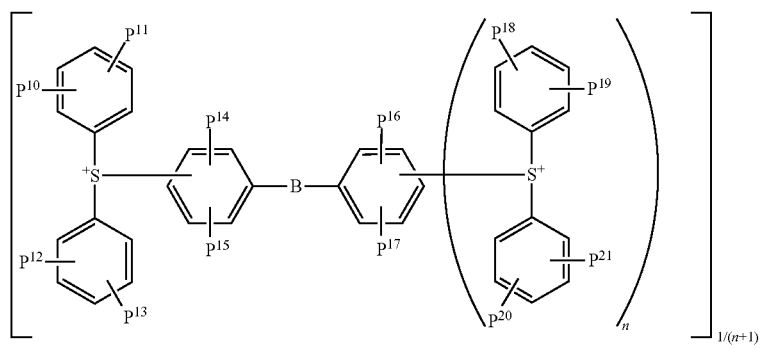

wherein P$^{10}$ P$^{11}$ P$^{12}$ P$^{13}$ P$^{14}$ P$^{15}$ P$^{16}$ P$^{17}$ P$^{18}$ P$^{19}$ P$^{20}$ and P$^{21}$
each independently represent a hydrogen atom, a hydroxyl
group, a C1-C12 alkyl group or a C1-C12 alkoxy group, B
represents a sulfur or oxygen atom and n represents 0 or 1.

<14> A chemically amplified positive resist composition
comprising a resin which generates an acid by irradiation
and is a salt of an organic cation and an anionic polymer
wherein the anionic polymer has no carbon-carbon unsaturated bond, and a resin which contains a structural unit which has an acid-labile group and which itself is insoluble or poorly soluble
in an alkali aqueous solution but becomes soluble in an
alkali aqueous solution by the action of an acid.

<15> The chemically amplified positive resist composition
according to <14>, wherein the anionic polymer comprises
a structural unit derived from an optionally substituted
acrylic compound having an anionic group or a structural
unit derived from an alicyclic compound having an anionic
group.

<16> A chemically amplified positive resist composition
comprising a resin which generates an acid by irradiation,
which is insoluble or poor soluble in an alkali aqueous
solution but becomes soluble in an alkali aqueous solution
by the action of an acid generated by irradiation to the resin,
and which is a salt of an organic cation and an anionic
polymer wherein the anionic polymer has no carbon-carbon unsaturated bond and comprises a structural unit
derived from an optionally substituted acrylic compound
having an anionic group or a structural unit derived from an
alicyclic compound having an anionic group and a structural unit having an acid-labile group.

<17> The chemically amplified positive resist composition
according to <15> or <16>, wherein the structural unit
derived from the optionally substituted acrylic compound
having the anionic group is a structural unit represented by
the formula (Ia):

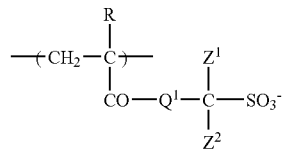

wherein R represents a hydrogen atom, a C1-C4 alkyl group
or a C1-C4 perfluoroalkyl group, Q$^1$ represents a divalent
connecting group having no carbon-carbon unsaturated bond,
and Z$^1$ and Z$^2$ are the same or different and each independently represent a fluorine atom or a C1-C4 perfluoroalkyl
group, and the structural unit derived from the alicyclic compound having the anionic group is a structural unit represented by the
formula (Ib):

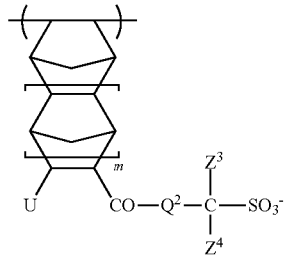

wherein Q$^2$ represents a divalent connecting group having no
carbon-carbon unsaturated bond, Z$^3$ and Z$^4$ are the same or
different and each independently represent a fluorine atom or
a C1-C4 perfluoroalkyl group, U represents a hydrogen atom,
a C1-C4 alkyl group, a monovalent polar group having at least
one atom selected from a oxygen atom and a nitrogen atom
and no carbon-carbon unsaturated bond, and m represents 0,
1 or 2.

<18> The chemically amplified positive resist composition
according to <15> or <16>, wherein the structural unit
derived from the optionally substituted acrylic compound
having the anionic group is a structural unit represented by
the formula (IIIa):

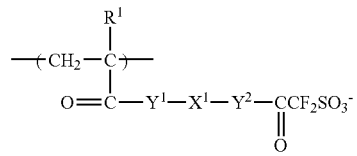

wherein $R^1$ represents a hydrogen atom, a methyl group or a trifluoromethyl group, $X^1$ represents a C1-C20 alkylene group in which at least one —$CH_2$— other than terminal —$CH_2$— may be replaced with a divalent saturated cyclic group, —CO—, —O—, —S—, and —$NR^{11}$— in which $R^{11}$ represents a hydrogen atom or a C1-C6 alkyl group, and $Y^1$ and $Y^2$ each independently represent —O—, —S— or —$NR^{12}$— in which $R^{12}$ represents a hydrogen atom or a C1-C6 alkyl group.

<19> The chemically amplified positive resist composition according to <15> or <16>, wherein the anionic polymer comprises a structural unit having at least one selected from an acid-labile group, a lactone ring and a hydroxyl group and no carbon-carbon unsaturated bond, in addition to the structural unit derived from an optionally substituted acrylate having an anionic group or a structural unit derived from an alicyclic compound having an anionic group.

<20> The chemically amplified positive resist composition according to <14>, the resin contains a structural unit having at least one selected from a lactone ring and a hydroxyl group and no carbon-carbon unsaturated bond, in addition to the structural unit which has an acid-labile group.

<21> The chemically amplified positive resist composition according to <15> or <16>, wherein the composition further comprises an organic base compound.

<22> The chemically amplified positive resist composition according to <15> or <16>, wherein the composition further comprises an acid generator.

<23> The chemically amplified positive resist composition according to <15> or <16>, wherein the composition further comprises an organic base compound and an acid generator.

<24> The chemically amplified positive resist composition according to <15> or <16>, wherein the organic cation is a cation represented by the formula (IIa):

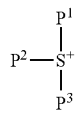

(IIa)

wherein $P^1$, $P^2$ and $P^3$ each independently represent a C1-C20 alkyl group which is optionally substituted with at least one selected from a hydroxyl group and a C1-C12 alkoxy group, or a C3-C30 cyclic hydrocarbon group which is optionally substituted with at least one selected from a hydroxyl group and a C1-C12 alkoxy group, a cation represented by the formula (IIb):

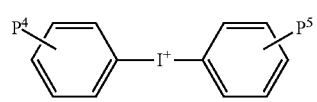

(IIb)

wherein $P^4$ and $P^5$ each independently represent a hydrogen atom, a hydroxyl group, a C1-C12 alkyl group or a C1-C12 alkoxy group, a cation represented by the formula (IIc):

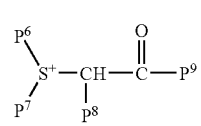

(IIc)

wherein $P^6$ and $P^7$ each independently represent a C1-C12 alkyl group or a C3-C12 cycloalkyl group, or $P^6$ and $P^7$ bond to form a C3-C12 divalent hydrocarbon group which forms a ring together with the adjacent $S^+$, and at least one —$CH_2$— in the divalent hydrocarbon group is optionally replaced with —CO—, —O— or —S—, $P^8$ represents a hydrogen atom, $P^9$ represents a C1-C12 alkyl group, a C3-C12 cycloalkyl group or an aromatic group optionally substituted, or $P^8$ and $P^9$ bond to form a divalent hydrocarbon group which forms a 2-oxocycloalkyl group together with the adjacent —CHCO—, and at least one —$CH_2$— in the divalent hydrocarbon group is optionally replaced with —CO—, —O— or —S—, or a cation represented by the formula (IId):

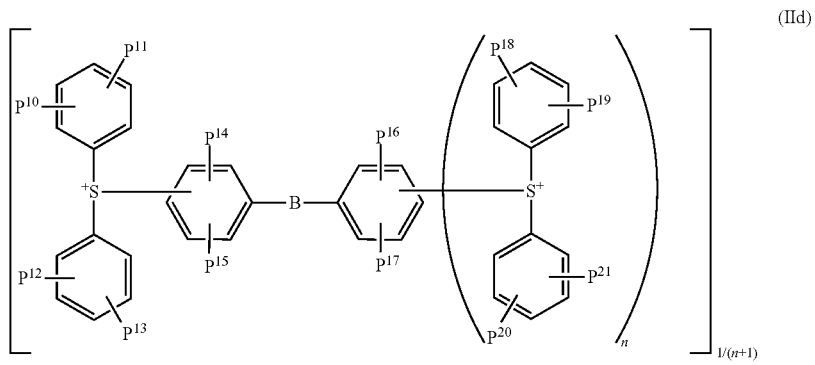

(IId)

wherein $P^{10}$ $P^{11}$ $P^{12}$ $P^{13}$ $P^{14}$ $P^{15}$ $P^{16}$ $P^{17}$ $P^{18}$ $P^{19}$ $P^{20}$ and $P^{21}$ each independently represent a hydrogen atom, a hydroxyl group, a C1-C12 alkyl group or a C1-C12 alkoxy group, B represents a sulfur or oxygen atom and n represents 0 or 1.

<25> The chemically amplified positive resist composition according to <24>, wherein the cation represented by the formula (IIa) is a cation of the formula (IIf), (IIg) or (IIh):

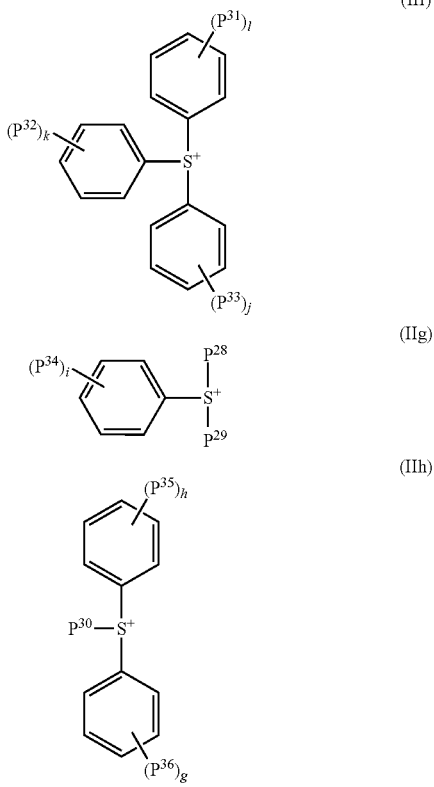

wherein $P^{28}$, $P^{29}$ and $P^{30}$ each independently represent a C1-C20 alkyl group which is optionally substituted with at least one selected from a hydroxyl group and a C1-C12 alkoxy group, or a C3-C30 cyclic hydrocarbon group except a phenyl group which is optionally substituted with at least one selected from a hydroxyl group and a C1-C12 alkoxy group; and $P^{31}$, $P^{32}$ $P^{33}$, $P^{34}$, $P^{35}$ and $P^{36}$ each independently represent a hydroxyl group, a C1-C12 alkyl group, a C1-C12 alkoxy group or a C3-C12 cyclic hydrocarbon group; and l, k, j, i, h and g each independently represent an integer of 0 to 5.

<26> The chemically amplified positive resist composition according to <24>, wherein the cation represented by the formula (IIa) is a cation of the formula (IIi):

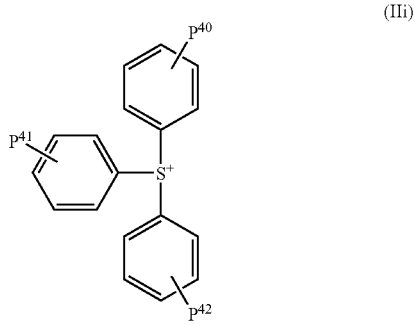

wherein $P^{40}$, $P^{41}$ and $P^{42}$ each independently represent a hydrogen atom, a hydroxyl group, a C1-C12 alkyl group or a C1-C12 alkoxy group.

<27> The chemically amplified positive resist composition according to <26>, wherein the cation represented by the formula (IIi) is a cation of the formula (IIj):

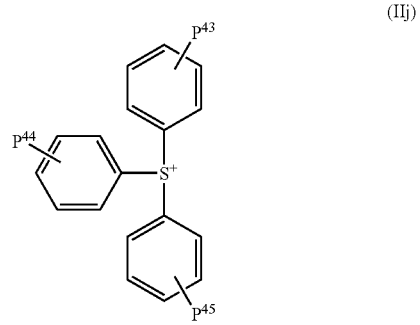

wherein $P^{43}$, $P^{44}$ and $P^{45}$ each independently represent a hydrogen atom or a C1-C4 alkyl group.

<28> A method for producing a resin which generates an acid by irradiation and is a salt of an organic cation and an anionic polymer wherein the anionic polymer has no carbon-carbon unsaturated bond and comprises a structural unit represented by the formula (Ia):

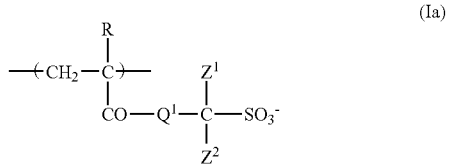

wherein R represents a hydrogen atom, a C1-C4 alkyl group or a C1-C4 perfluoroalkyl group, $Q^1$ represents a divalent connecting group having no carbon-carbon unsaturated bond, and $Z^1$ and $Z^2$ are the same or different and each independently represent a fluorine atom or a C1-C4 perfluoroalkyl group, which comprises polymerizing an optionally substituted acrylic compound represented by the formula (IVa):

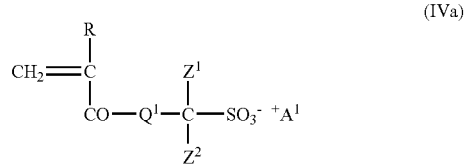

wherein R, $Q^1$, $Z^1$ and $Z^2$ are the same as defined above, and $^+A^1$ represents an organic cation, or a composition including the optionally substituted acrylic compound represented by the formula (IVa).

<29> A method for producing a resin which generates an acid by irradiation and is a salt of an organic cation and an anionic polymer wherein the anionic polymer has no carbon-carbon unsaturated bond and comprises a structural unit represented by the formula (IIIa):

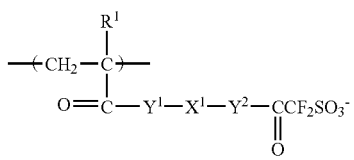

(IIIa)

wherein $R^1$ represents a hydrogen atom, a methyl group or a trifluoromethyl group, $X^1$ represents a C1-C20 alkylene group in which at least one —$CH_2$— other than terminal —$CH_2$— may be replaced with a divalent saturated cyclic group, —CO—, —O—, —S—, and —$NR^{11}$— in which $R^{11}$ represents a hydrogen atom or a C1-C6 alkyl group, and $Y^1$ and $Y^2$ each independently represent —O—, —S— or —$NR^{12}$— in which $R^{12}$ represents a hydrogen atom or an alkyl group having 1 to 6 carbon atoms, which comprises polymerizing an optionally substituted acrylic compound represented by the formula (Va):

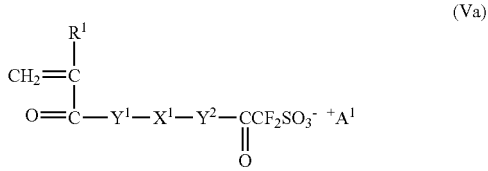

(Va)

wherein $R^1$, $X^1$, $Y^1$, and $Y^2$ are the same as defined above, and $^+A^1$ represents an organic cation, or a composition including the optionally substituted acrylic compound represented by the formula (Va).

<30> A method for producing the optionally substituted acrylic compound represented by the formula (Va):

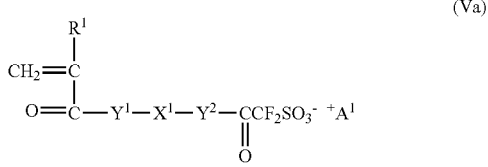

(Va)

wherein $R^1$ represents a hydrogen atom, a methyl group or a trifluoromethyl group, $X^1$ represents a C1-C20 alkylene group in which at least one —$CH_2$— other than terminal —$CH_2$— may be replaced with a divalent saturated cyclic group, —CO—, —O—, —S—, and —$NR^{11}$— in which $R^{11}$ represents a hydrogen atom or a C1-C6 alkyl group, and $Y^1$ and $Y^2$ each independently represent —O—, —S— or —$NR^{12}$— in which $R^{12}$ represents a hydrogen atom or an alkyl group having 1 to 6 carbon atoms, and $^+A^1$ represents an organic cation, which comprises reacting a compound represented by the formula (VIa):

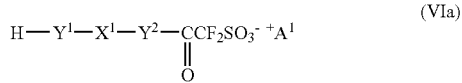

(VIa)

wherein $X^1$, $Y^1$, $Y^2$ and $^+A^1$ are the same as defined above, with a compound represented by the formula (VII):

(VII)

wherein $R^1$ is the same as defined above and $X^3$ represents a halogen atom.

DESCRIPTION OF PREFERRED EMBODIMENTS

First, the present resin will be illustrated.

The present resin is a resin generating an acid by irradiation and is a salt of an organic cation and an anionic polymer wherein the anionic polymer has no carbon-carbon unsaturated bond.

The present resin generates an acid by irradiation and acts as an acid generator.

In the present specification, "an anionic polymer" means a negatively charged polymer. The anionic polymer has no carbon-carbon unsaturated bond and has at least one anionic group. Examples of the anionic group include —$SO_3^-$.

The anionic polymer preferably comprises a structural unit derived from an optionally substituted acrylic compound having an anionic group or a structural unit derived from an alicyclic compound having a carbon-carbon double bond and an anionic group.

In the present specification, "an optionally substituted acrylic compound" means an acrylate, an acrylate of which α-carbon is substituted with a substituent, a N-substituted acrylamide and a N-substituted acrylamide of which α-carbon is substituted with a substituent. Examples of the substituent include a C1-C4 alkyl group and a C1-C4 perfluoroalkyl group.

Examples of the optionally substituted acrylic compound include an acrylayte, a methacylate, a 2-ethylpropenoate, a 2-n-propylpropenoate, a 2-n-butylpropenoate, a 2-trifluoromethylpropenoate, a 2-pentafluoroethylpropenoate, a 2-heptafluoropropylpropenoate, a 2-nonafluorobutylpropenoate, a N-substituted acrylamide, a N-substituted methacrylamide, a N-substituted 2-ethylpropenamide, a N-substituted 2-n-propylpropenamide, a N-substituted 2-n-butylpropenamide, a N-substituted 2-trifluoromethylpropenamide, a N-substituted 2-pentafluoroethylpropenamide, a N-substituted 2-heptafluoropropylpropenamide and a N-substituted 2-nonafluorobutylpropenamide.

The alicyclic compound has a carbon-carbon double bond and an anionic group. The alicyclic compound may be a monocyclic compound and a polycyclic compound. Examples of the alicyclic compound include a compound having a norbornene skelton.

The structural unit derived from an optionally substituted acrylic compound having an anionic group is preferable and the structural unit derived from an optionally substituted acrylate having an anionic group is more preferable.

Examples of the preferred structural unit include a structural unit represented by the formula (Ia):

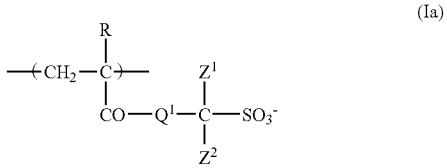

(Ia)

wherein R represents a hydrogen atom, a C1-C4 alkyl group or a C1-C4 perfluoroalkyl group, $Q^1$ represents a divalent connecting group which has no carbon-carbon unsaturated bond, and $Z^1$ and $Z^2$ are the same or different and each independently represent a fluorine atom or a C1-C4 perfluoroalkyl group, and a structural unit represented by the formula (Ib):

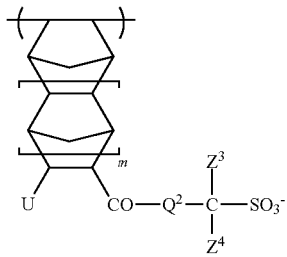
(Ib)

wherein $Q^2$ represents a divalent connecting group which has no carbon-carbon unsaturated bond, $Z^3$ and $Z^4$ are the same or different and each independently represent a fluorine atom or a C1-C4 perfluoroalkyl group, U represents a hydrogen atom, a C1-C4 alkyl group, a monovalent polar group having at least one atom selected from a oxygen atom and a nitrogen atom and no carbon-carbon unsaturated bond, and m represents 0, 1 or 2.

The structural unit represented by the formula (Ia) is more preferable.

Examples of the C1-C4 alkyl group include a methyl, ethyl, n-propyl, isopropyl, n-butyl, isobutyl, sec-butyl and tert-butyl group, and the methyl group is preferable.

Examples of the C1-C4 perfluoroalkyl group include a trifluoromethyl, pentafluoroethyl, heptafluoropropyl and nonafluorobutyl group, and the trifluoromethyl group is preferable.

In the structural unit represented by the formula (Ia), R preferably represents the hydrogen atom or the methyl group.

The divalent connecting group may be a divalent group capable of connecting —CO— with

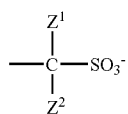

and capable of connecting —CO— with

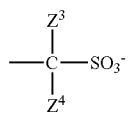

and having no carbon-carbon unsaturated bond.

Examples of the divalent connecting group include a C1-C20 alkylene group and a C1-C20 alkylene group which has at least one selected from a divalent saturated cyclic group, a heteroatom and a group containing at least one heteroatom.

Examples of the C1-C20 alkylene group include a methylene, ethylene, trimethylene, tetramethylene, pentamethylene, hexamethylene, heptamethylene, octamethylene, decamethylene and dodecamethylene group.

Examples of the divalent saturated cyclic group include the followings:

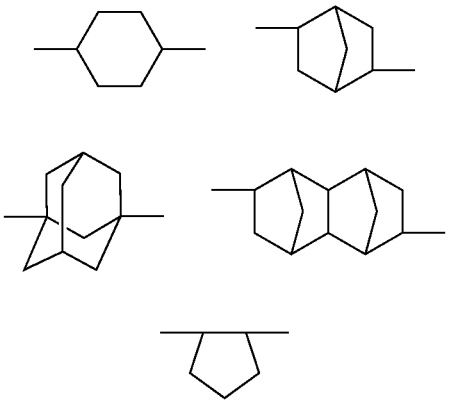

In the formulae above, straight line with an open end shows a bond which is extended from an adjacent group.

Examples of the heteroatom include a oxygen atom and a sulfur atom. Examples of the group containing at least one heteroatom include —CO— and an imino group which is optionally substituted with a C1-C6 alkyl group, and examples of the C1-C6 alkyl group include a methyl, ethyl, n-propyl, isopropyl, n-butyl, isobutyl, sec-butyl, tert-butyl, n-pentyl and n-hexyl group. Examples of the imino group which is optionally substituted with a C1-C6 alkyl group include an imino, methylimino, ethylimino, n-propylimino, isopropylimino, n-butylimino, isobutylimino, sec-butylimino, tert-butylimino, n-pentylimino and n-hexylimino group.

$R^1$ preferably represents the hydrogen atom or the methyl group.

Preferred examples of $Q^1$ and $Q^2$ include the C1-C20 alkylene group and the C1-C20 alkylene group which has at least one selected from a divalent saturated cyclic group, —CO—, —O— and —NH—.

$Z^1$ and $Z^2$ are preferably the same, and they represent preferably fluorine atoms. $Z^3$ and $Z^4$ are preferably the same, and they represent preferably fluorine atoms.

In the structural unit represented by the formula (Ia), a structural unit represented by the formula (IIIa):

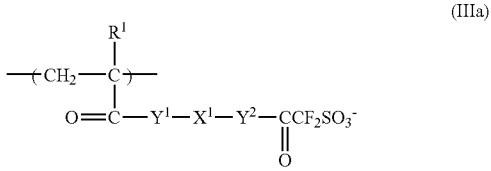
(IIIa)

wherein $R^1$ represents a hydrogen atom, a methyl group or a trifluoromethyl group, $X^1$ represents a C1-C20 alkylene group in which at least one —CH$_2$— other than terminal —CH$_2$— may be replaced with a divalent saturated cyclic group, —CO—, —O—, —S—, and —NR$^{11}$— in which R$^{11}$ represents a hydrogen atom or a C1-C6 alkyl group, and $Y^1$ and $Y^2$ each independently represent —O—, —S— or —NR$^{12}$— in which R$^{12}$ represents a hydrogen atom or a C1-C6 alkyl group, is preferable.

In the structural unit represented by the formula (Ib), a structural unit represented by the formula (IIIb):

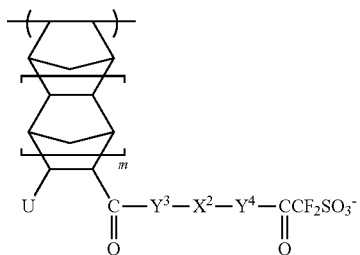
(IIIb)

wherein $X^2$ represents a C1-C20 alkylene group in which at least one —$CH_2$— other than terminal —$CH_2$— may be replaced with a divalent saturated cyclic group, —CO—, —O—, —S—, and —$NR^{13}$— in which $R^{13}$ represents a hydrogen atom or a C1-C6 alkyl group, $Y^3$ and $Y^4$ each independently represent —O—, —S— or —$NR^{14}$— in which $R^{14}$ represents a hydrogen atom or a C1-C6 alkyl group, and U and m are the same as defined above, is preferable.

In the structural unit represented by the formula (IIIa), $Y^1$ and $Y^2$ preferably represent —O— or —NH—. In the structural unit represented by the formula (IIIb), $Y^3$ and $Y^4$ preferably represent —O— or —NH—.

Preferred examples of $X^1$ and $X^2$ include the followings:

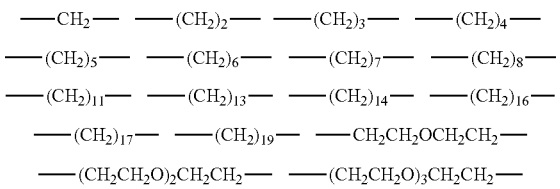

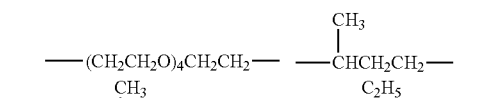

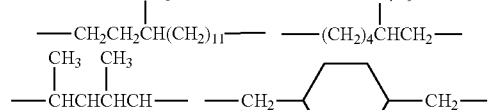

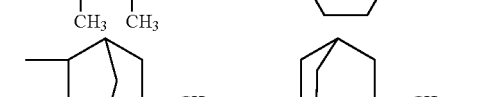

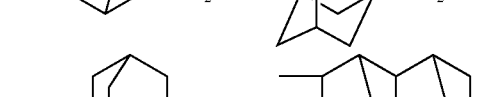

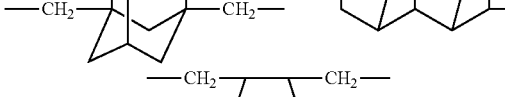

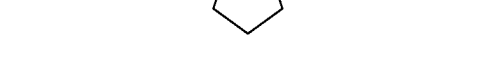

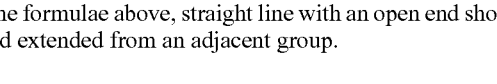

In the formulae above, straight line with an open end shows a bond extended from an adjacent group.

U is preferably a hydrogen atom; a C1-C4 alkyl group such as a methyl, ethyl, n-propyl, isopropyl, n-butyl, isobutyl, sec-butyl, and tert-butyl group; a hydroxyl group; a carboxyl group; a C1-C4 hydroxylalkyl group such as a hydroxymethyl and hydroxyethyl group; a C1-C4 alkoxy group such as a methoxy, ethoxy, n-propoxy, n-butoxy, and tert-butoxy group; a cyano group; a cyanomethyl group; or a C2-C5 alkoxycarbonyl group such as a methoxycarbonyl, ethoxycarbonyl, n-propoxycarbonyl, n-butoxycarbonyl, and tert-butoxycarbonyl group. U represents more preferably the hydrogen atom and the C2-C5 alkoxycarbonyl group.

Preferred examples of m include 0 and 1.

Among structural units represented by the formulae (IIIa) and (IIIb), the structural unit represented by the formula (IIIa) is preferable and the structural unit represented by the formula (IIIa) wherein $Y^1$ represents —O— is more preferable.

Specific examples of the structural unit include the followings:

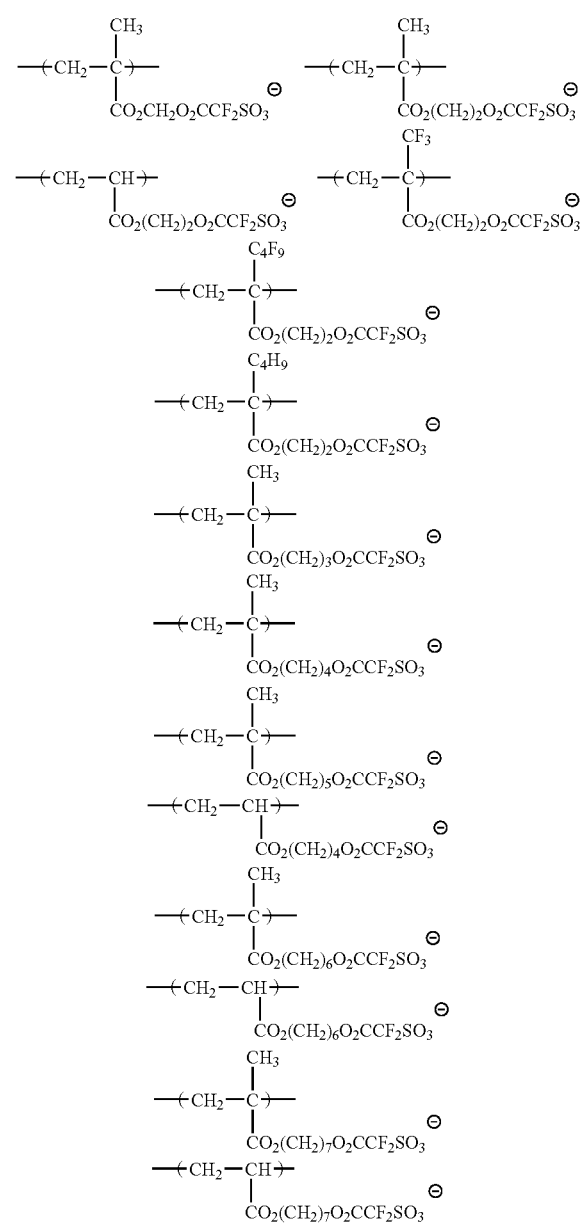

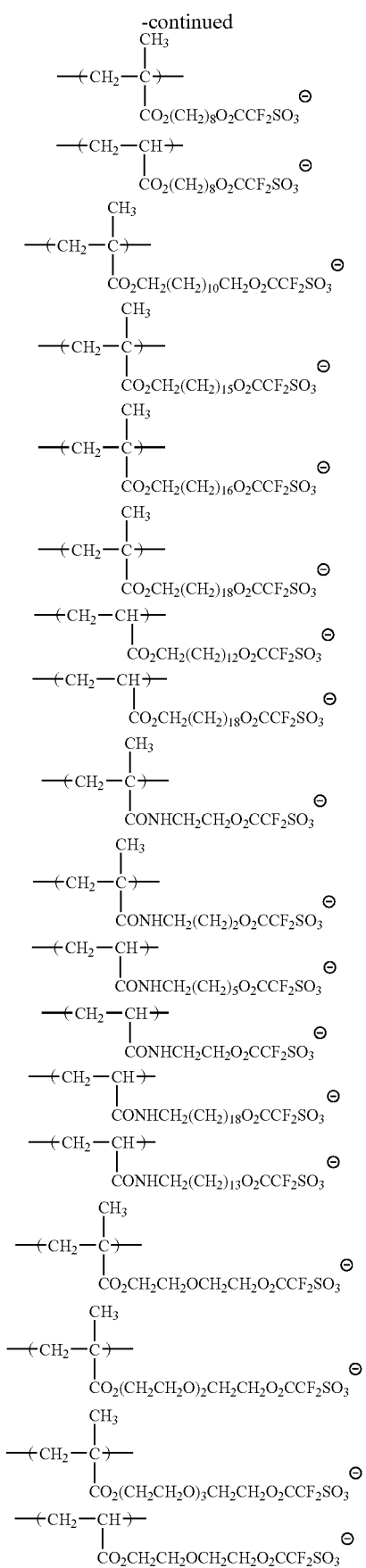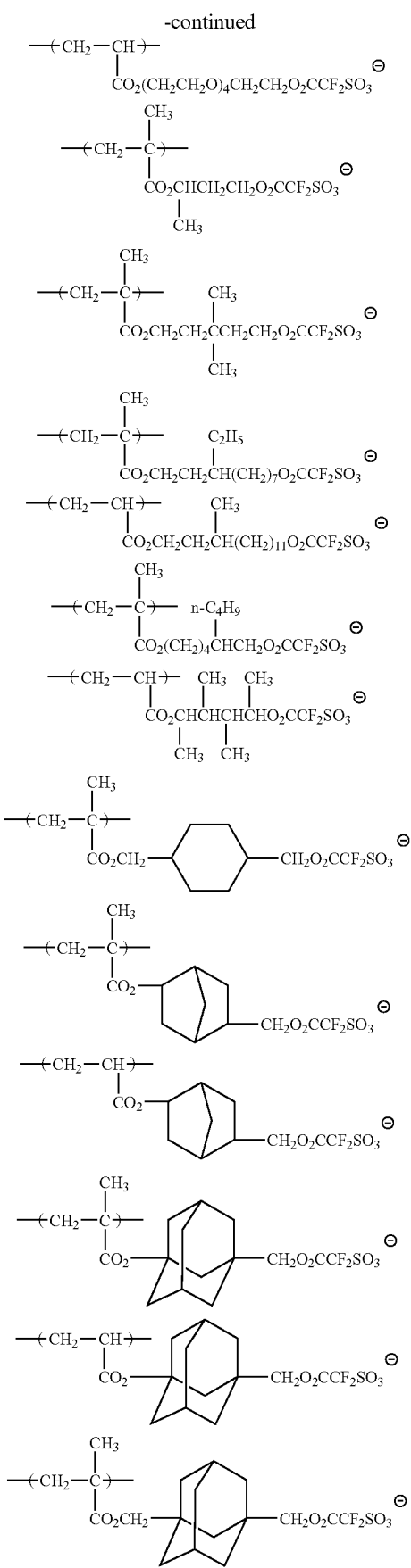

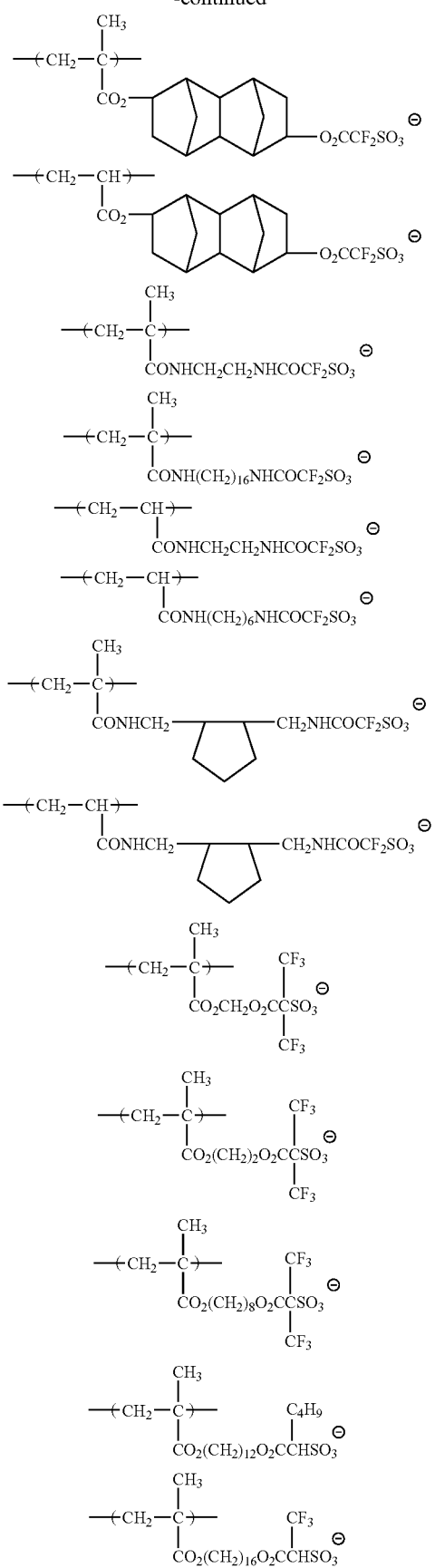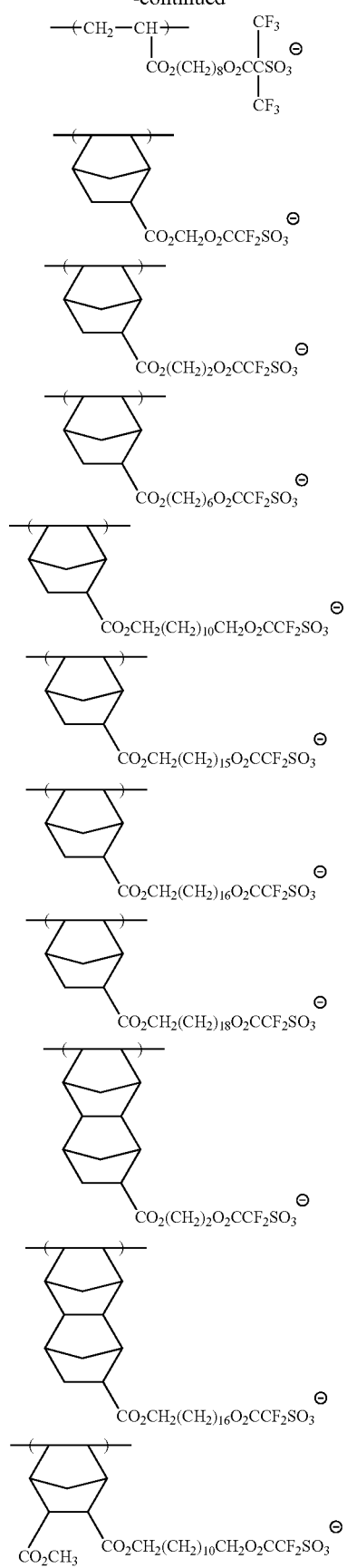

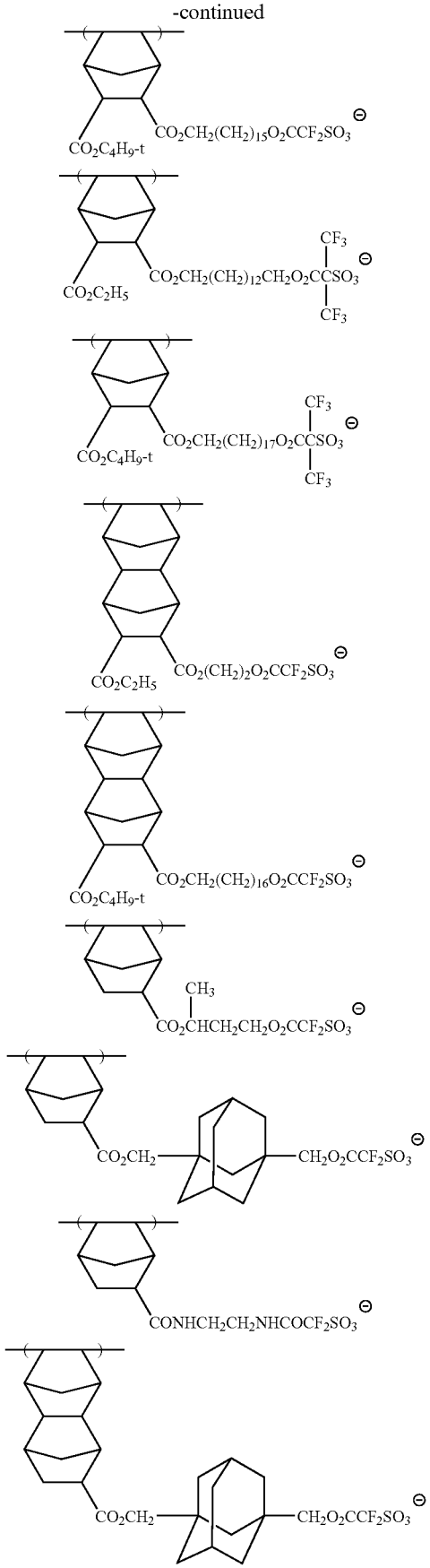

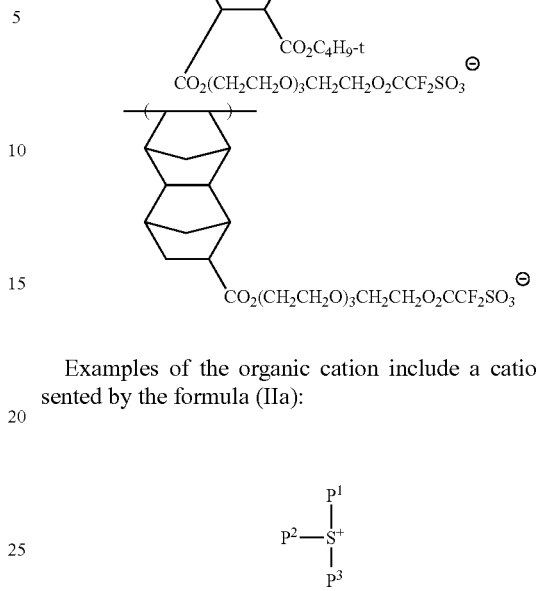

Examples of the organic cation include a cation represented by the formula (IIa):

(IIa)

wherein $P^1$, $P^2$ and $P^3$ each independently represent a C1-C20 alkyl group which is optionally substituted with at least one selected from a hydroxyl group and a C1-C12 alkoxy group, or a C3-C30 cyclic hydrocarbon group which is optionally substituted with at least one selected from a hydroxyl group and a C1-C12 alkoxy group, a cation represented by the formula (IIb):

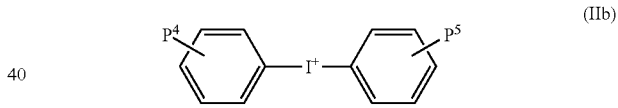
(IIb)

wherein $P^4$ and $P^5$ each independently represent a hydrogen atom, a hydroxyl group, a C1-C12 alkyl group or a C1-C12 alkoxy group, a cation represented by the formula (IIc):

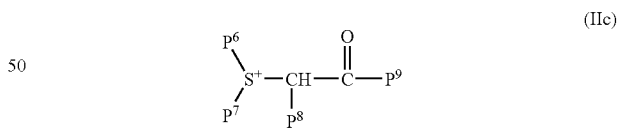
(IIc)

wherein $P^6$ and $P^7$ each independently represent a C1-C12 alkyl group or a C3-C12 cycloalkyl group, or $P^6$ and $P^7$ bond to form a C3-C12 divalent hydrocarbon group which forms a ring group together with the adjacent $S^+$, and at least one —$CH_2$— in the divalent hydrocarbon group is optionally replaced with —CO—, —O— or —S—, $P^8$ represents a hydrogen atom, $P^9$ represents a C1-C12 alkyl group, a C3-C12 cycloalkyl group or an aromatic group which is optionally substituted, or $P^8$ and $P^9$ bond to form a divalent hydrocarbon group which forms a 2-oxocycloalkyl group together with the adjacent —CHCO—, and at least one —$CH_2$— in the divalent hydrocarbon group is optionally replaced with —CO—, —O— or —S—, and a cation represented by the formula (IId):

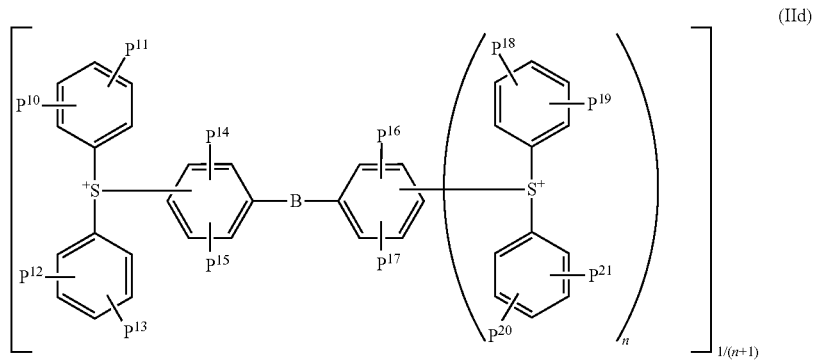

(IId)

wherein $P^{10}$ $P^{11}$ $P^{12}$ $P^{13}$ $P^{14}$ $P^{15}$ $P^{16}$ $P^{17}$ $P^{18}$ $P^{19}$ $P^{20}$ and $P^{21}$ each independently represent a hydrogen atom, a hydroxyl group, a C1-C12 alkyl group or a C1-C12 alkoxy group, B represents a sulfur or oxygen atom and n represents 0 or 1.

Examples of the C1-C20 alkyl group in the formula (IIa) include a methyl, ethyl, propyl, isopropyl, n-butyl, isobutyl, sec-butyl, tert-butyl, n-pentyl, n-hexyl, n-octyl and 2-ethylhexyl group. Examples of the C1-C12 alkoxy group in the formula (IIa) include a methoxy, ethoxy, propoxy, isopropoxy, n-butoxy, isobutoxy, sec-butoxy, tert-butoxy, n-pentyloxy, n-hexyloxy, n-octyloxy and 2-ethylhexyloxy group. Examples of the C3-C30 cyclic hydrocarbon group include a cyclopentyl, cyclohexyl, 1-adamantyl, 2-adamantyl, bicyclohexyl, phenyl, 2-methylphenyl, 4-methylphenyl, 4-ethylphenyl, 4-isopropylphenyl, 4-tert-butylphenyl, 2,4-dimethylphenyl, 2,4,6-trimethylphenyl, 4-n-hexylphenyl, 4-n-octylphenyl, 1-naphthyl, 2-naphthyl, fluorenyl, biphenyl group.

Examples of the C1-C12 alkyl and C1-C12 alkoxy groups in the formula (IIb) include the same groups as mentioned in the above formula (IIa).

Examples of the C1-C12 alkyl group in the formula (IIc) include a methyl, ethyl, propyl, isopropyl, n-butyl, isobutyl, sec-butyl, tert-butyl, n-pentyl, n-hexyl, n-octyl and 2-ethylhexyl group. Examples of the C3-C12 cycloalkyl group in the formula (IIc) include a cyclopropyl, cyclobutyl, cyclopentyl, cyclohexyl, cycloheptyl, cycooctyl and cyclodecyl group. Examples of the C3-C12 divalent hydrocarbon group formed by bonding $P^6$ and $P^7$ include a trimethylene, tetramethylene, pentamethylene group and examples of the ring group together with the adjacent $S^+$ and the divalent hydrocarbon group include a tetramethylenesulfonio, pentamethylenesulfonio and oxybisethylenesulfonio group.

Examples of the aromatic group in the formula (IIc) include a phenyl, tolyl, xylyl and naphthyl group. Examples of the divalent hydrocarbon group formed by bonding $P^8$ and $P^9$ include a methylene, ethylene, trimethylene, tetramethylene and pentamethylene group and examples of the 2-oxocycloalkyl group formed by bonding $P^8$ and $P^9$ together with the adjacent —CHCO— include a 2-oxocyclopentyl and 2-oxocyclohexyl group.

Examples of the C1-C12 alkyl and C1-C12 alkoxy groups in the formula (IId) include the same groups as mentioned in the above formula (IIa).

In the cation represented by the formula (IIa), cations represented by the formulae (IIf), (IIg) and (IIh):

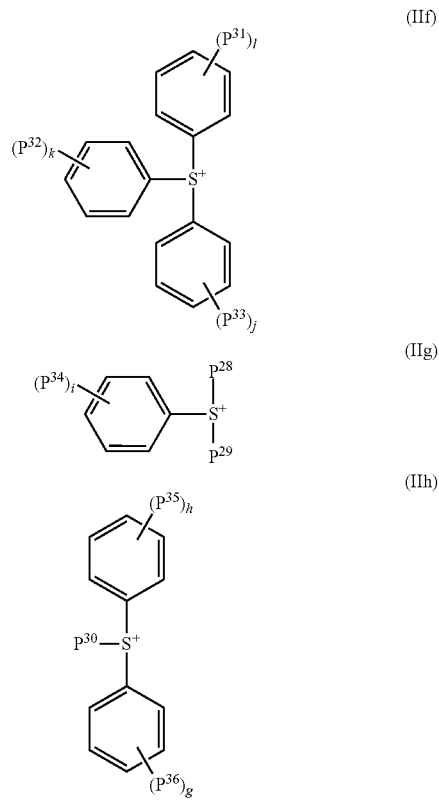

wherein $P^{28}$, $P^{29}$ and $P^{30}$ each independently represent a C1-C20 alkyl group which is optionally substituted with at least one selected from a hydroxyl group and a C1-C12 alkoxy group, or a C3-C30 cyclic hydrocarbon group except a phenyl group which is optionally substituted with at least one selected from a hydroxyl group and a C1-C12 alkoxy group; and $P^{31}$ $P^{32}$ $P^{33}$, $P^{34}$, $P^{35}$ and $P^{36}$ each independently represent a hydroxyl group, a C1-C12 alkyl group, a C1-C12 alkoxy group or a C3-C12 cyclic hydrocarbon group; l, k, j, i, h and g each independently represent an integer of 0 to 5; and when l, k, j, i, h and g represent 2, 3, 4 or 5, each of the $P^{31}$, $P^{32}$ $P^{33}$, $P^{34}$, $P^{35}$ and $P^{36}$ may be the same or different respectively, are preferred.

Examples of the alkyl, alkoxy and cyclic hydrocarbon groups in the formulae (IIf), (IIg) and (IIh) include the same groups as mentioned in the above formula (IIa).

Among the cations represented by the formulae (IIf), (IIg) and (IIh), the cation represented by the formula (IIf) is preferable.

In the cation represented by the formula (IIa), a cation represented by the formula (IIi):

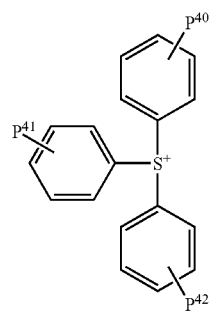

(IIi)

wherein $P^{40}$, $P^{41}$ and $P^{42}$ each independently represent a hydrogen atom, a hydroxyl group, a C1-C12 alkyl group or a C1-C12 alkoxy group, is more preferable.

Examples of the alkyl and alkoxy groups in the formula (IIi) include the same groups as mentioned in the above formula (IIa).

In the cation represented by the formula (IIi), a cation represented by the formula (IIj):

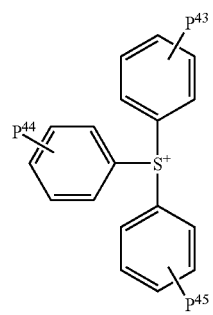

(IIj)

wherein $P^{43}$, $P^{44}$ and $P^{45}$ each independently represent a hydrogen atom or a C1-C12 alkyl group, is preferable.

Examples of the alkyl group in the formula (IIj) include the same group as mentioned in the above formula (IIa).

Examples of the cation represented by the formula (IIa) include the followings:

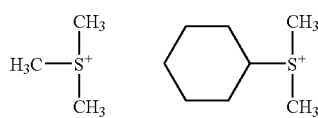

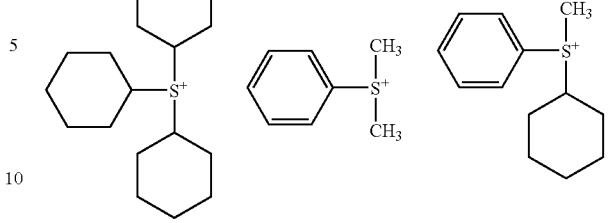

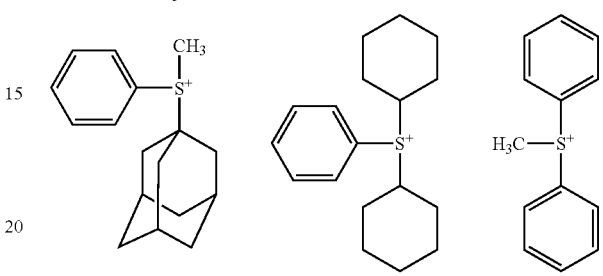

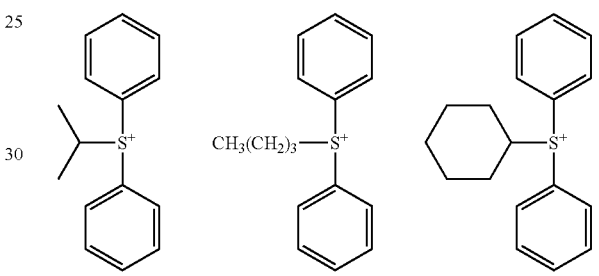

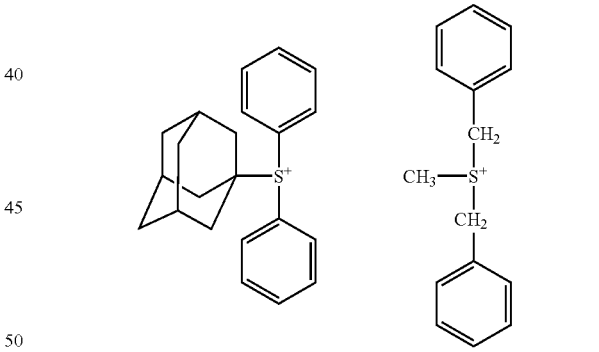

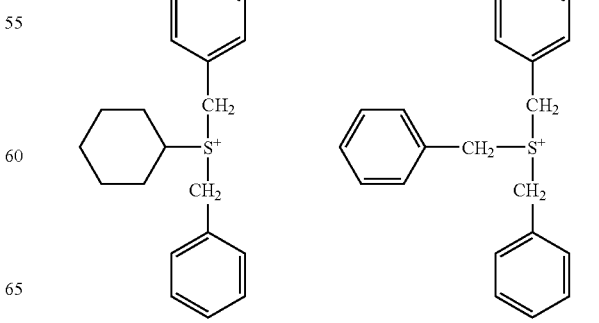

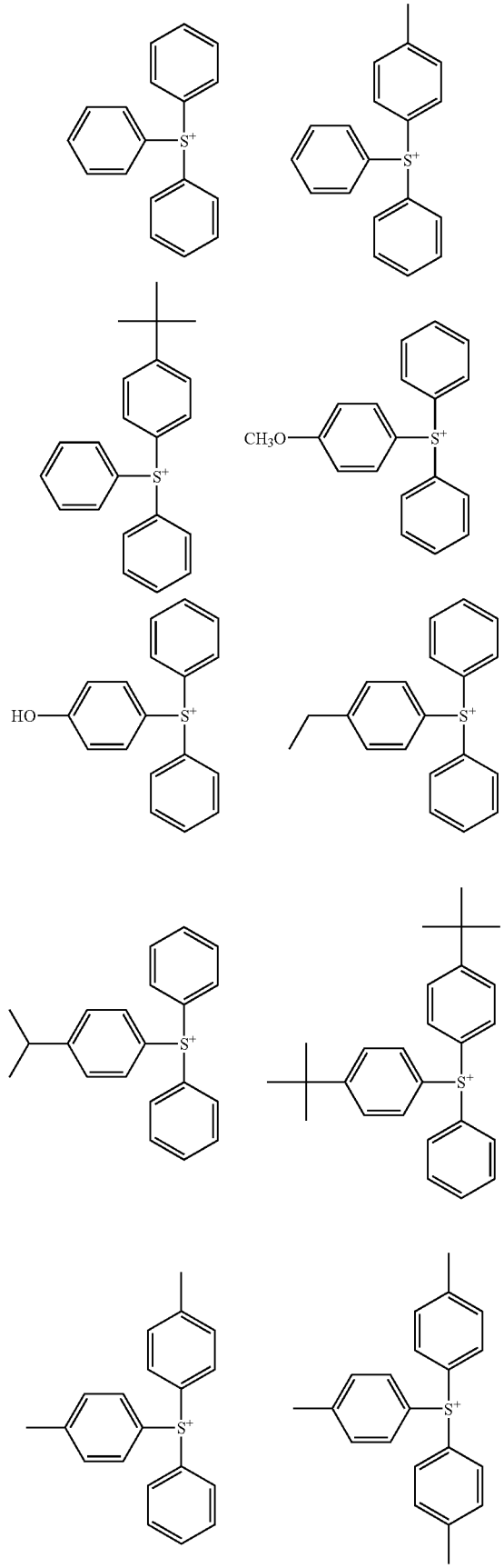
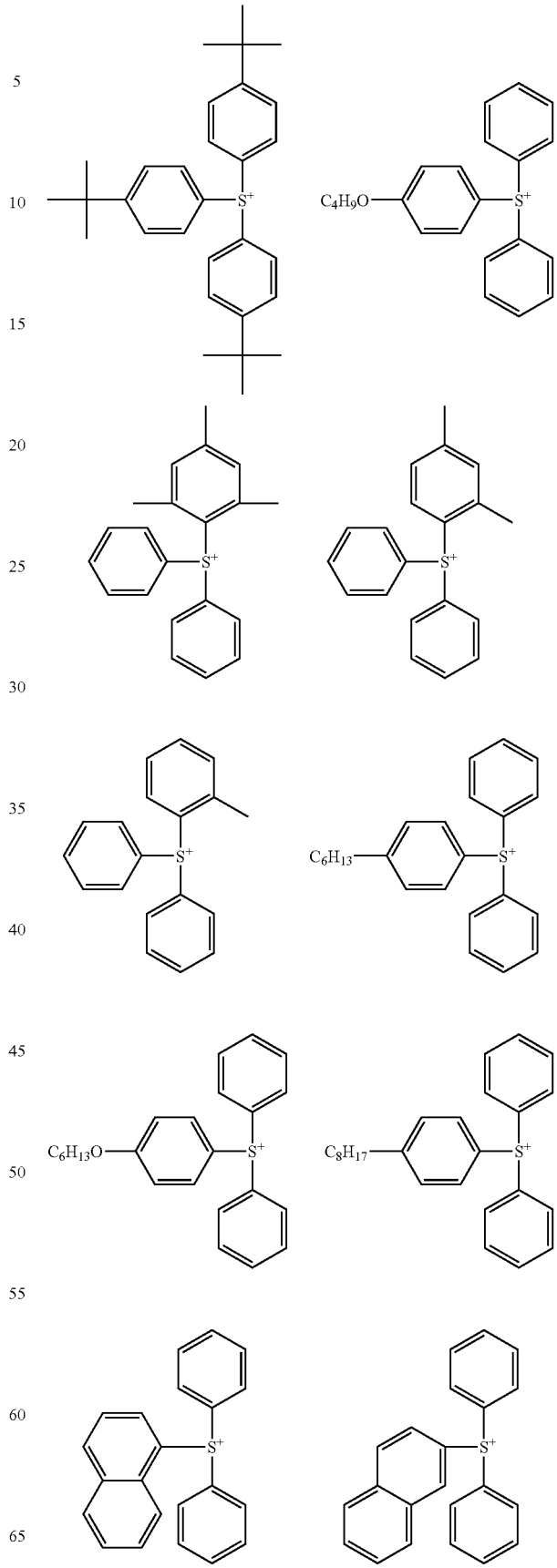

-continued
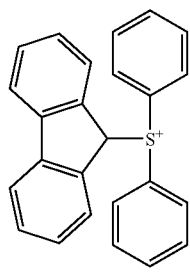
Examples of the cation represented by the formula (IIb) include the followings:
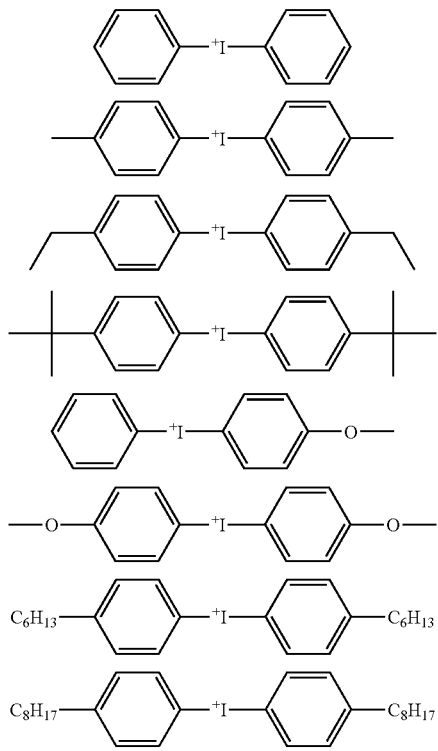
Examples of the cation represented by the formula (IIc) include the followings:
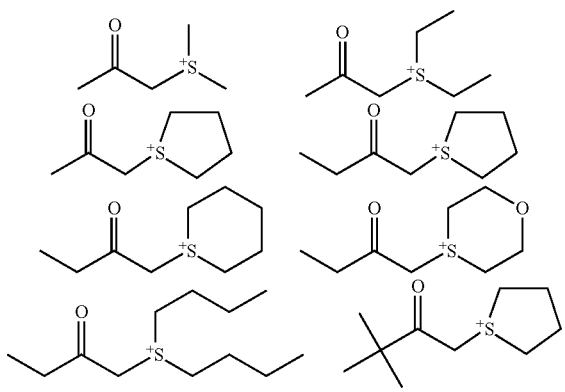
-continued
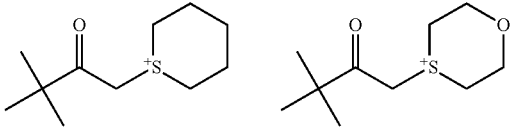
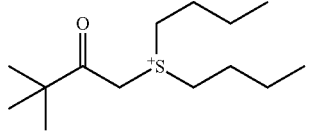
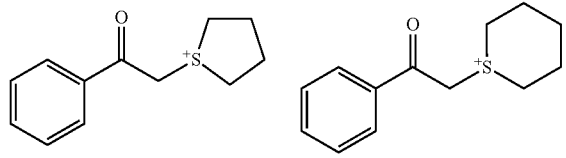
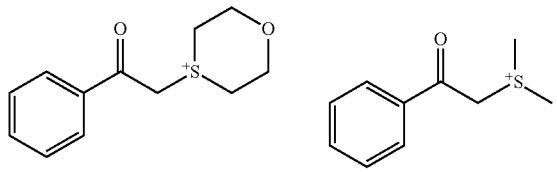
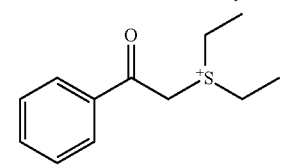
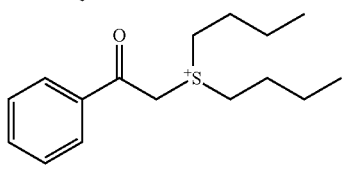
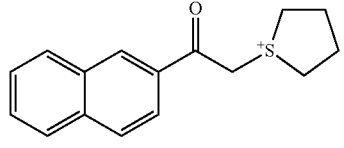
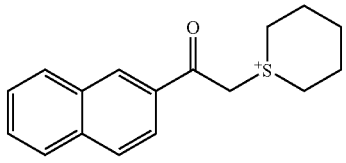
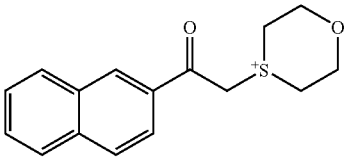
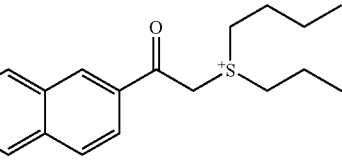
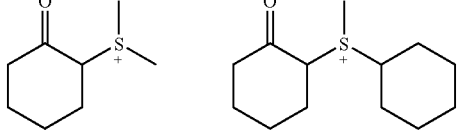

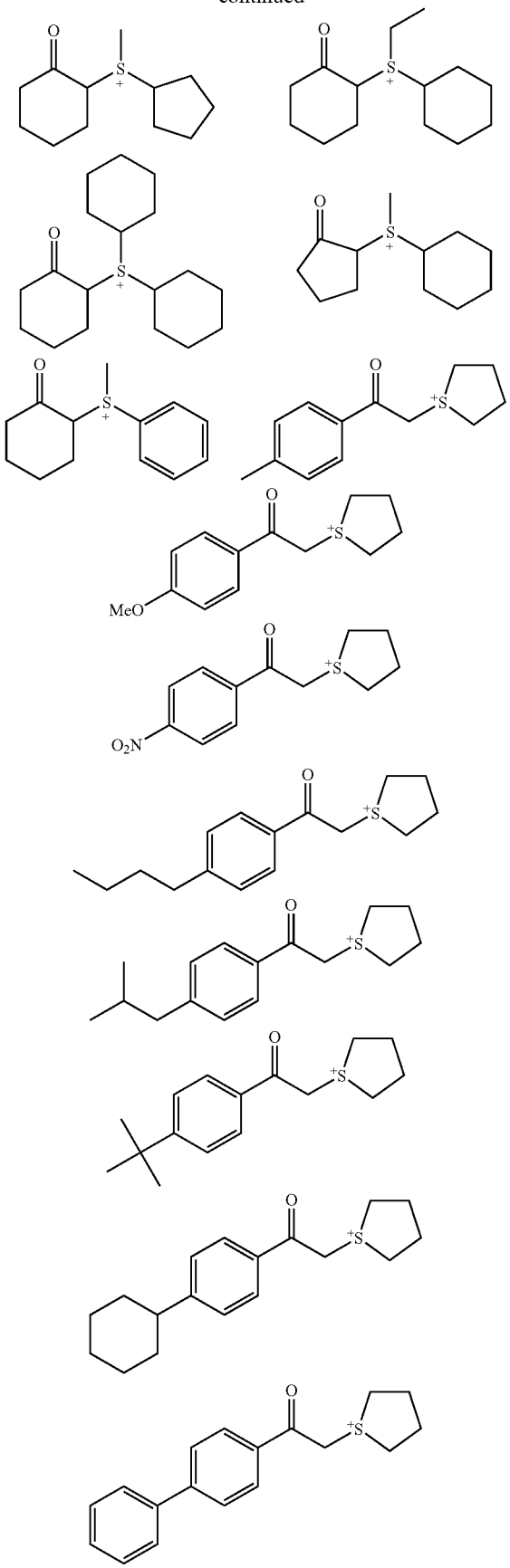
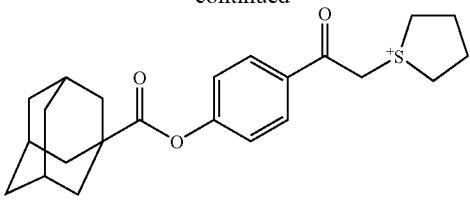
Examples of the cation represented by the formula (IId) include the followings:
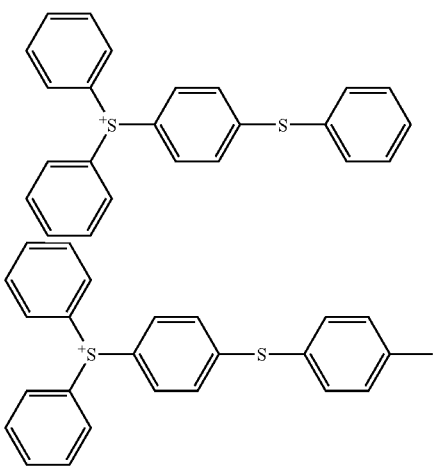
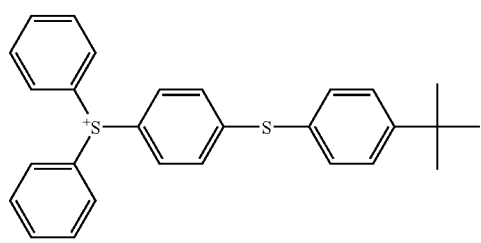
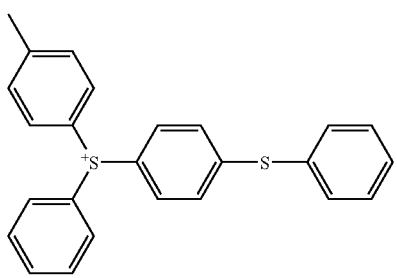
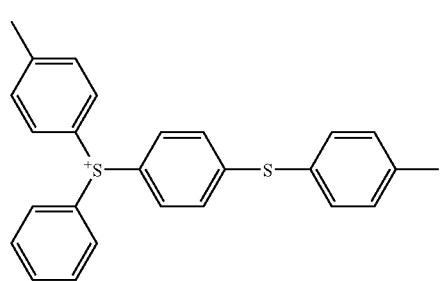

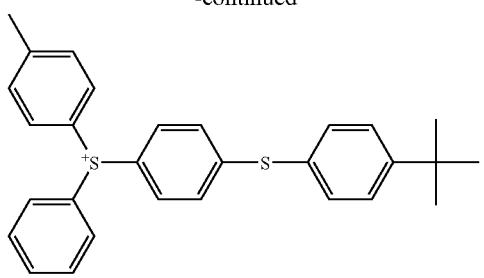
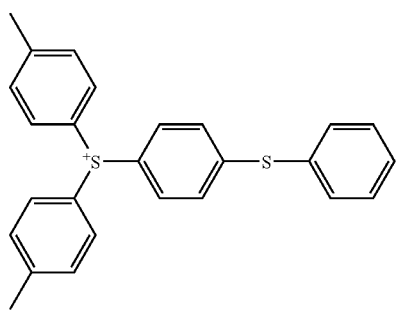
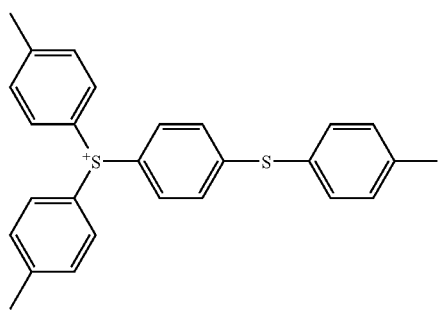
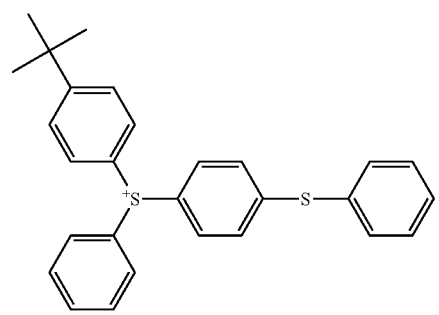
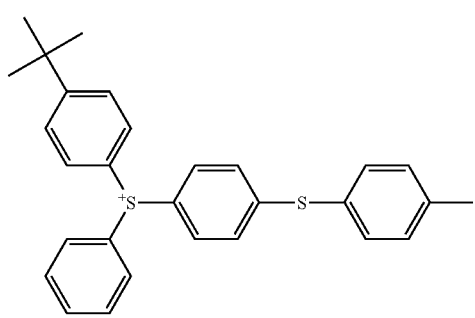
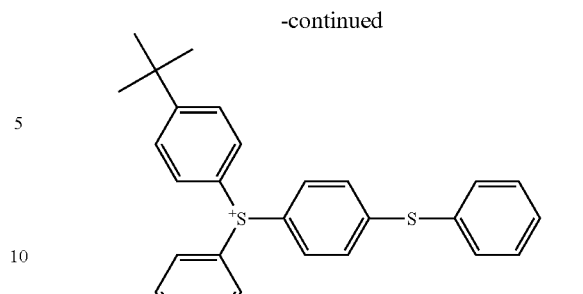
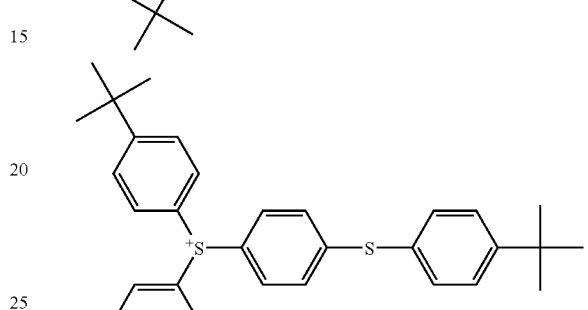
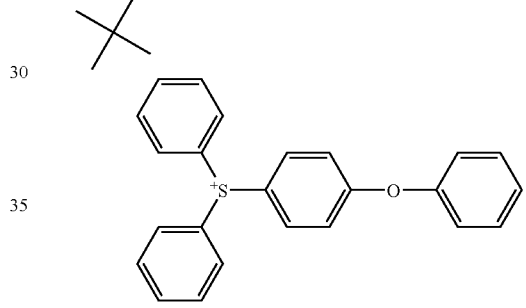
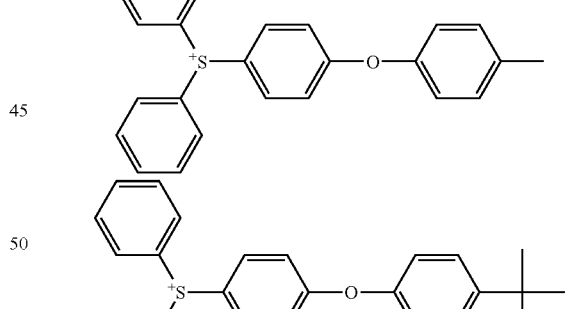
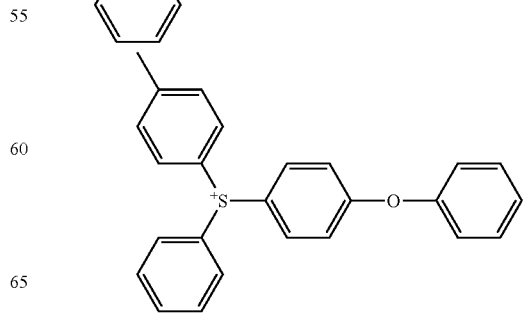

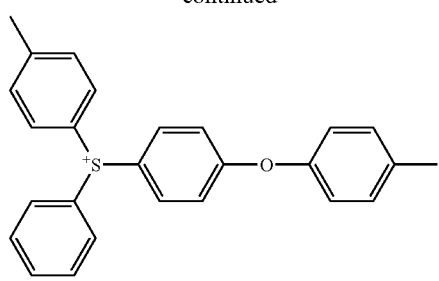
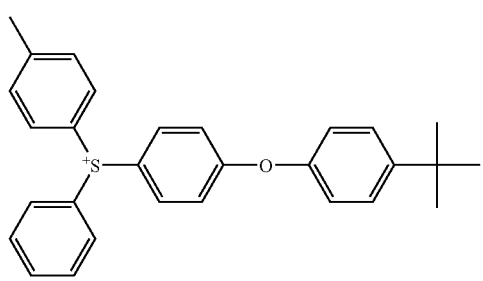
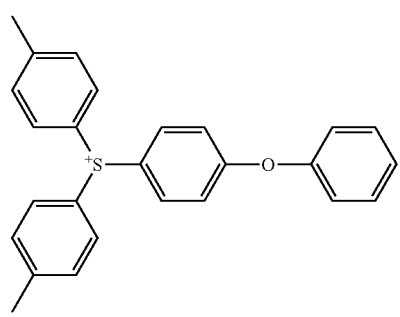
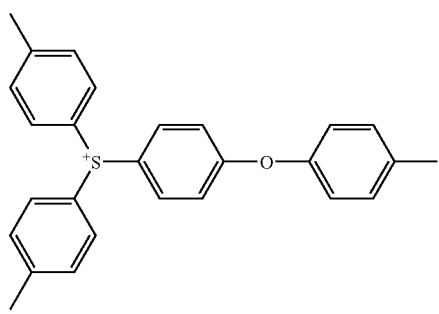
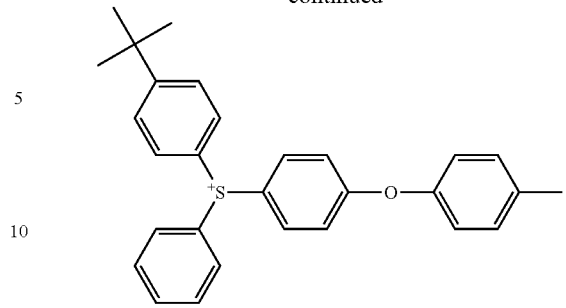
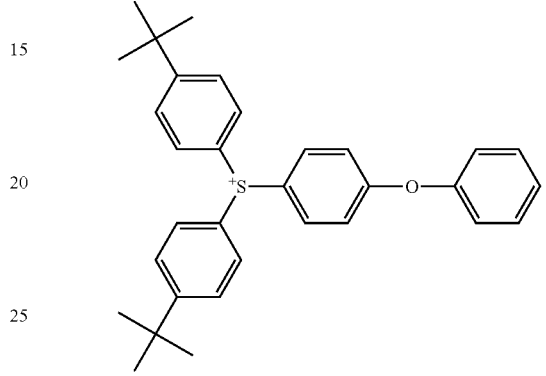
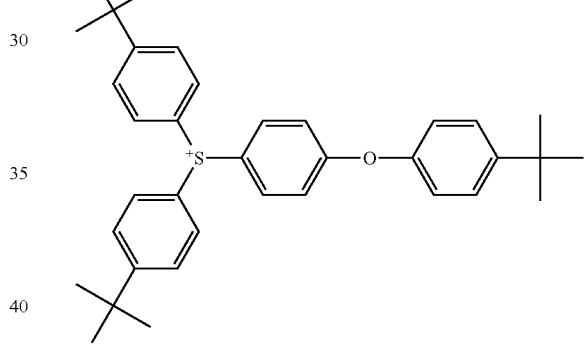
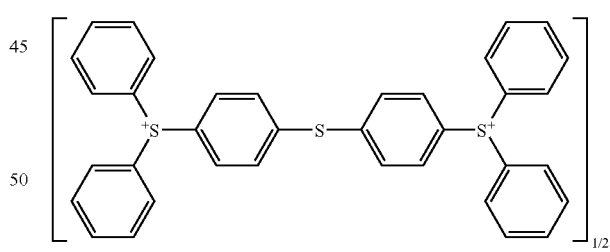
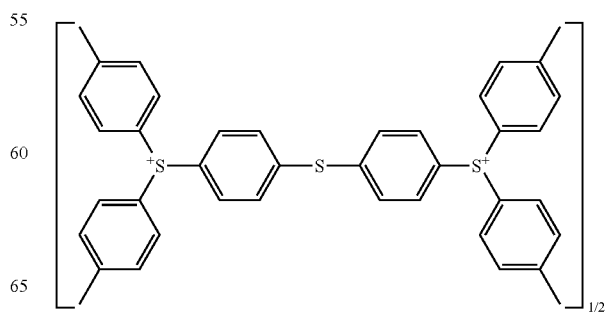

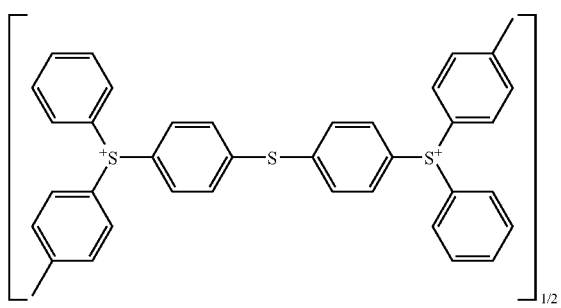

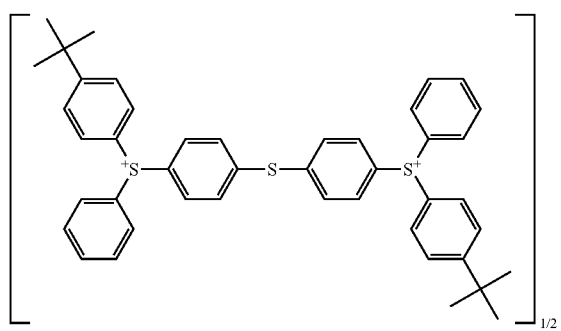

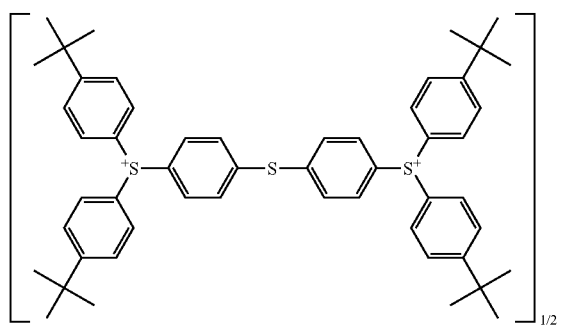

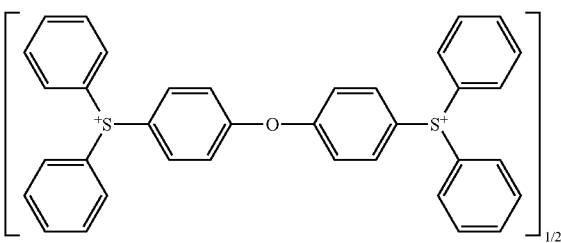

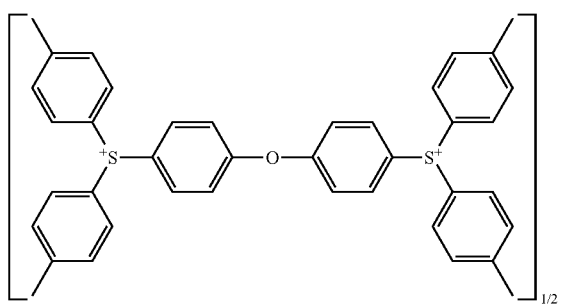

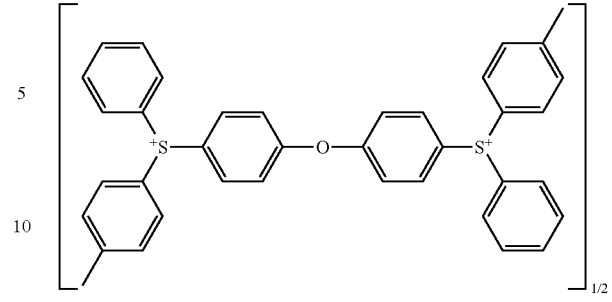

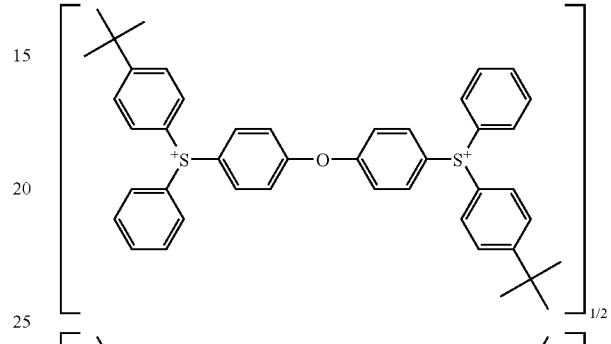

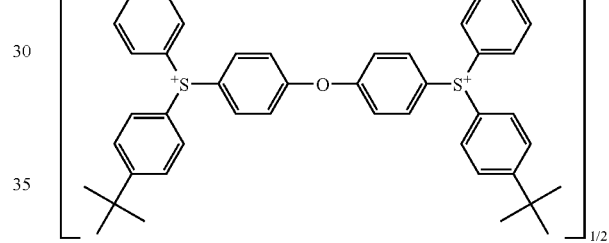

The anionic polymer may be a homopolymer of the optionally substituted acrylic compound having the anionic group or the alicyclic compound having the anionic group, and may be a copolymer of the other monomer or monomers and the optionally substituted acrylic compound having the anionic group or the alicyclic compound having the anionic group. The anionic polymer is preferably the copolymer and more preferably the copolymer of the other monomer or monomers and the optionally substituted acrylic compound having the anionic group.

The other monomer is not limited. Examples of the structural unit of the other monomer include a structural unit having at least one selected from an acid-labile group, a lactone ring and a hydroxyl group and no carbon-carbon unsaturated bond.

The anionic polymer preferably includes at least one structural unit selected from the structural unit having the acid-labile group and no carbon-carbon unsaturated bond, the structural unit having the lactone ring and no carbon-carbon unsaturated bond, and the structural unit having the hydroxyl group and no carbon-carbon unsaturated bond in addition to the structural unit derived from the optionally substituted acrylic compound having the anionic group.

The anionic polymer including the structural unit having the acid-labile group and no carbon-carbon unsaturated bond in addition to the structural unit derived from the optionally substituted acrylic compound having the anionic group is more preferable, since the resin including the structural unit having the acid-labile group and no carbon-carbon unsaturated bond is insoluble or poor soluble in an alkali aqueous solution but becomes soluble in an alkali aqueous solution by the action of an acid generated by irradiation to the resin.

The anionic polymer including the structural unit having the lactone ring and no carbon-carbon unsaturated bond, or the structural unit having the hydroxyl group and no carbon-carbon unsaturated bond in addition to the structural unit derived from the optionally substituted acrylic compound having the anionic group is also preferable from the viewpoint of the adhesiveness of resist to a substrate and balancing a hydrophilicity and hydrophobicity of the resin.

The anionic polymer including the structural unit having the acid-labile group and no carbon-carbon unsaturated bond, the structural unit having the lactone ring and no carbon-carbon unsaturated bond, and the structural unit having the hydroxyl group and no carbon-carbon unsaturated bond in addition to the structural unit derived from the optionally substituted acrylic compound having the anionic group is furthermore preferable.

Examples of the structural unit of the other monomer include a structure unit derived from an ester of acrylic acid, a structural unit derived from an ester of methacrylic acid, a structural unit derived from an ester of norbornenecarboxylic acid, a structural unit derived from an ester of tricyclodecenecarboxylic acid and a structural unit derived from an ester of tetracyclodecenecarboxylic acid. The structure unit derived from an ester of acrylic acid and the structural unit derived from an ester of methacrylic acid are preferable.

The acid-labile group of the structural unit having the acid-labile group cleaves by an acid.

In the present specification, "—COOR" may be described as "a structure having ester of carboxylic acid", and may also be abbreviated as "ester group". Specifically, "—COOC(CH$_3$)$_3$" may be described as "a structure having tert-butyl ester of carboxylic acid", or be abbreviated as "tert-butyl ester group".

Examples of the acid-labile group include a structure having ester of carboxylic acid such as an alkyl ester group in which a carbon atom adjacent to the oxygen atom is quaternary carbon atom, an alicyclic ester group in which a carbon atom adjacent to the oxygen atom is quaternary carbon atom, and a lactone ester group in which a carbon atom adjacent to the oxygen atom is quaternary carbon atom. The "quaternary carbon atom" means a "carbon atom joined to four substituents other than hydrogen atom".

Examples of the acid-labile group include an alkyl ester group in which a carbon atom adjacent to the oxygen atom is quaternary carbon atom such as a tert-butyl ester group; an acetal type ester group such as a methoxymethyl ester, ethoxymethyl ester, 1-ethoxyethyl ester, 1-isobutoxyethyl ester, 1-isopropoxyethyl ester, 1-ethoxypropoxy ester, 1-(2-methoxyethoxy)ethyl ester, 1-(2-acetoxyethoxy)ethyl ester, 1-[2-(1-adamantyloxy)ethoxy]ethyl ester, 1-[2-(1-adamantanecarbonyloxy)ethoxy]ethyl ester, tetrahydro-2-furyl ester and tetrahydro-2-pyranyl ester group; an alicyclic ester group in which a carbon atom adjacent to the oxygen atom is quaternary carbon atom such as an isobornyl ester, 1-alkylcycloalkyl ester, 2-alkyl-2-adamantyl ester, and 1-(1-adamantyl)-1-alkylalkyl ester group.

Examples of the structural unit having the acid-labile group and no carbon-carbon unsaturated bond in addition to the structural unit derived from the optionally substituted acrylic compound having the anionic group include structural units derived from tert-butyl acrylate, tert-butyl methacrylate, methoxymethyl acrylate, methoxymethyl methacrylate, ethoxymethyl acrylate, ethoxymethyl methacrylate, 1-ethoxyethyl acrylate, 1-ethoxyethyl methacrylate, 1-isobutoxyethyl acrylate, 1-isobutoxyethyl methacrylate, 1-isopropoxyethyl acrylate, 1-isopropoxyethyl methacrylate, 1-ethoxypropoxy acrylate, 1-ethoxypropoxy methacrylate, 1-(2-methoxyethoxy)ethyl acrylate, 1-(2-methoxyethoxy)ethyl methacrylate, 1-(2-acetoxyethoxy)ethyl acrylate, 1-(2-acetoxyethoxy)ethyl methacrylate, 1-[2-(1-adamantyloxy)ethoxy]ethyl acrylate, 1-[2-(1-adamantyloxy)ethoxy]ethyl methacrylate, 1-[2-(1-adamantanecarbonyloxy)ethoxy]ethyl acrylate, 1-[2-(1-adamantanecarbonyloxy)ethoxy]ethyl methacrylate, tetrahydro-2-furyl acrylate, tetrahydro-2-furyl methacrylate, tetrahydro-2-pyranyl acrylate, tetrahydro-2-pyranyl methacrylate, isobornyl acrylate, isobornyl methacrylate, 1-alkylcycloalkyl acrylate, 1-alkylcycloalkyl methacrylate, 2-alkyl-2-adamantyl acrylate, 2-alkyl-2-adamantyl methacrylate, 1-(1-adamantyl)-1-alkylalkyl acrylate and 1-(1-adamantyl)-1-alkylalkyl methacrylate.

Among them, preferred structural units are those having a bulky group such as alicyclic group (e.g. 2-alkyl-2-adamantyl and 1-(1-adamantyl)-1-alkylalkyl) since excellent resolution is obtained when the resin including such structural unit and the structural unit derived from the optionally substituted acrylic compound having the anionic group are used in the present resist composition described below.

Examples of the structural unit having the bulky group include a structural unit derived from 2-alkyl-2-adamantyl acrylate, 2-alkyl-2-adamantyl methacrylate, 1-(1-adamantyl)-1-alkylalkyl acrylate, 1-(1-adamantyl)-1-alkylalkyl methacrylate, 2-alkyl-2-adamantyl 5-norbornene-2-carboxylate, 1-(1-adamantyl)-1-alkylalkyl 5-norbornene-2-carboxylate, 2-alkyl-2-adamantyl α-chloroacrylate, and 1-(1-adamantyl)-1-alkylalkyl α-chloroacrylate.

Particularly, the structural unit derived from 2-alkyl-2-adamantyl acrylate or 2-alkyl-2-adamantyl methacrylate is preferable. Specific examples thereof include structural units derived from 2-methyl-2-adamantyl acrylate, 2-ethyl-2-adamantyl acrylate, 2-isopropyl-2-adamantyl acrylate, 2-n-butyl-2-adamantyl acrylate, 2-methyl-2-adamantyl methacrylate, 2-ethyl-2-adamantyl methacrylate, 2-isopropyl-2-adamantyl methacrylate and 2-n-butyl-2-adamantyl methacrylate.

2-Alkyl-2-adamantyl acrylate can be produced, for example, by reacting 2-alkyl-2-adamantanol or metal salt thereof with an acryloyl halide, and 2-alkyl-2-adamantyl methacrylate can be produced, for example, by reacting 2-alkyl-2-adamantanol or metal salt thereof with a methacryloyl halide.

Examples of the structural unit having the lactone ring and no carbon-carbon unsaturated bond include structural units derived from the following acrylate and methacrylate having the lactone ring:

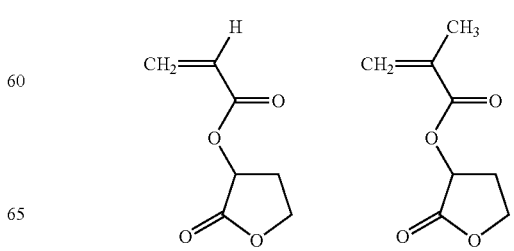

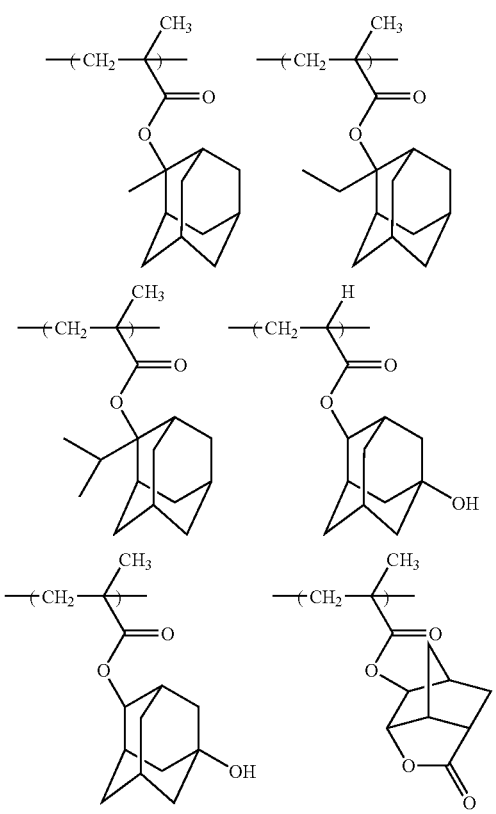

Among the above-mentioned acrylates and methacrylates having the lactone ring, acryloyloxy-γ-butyrolactone can be produced by reacting corresponding α- or β-bromo-γ-butyrolactone with acrylic acid, or reacting corresponding α- or β-hydroxy-γ-butyrolactone with acryloyl halide, and methacryloyloxy-γ-butyrolactone can be produced by reacting corresponding α- or β-bromo-γ-butyrolactone with methacrylic acid, or reacting corresponding α- or β-hydroxy-γ-butyrolactone with methacryloyl halide.

Among the above-mentioned acrylates and methacrylates having the lactone ring, acrylates and methacrylates of alicyclic lactones can be produced, for example, by reacting corresponding alicyclic lactone having hydroxyl group with acryloyl halide or methacryloyl halide described in JP 2000-26446 A.

Examples of the structural unit having the hydroxyl group and no carbon-carbon unsaturated bond include structural units derived from 3-hydroxy-1-adamantyl acrylate, 3,5-dihydroxy-1-adamantyl acrylate, 3-hydroxy-1-adamantyl methacrylate and 3,5-dihydroxy-1-adamantyl methacrylate. 3-Hydroxy-1-adamantyl acrylate, 3,5-dihydroxy-1-adamantyl acrylate, 3-hydroxy-1-adamantyl methacrylate and 3,5-dihydroxy-1-adamantyl methacrylate can be produced, for example, by reacting corresponding hydroxyl-substituted adamantane with acrylic acid, methacrylic acid, or its acid halide, and they are also commercially available.

Examples of the structural unit derived from an ester of norbornenecarboxylic acid include structural units derived from methyl 5-norbornene-carboxylate, tert-butyl 5-norbornene-2-carboxylate, 2-cyclohexyl-2-propyl 5-norbornene-2-carboxylate, 2-(4-methylcyclohexyl)-2-propyl 5-norbornene-2-carboxylate, 2-(4-hydroxycyclohexyl)-2-propyl 5-norbornene-2-carboxylate, 2-(4-oxocyclohexyl)-2-propyl 5-norbornene-2-carboxylate, 2-(1-adamantyl)-2-propyl 5-norbornene-2-carboxylate, 1-methylcyclohexyl 5-norbornene-2-carboxylate, 2-methyl-2-adamantyl 5-norbornene-2-carboxylate, 2-ethyl-2-adamantyl 5-norbornene-2-carboxylate, 2-hydroxyethyl 5-norbornene-2-carboxylate and 5-norbornene-2,3-dicarboxylic anhydride.

Examples of the structural unit other than those described above include structural units derived from 2-norbornene, 2-hydroxy-5-norbornene, 5-norbornene-2-carboxylic acid, and 5-norbornene-2-methanol.

Preferable examples of the structural unit of the other monomer include the followings:

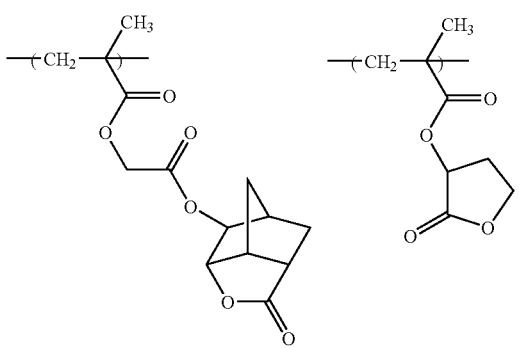

-continued

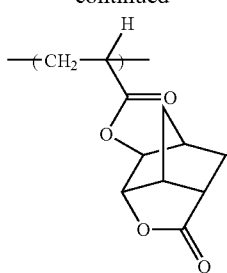

As the present resin, a resin including the structural unit derived from the optionally substituted acrylic compound having the anionic group and at least one structural unit selected from the above-mentioned preferable structural units is preferable, and a resin including the structural unit represented by the formula (Ia) or (IIIa) and at least one structural unit selected from the above-mentioned preferable structural units is more preferable. Particularly, a resin including the structural unit represented by the formula (IIIa), at least one structural unit selected from the followings:

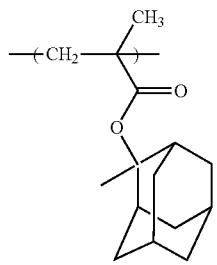 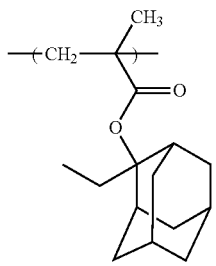

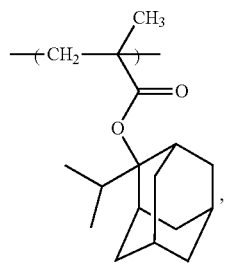

at least one structural unit selected from the followings:

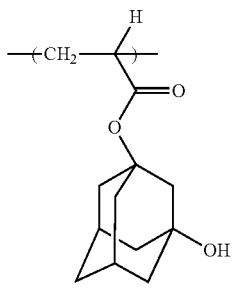 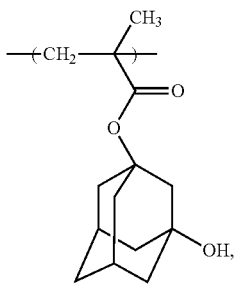

and at least one structural unit selected from the followings:

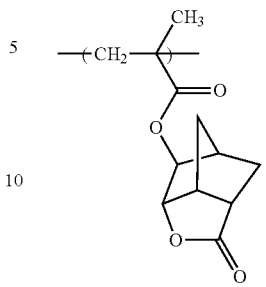 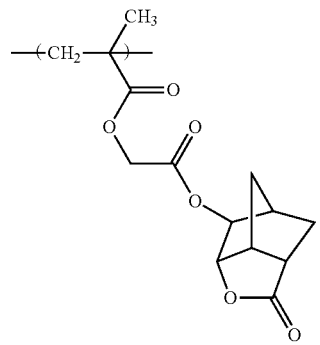

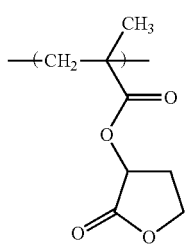 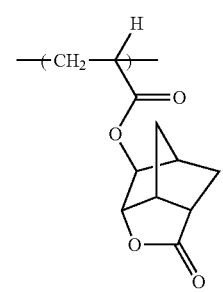

is preferable.

The content ratio of the structural unit derived from the optionally substituted acrylic compound having the anionic group or the alicyclic compound having the anionic group in the present resin is usually 1 to 100 mol %, preferably 3 to 50 mol %, and more preferably 5 to 20 mol % based on all structural units of the resin.

When the present resin is copolymer including the structural unit derived from the optionally substituted acrylic compound having the anionic group or the alicyclic compound having the anionic group, the structural unit having the acid-labile group and no carbon-carbon unsaturated bond, and the other structural unit such as the structural unit having the lactone ring and no carbon-carbon unsaturated bond and the structural unit having the hydroxyl group and no carbon-carbon unsaturated bond, the content ratio of the structural unit derived from the optionally substituted acrylic compound having the anionic group or the alicyclic compound having the anionic group is usually 1 to 95 mol %, the content of the structural unit having the acid-labile group and no carbon-carbon unsaturated bond is usually 4 to 80 mol % and the content of the other structural unit is usually 1 to 95 mol % based on all structural units of the resin.

The present resin has usually a weight-average molecular weight of about 500 to 50,000, preferably 700 to 20,000 using polystyrene as a standard reference material.

Next, the method for producing the present resin will be illustrated.

The present resin can be produced, for example, by polymerizing a salt of the organic cation and an anionic monomer, or by polymerizing a composition including a salt of the organic cation and the anionic monomer and the other monomer or monomers. The present resin can be also produced by conducting oligomerization of the salt of the organic cation and the anionic monomer, the other monomer or monomers or a mixture thereof followed by polymerizing the oligomer obtained.

Among the present resin, a salt of the organic cation and the homopolymer consisting of the structural unit derived from the optionally substituted acrylic compound having the anionic group or the structural unit derived from the alicyclic compound having the anionic group can be produced, for example, by polymerizing a salt of the organic cation and the optionally substituted acrylic compound having the anionic group or the alicyclic compound having the anionic group. Among the present resin, a salt of the organic cation and the copolymer including the structural unit derived from the optionally substituted acrylic compound having the anionic group or the alicyclic compound having the anionic group and the structural unit derived from the other monomer or monomers can be produced, for example, by polymerizing a composition including a salt of the organic cation and the optionally substituted acrylic compound having the anionic group or the alicyclic compound having the anionic group and the other monomer or monomers.

Examples of the salt of the organic cation and the optionally substituted acrylic compound having the anionic group include an optionally substituted acrylic compound represented by the formula (IVa):

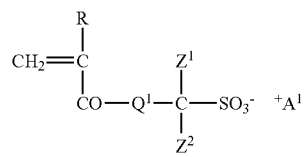

(IVa)

wherein R, $Q^1$, $Z^1$ and $Z^2$ are the same as defined above, and $^+A^1$ represents an organic cation. In the optionally substituted acrylic compound represented by the formula (IVa), an optionally substituted acrylic compound represented by the formula (Va):

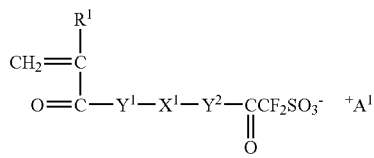

(Va)

wherein $R^1$, $X^1$, $Y^1$, $Y^2$ and $^+A^1$ are the same as defined above, is preferable.

Examples of the alicyclic compound having the anionic group include an alicyclic compound represented by the formula (IVb):

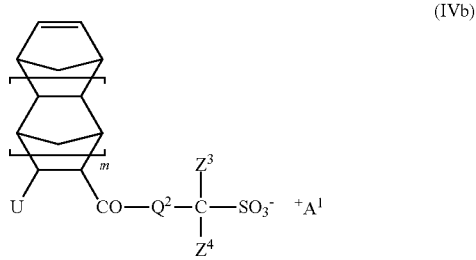

(IVb)

wherein $Q^2$, $Z^3$, $Z^4$, U, m and $^+A^1$ are the same as defined above.

In the alicyclic compound represented by the formula (IVb), an alicyclic compound represented by the formula (Vb):

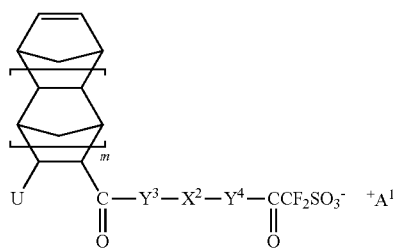

(Vb)

wherein $X^2$, $Y^3$, $Y^4$ and $^+A^1$ are the same as defined above, is preferable.

Examples of the salt of the organic cation and the optionally substituted acrylic compound having the anionic group or the alicyclic compound having the anionic group include the followings:

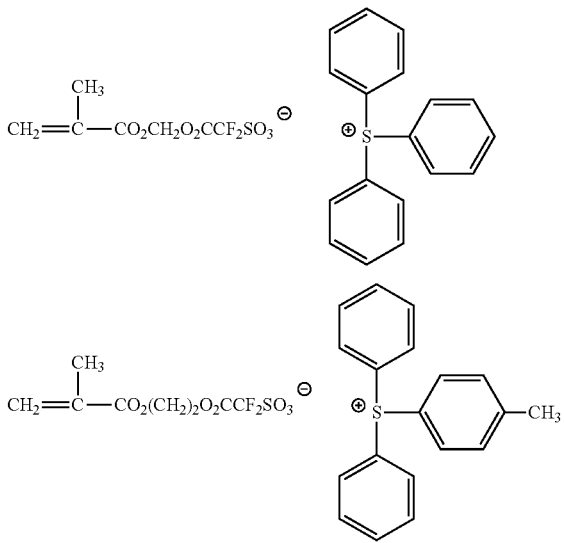

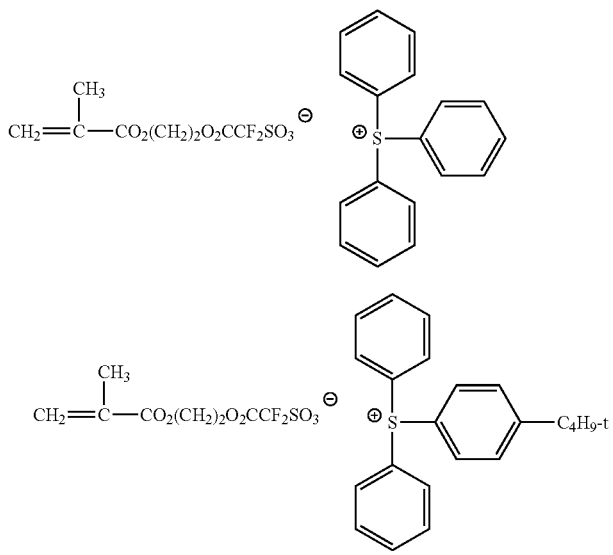

-continued
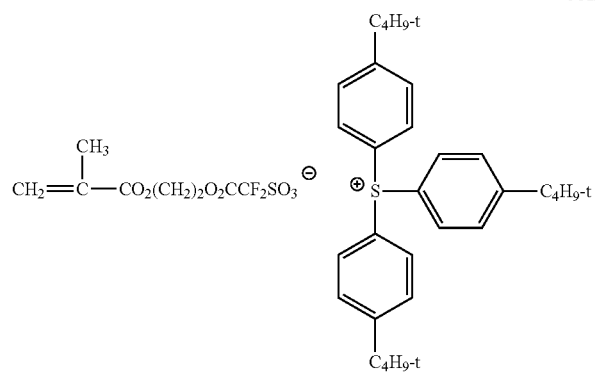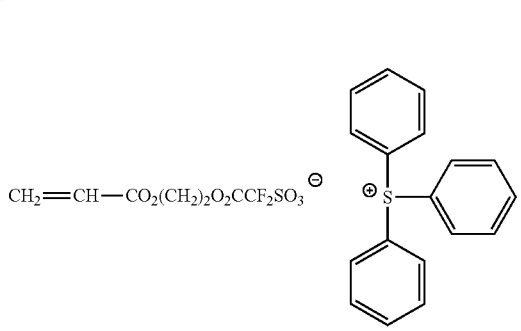
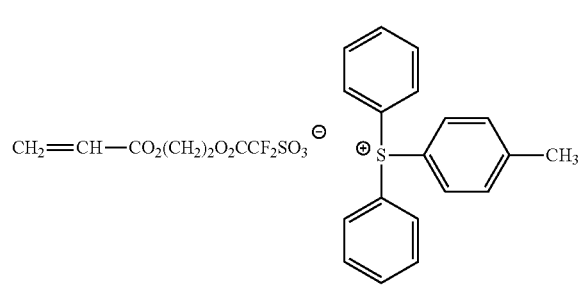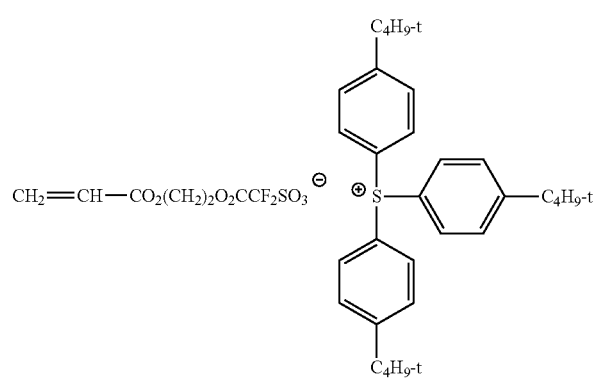
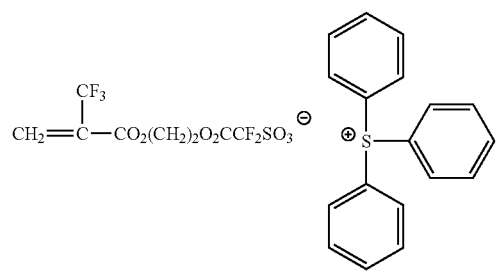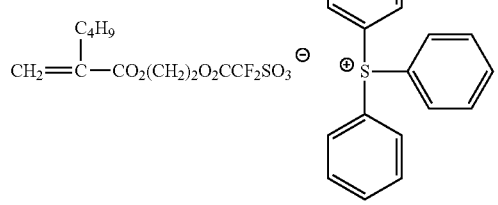
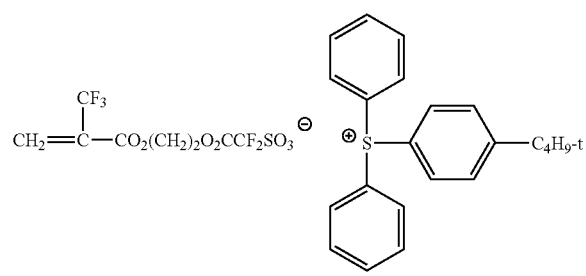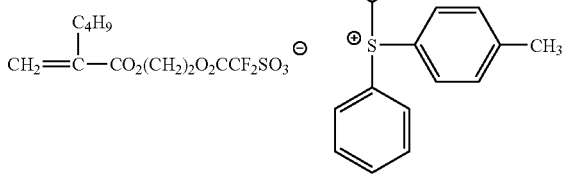
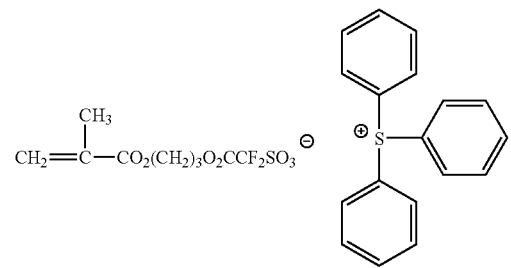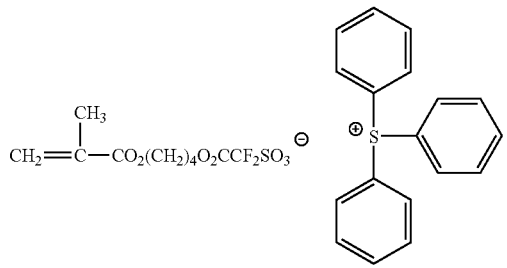

-continued
51
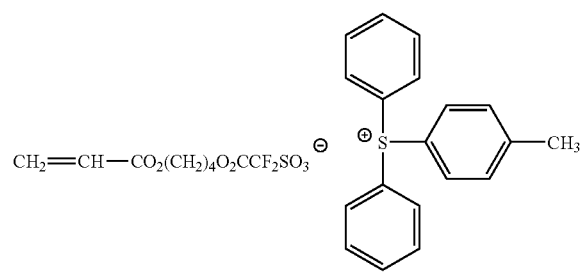
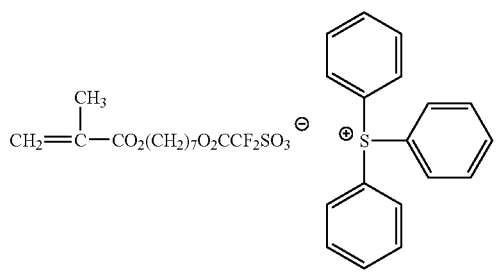
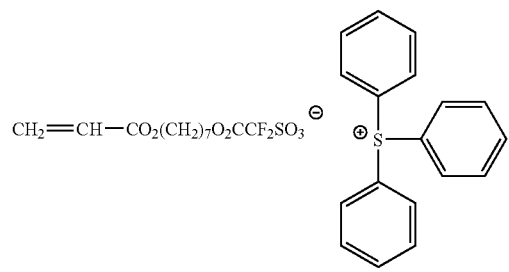
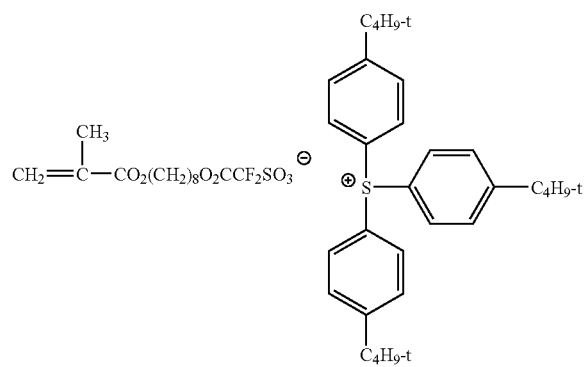
52
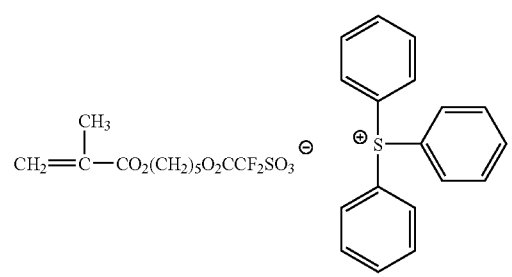
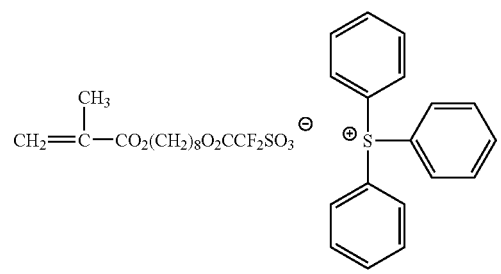
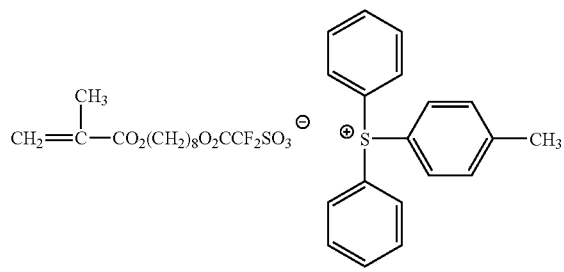
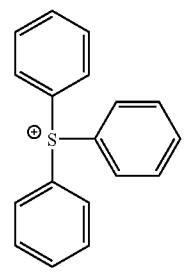

-continued
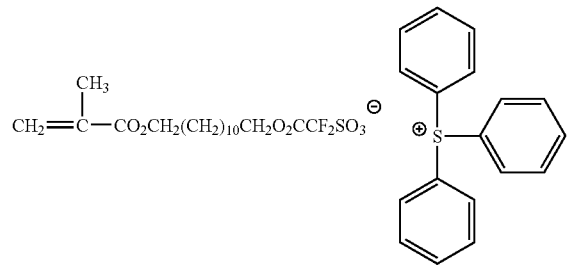
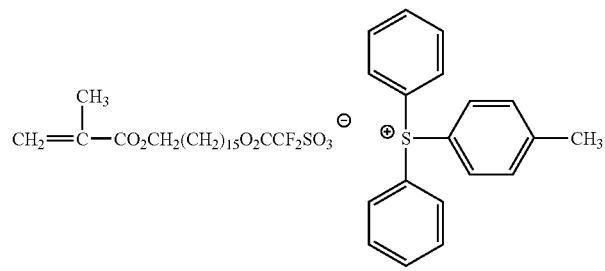
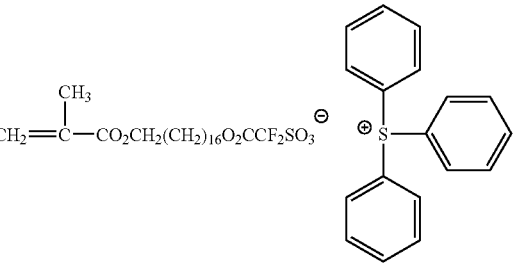
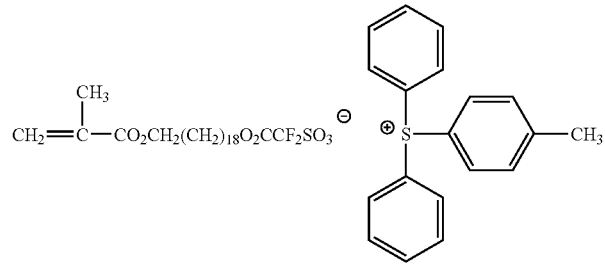
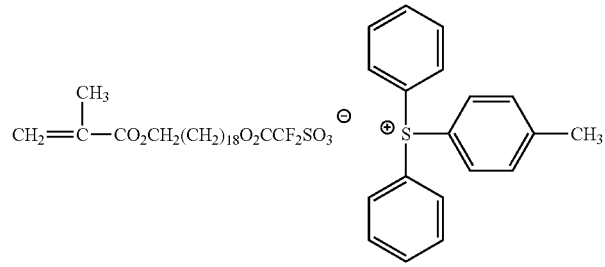
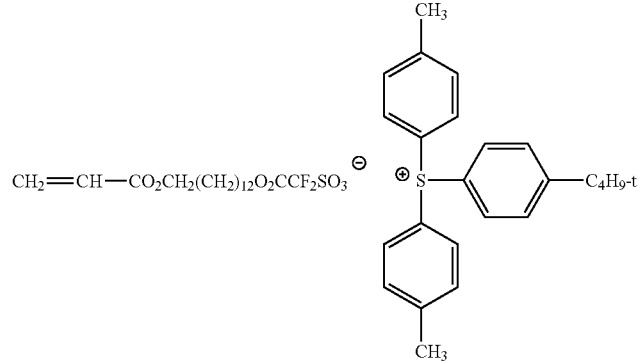
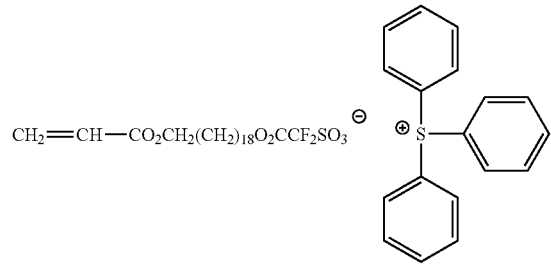
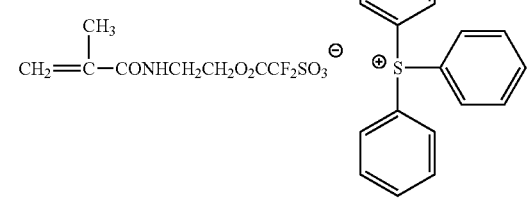

-continued
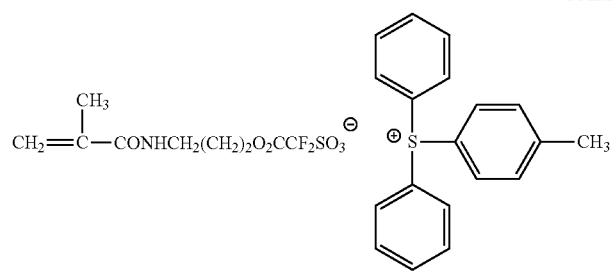
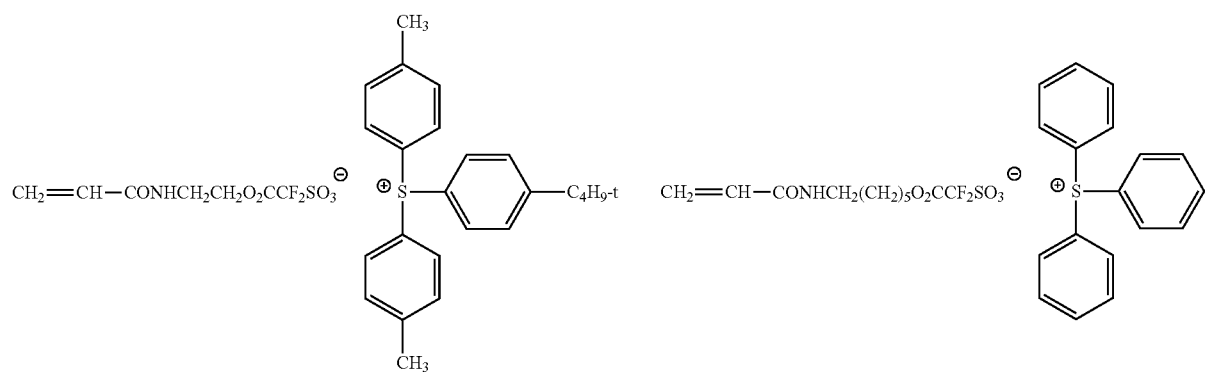
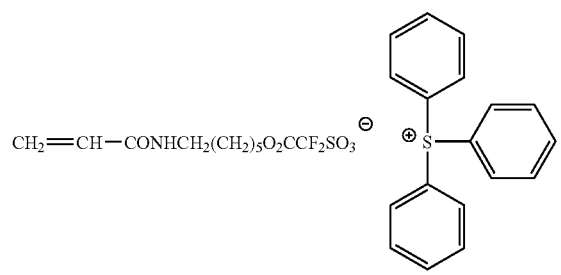
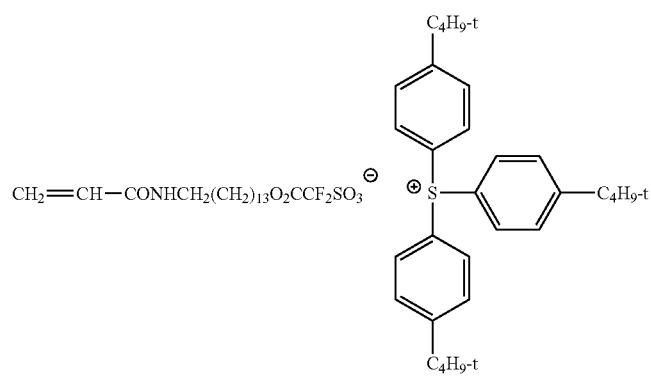
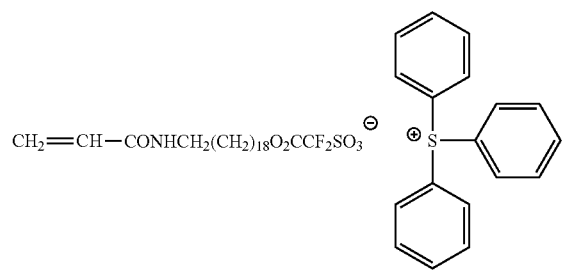
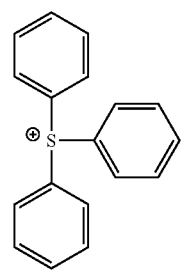

-continued
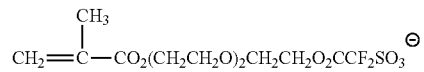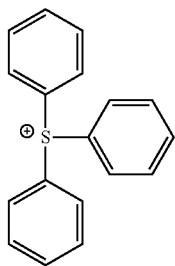
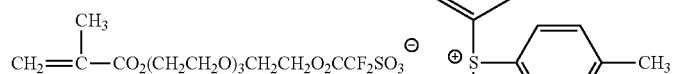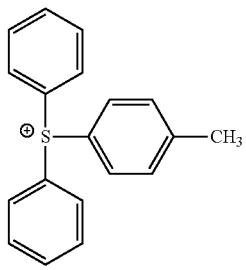
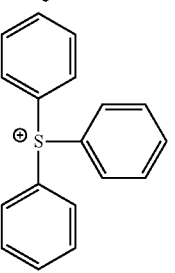
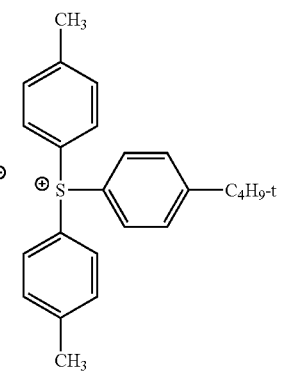
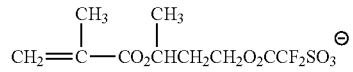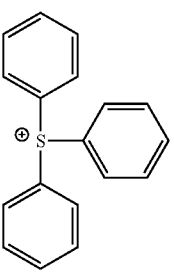
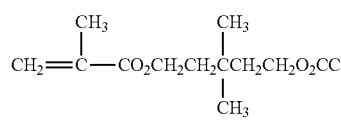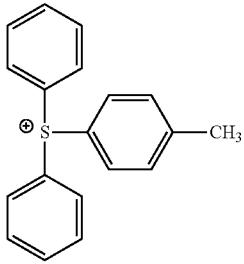

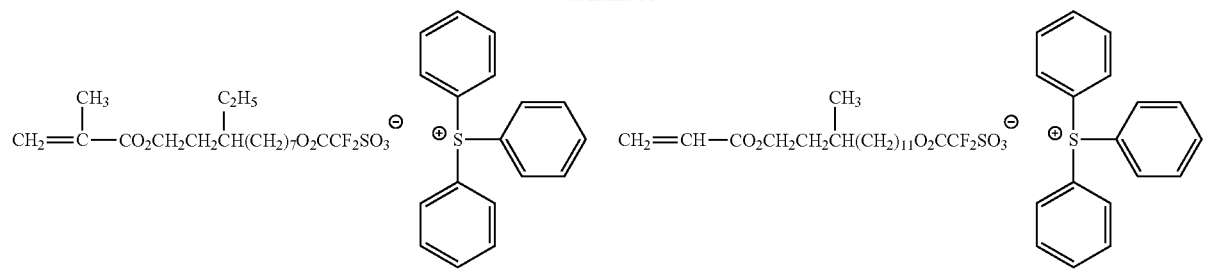
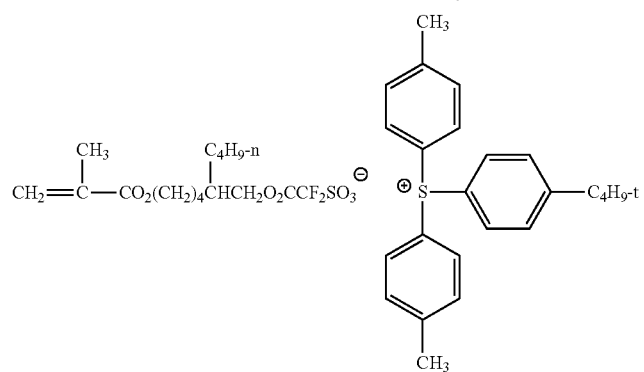
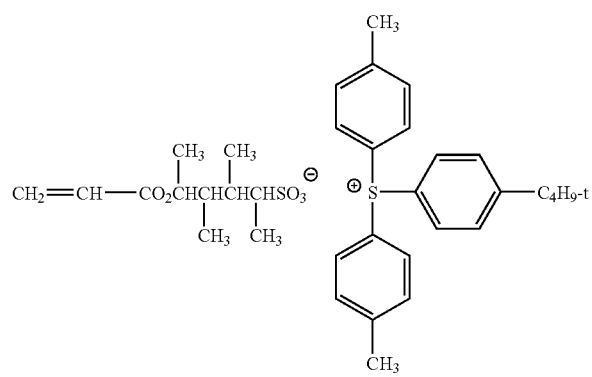
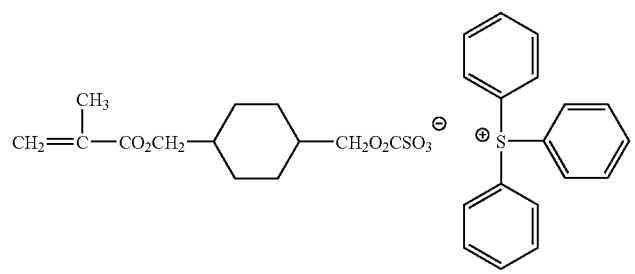
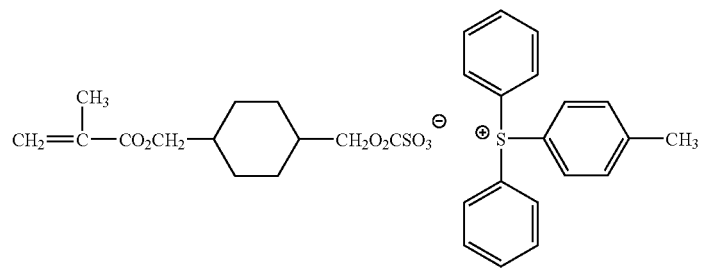

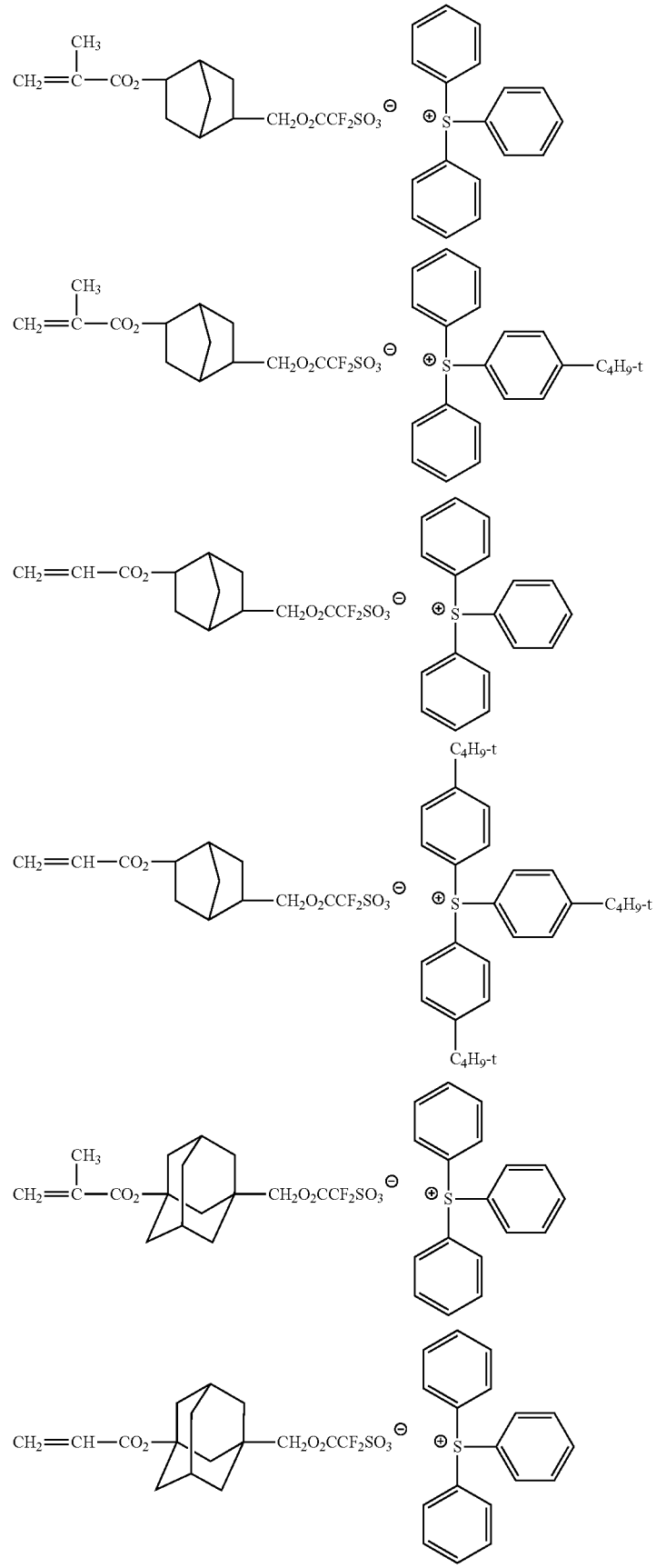

-continued
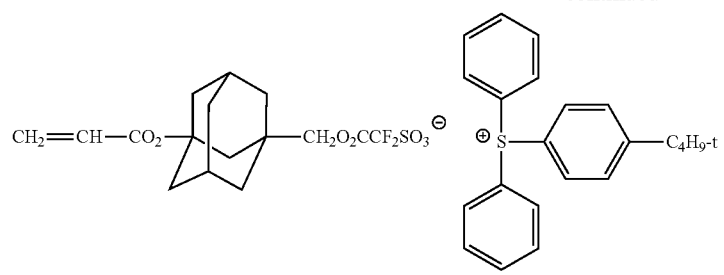
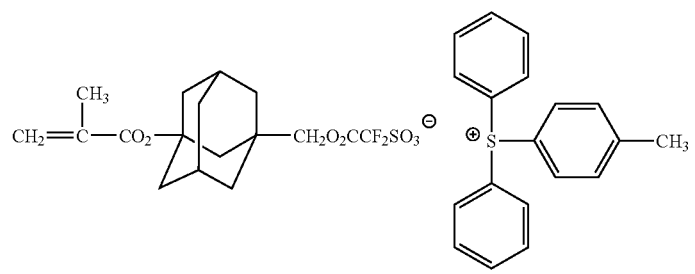
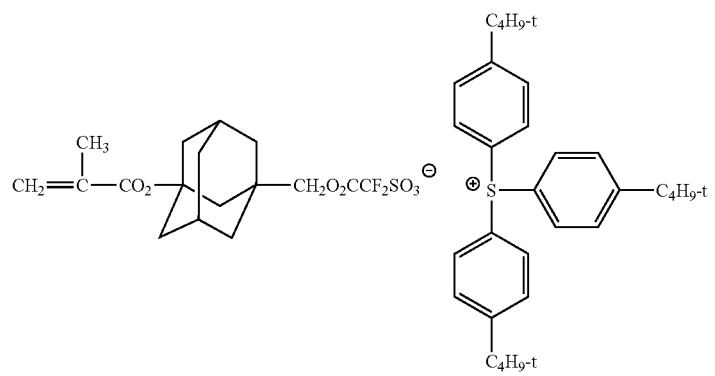
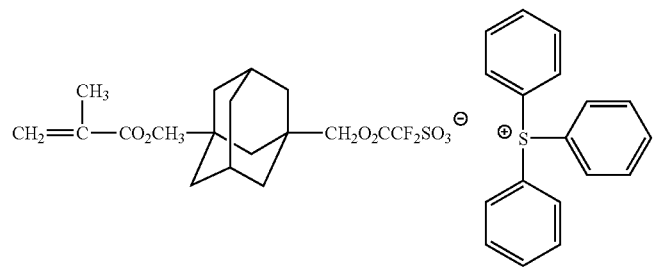
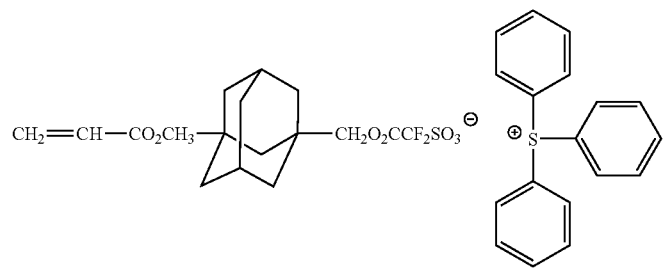

-continued
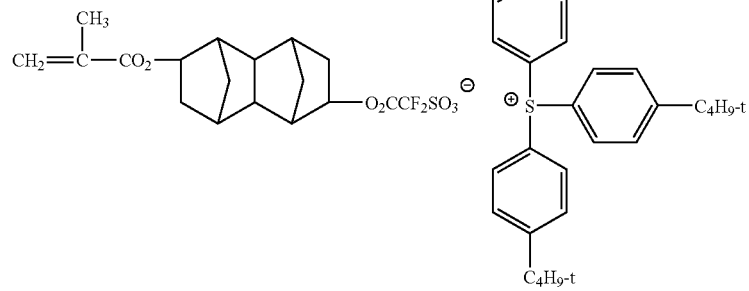
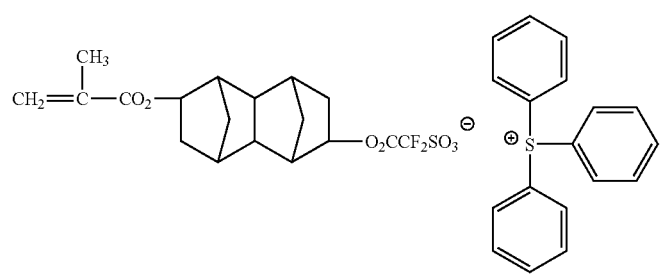
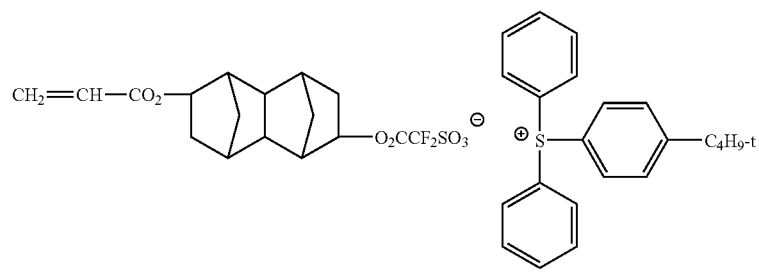
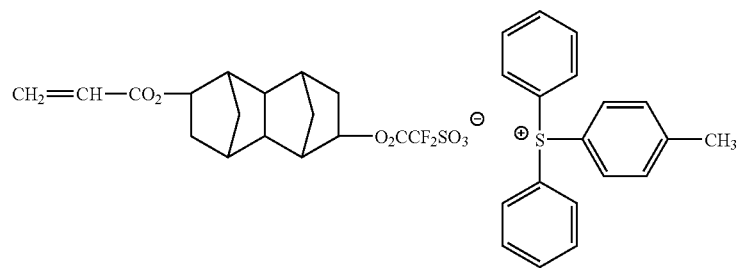
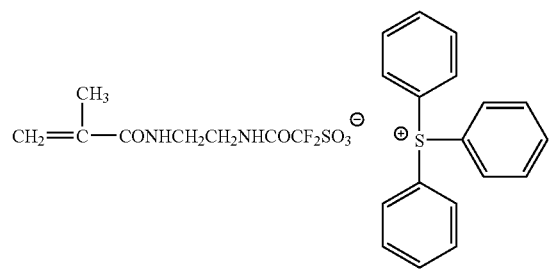
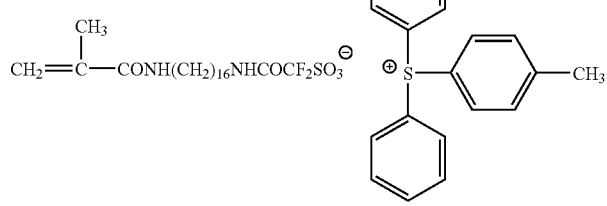

-continued
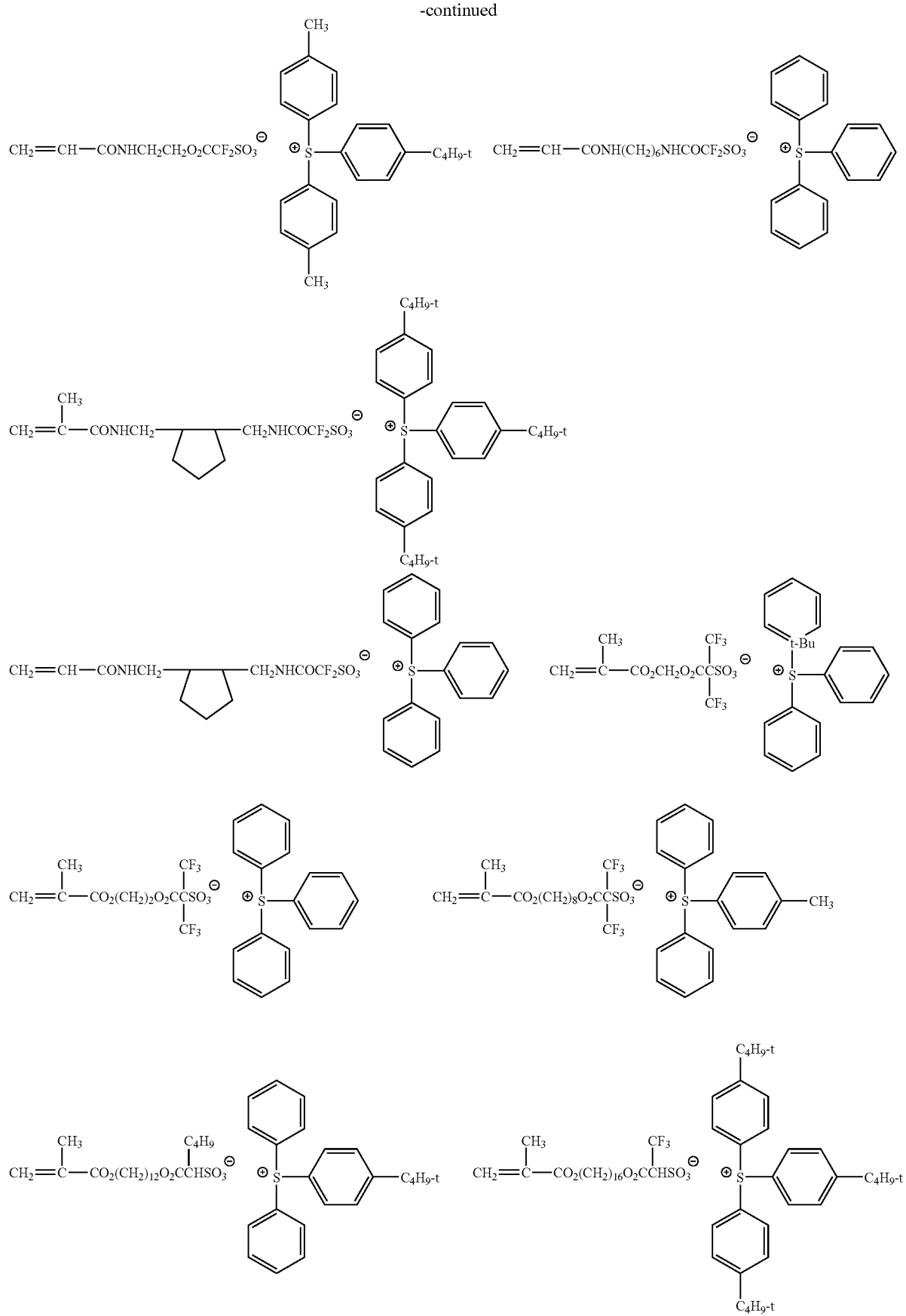

-continued
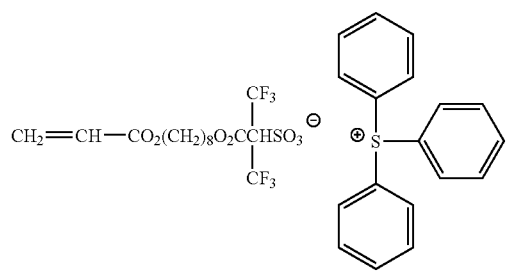
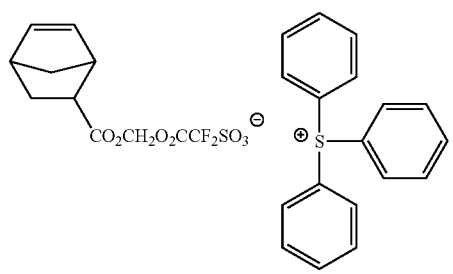
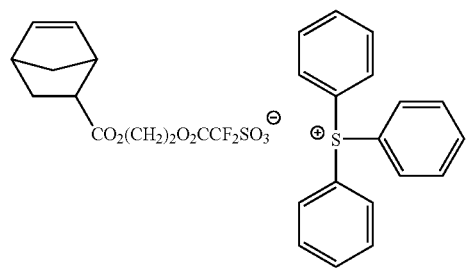
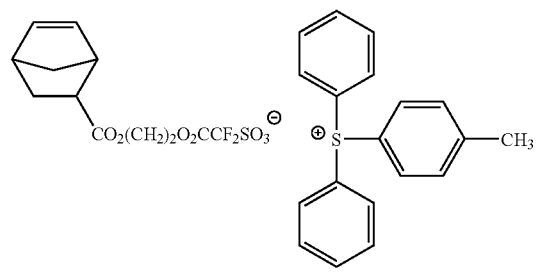
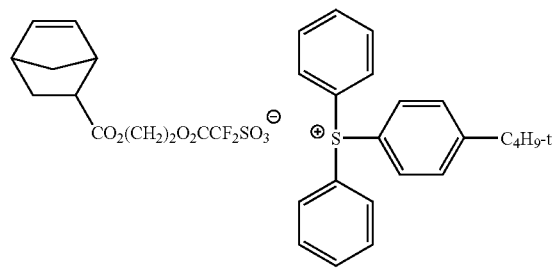
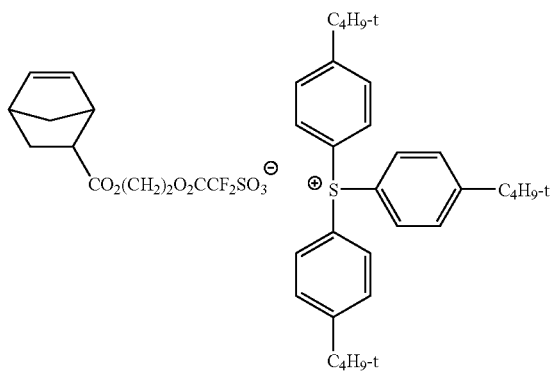
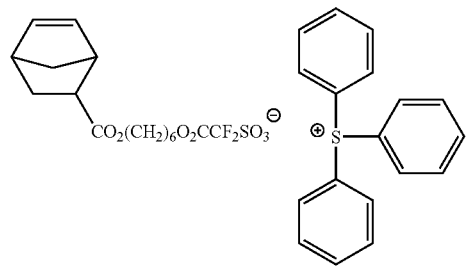
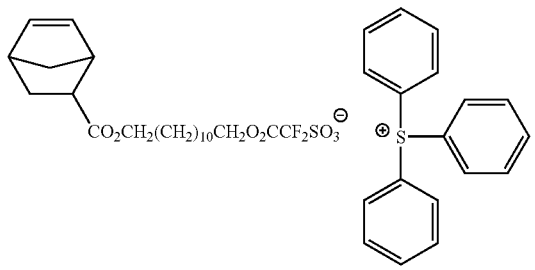
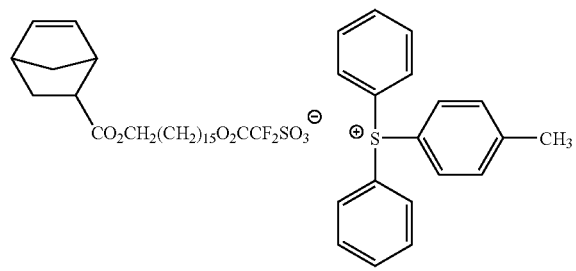
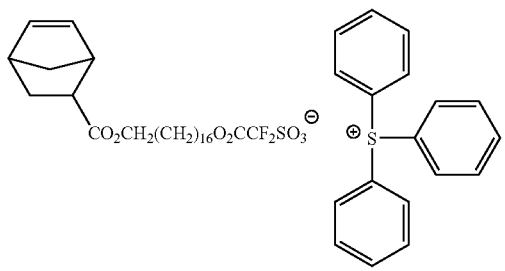

-continued
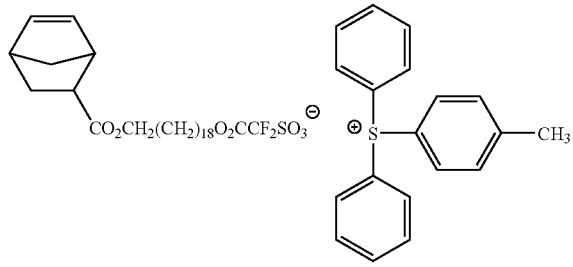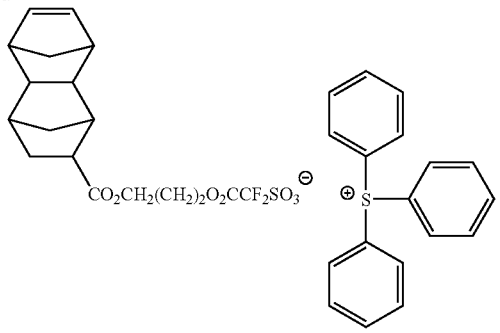
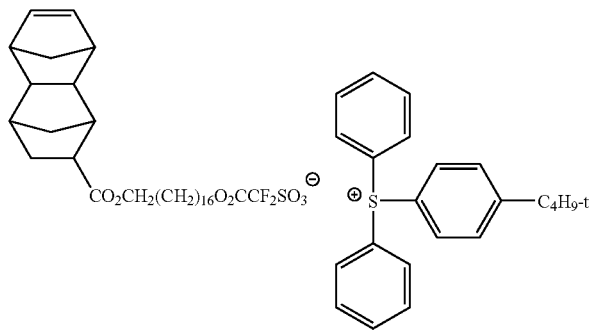
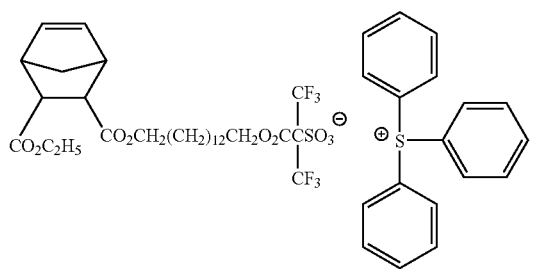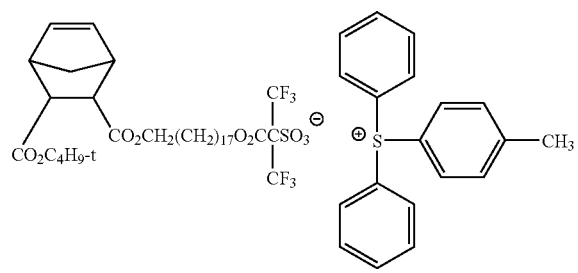
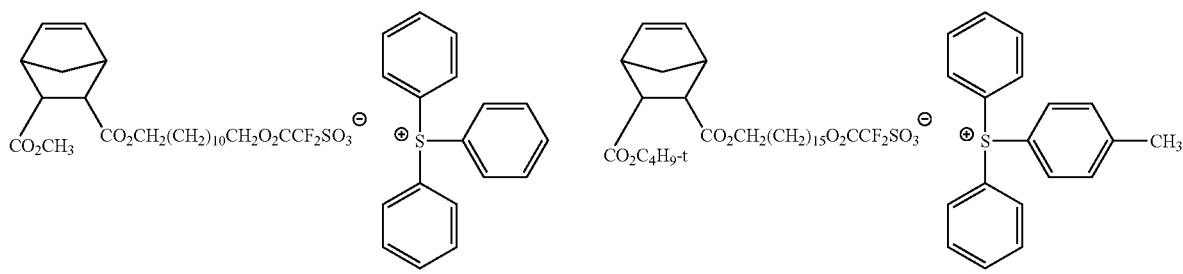
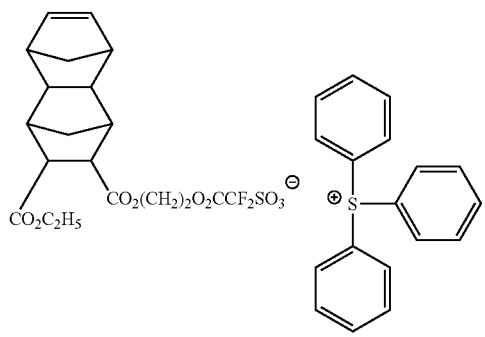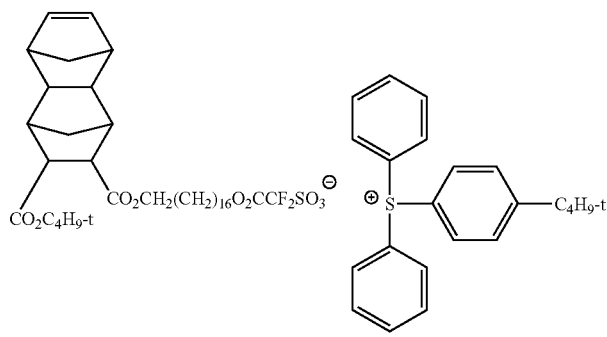

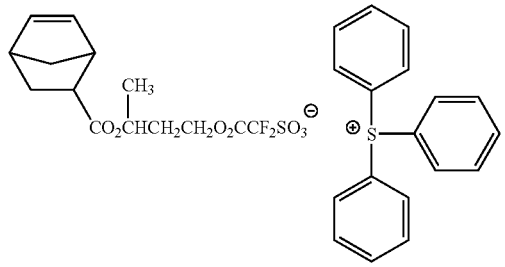
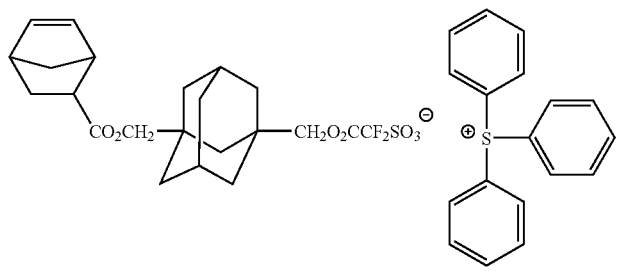
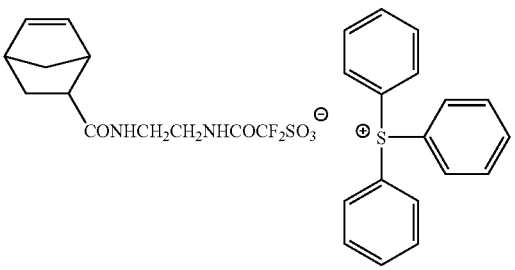
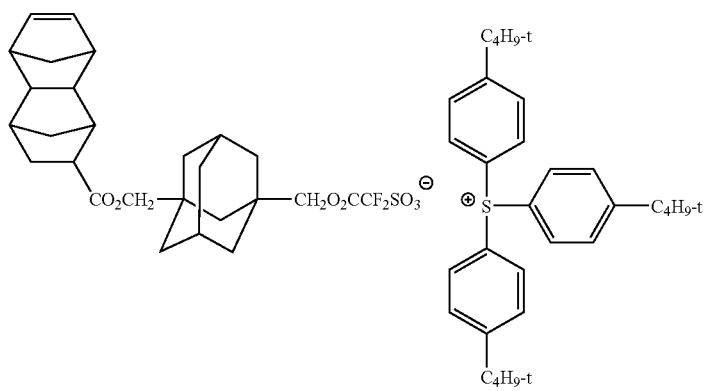
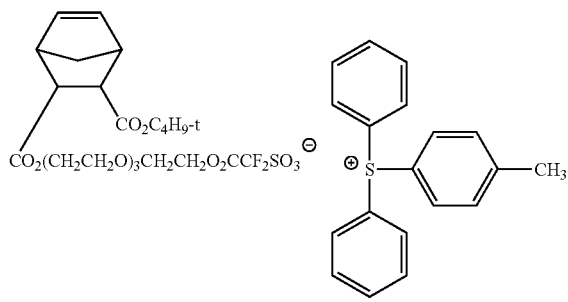
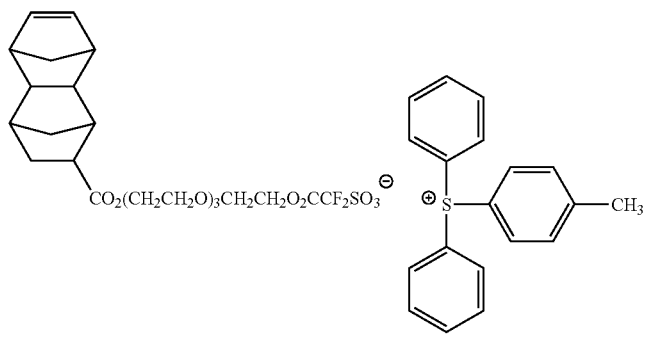
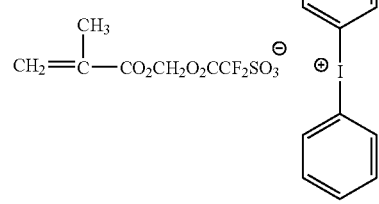

-continued
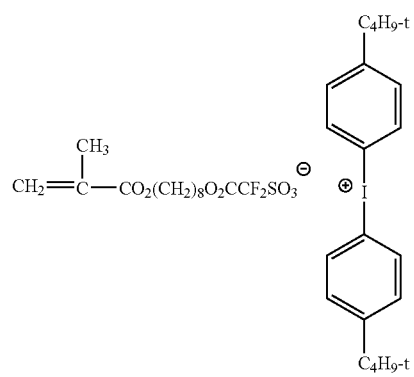
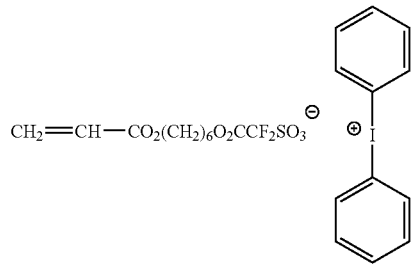
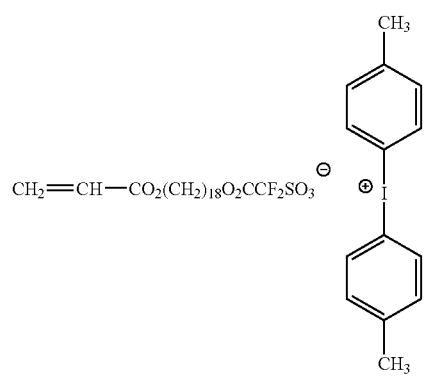
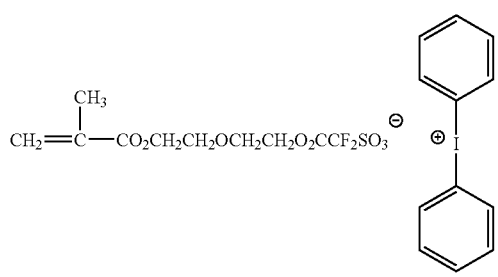
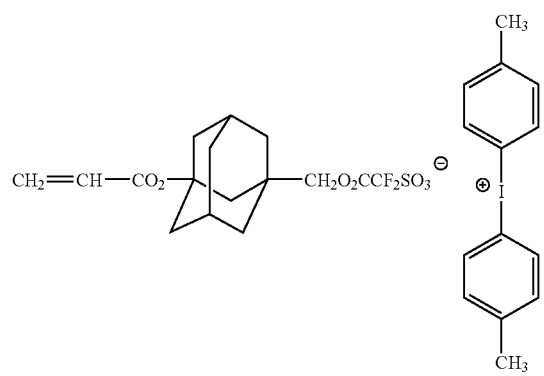
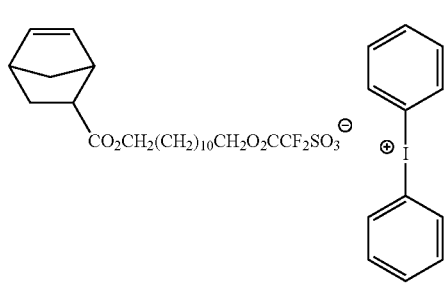
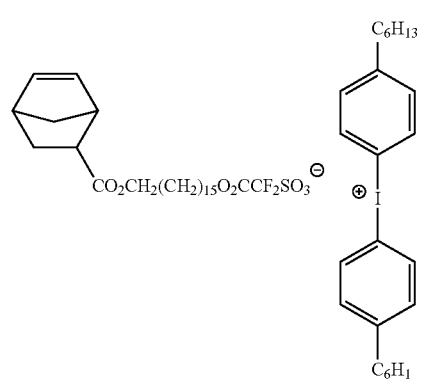
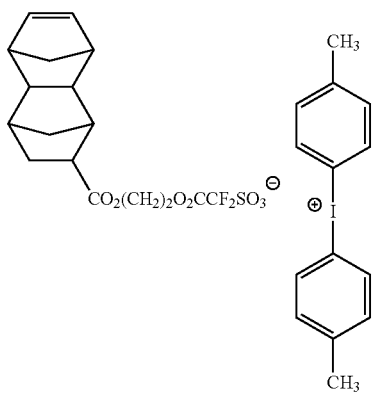

-continued

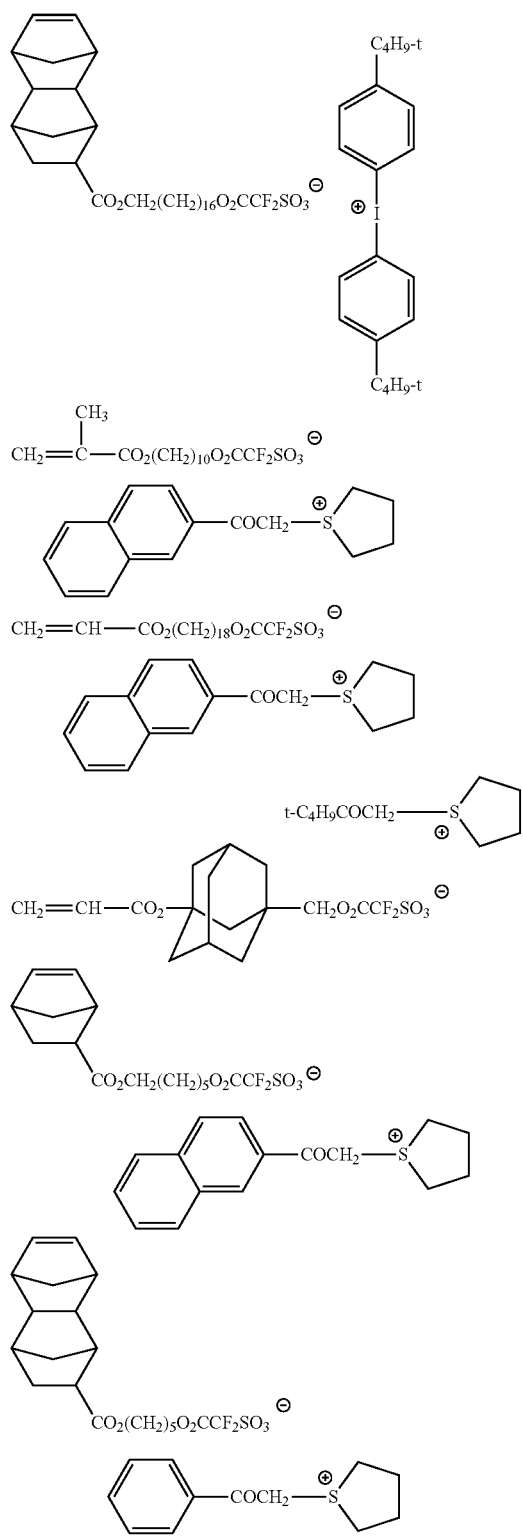
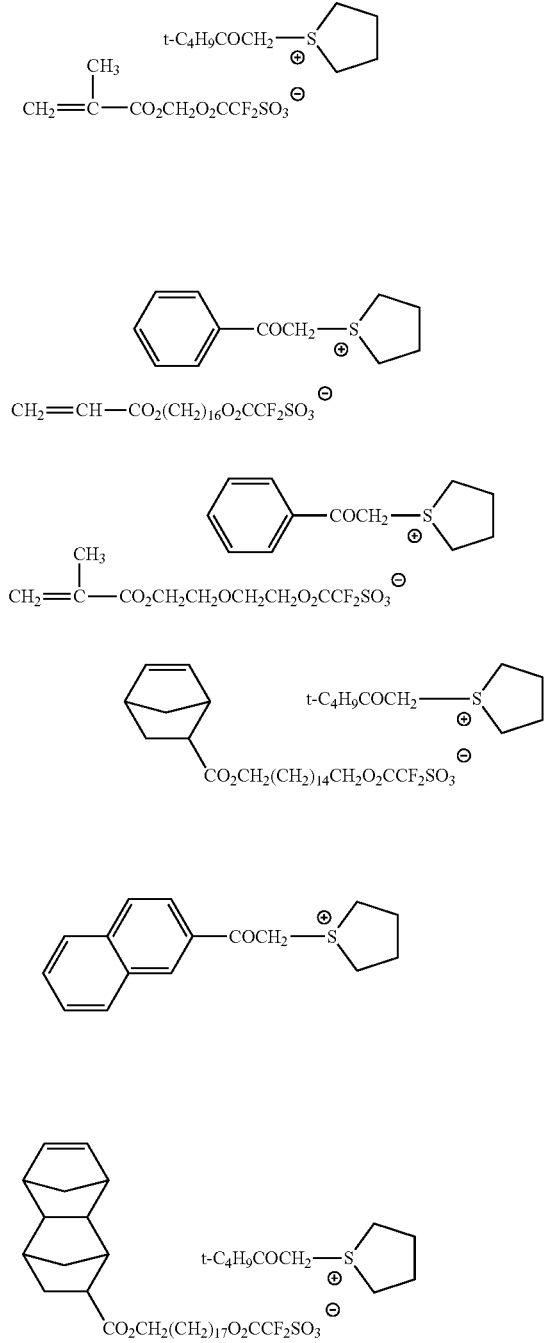

The polymerization reaction is usually carried out in the presence of a radical initiator. The radical initiator is not limited and examples thereof include an azo compound such as 2,2'-azobisisobutyronitrile, 2,2'-azobis(2-methylbutyronitrile), 1,1'-azobis(cyclohexane-1-carbonitrile), 2,2'-azobis(2,4-dimethylvaleronitrile), 2,2'-azobis(2,4-dimethyl-4-methoxyvaleronitrile), dimethyl-2,2'-azobis(2-methylpropionate) and 2,2'-azobis(2-hydroxymethylpropionitrile); an organic hydroperoxide such as lauroyl peroxide, tert-butyl hydroperoxide, benzoyl peroxide, tert-butyl peroxybenzoate, cumene hydroperoxide, diisopropyl peroxydicarbonate, di-n-propyl peroxydicarbonate, tert-butyl peroxyneodecanoate, tert-butyl peroxypivalate and 3,5,5-trimethylhexanoyl peroxide; and an inorganic peroxide such as potassium peroxodisulfate, ammonium peroxodisulfate and hydrogen peroxide.

The amount of the radical initiator is preferably 1 to 20 mol % based on all monomer or oligomer molar amount.

The polymerization temperature is usually 0 to 150° C., and preferably 40 to 100° C.

The polymerization reaction is usually carried out in the presence of a solvent and it is preferred to use a solvent which is sufficient to dissolve the monomer, the radical initiator and the resin obtained. Examples thereof include a hydrocarbon solvent such as toluene; an ether solvent such as 1,4-dioxane and tetrahydrofuran; a ketone solvent such as methyl isobutyl ketone; an alcohol solvent such as isopropyl alcohol; a cyclic ester solvent such as γ-butyrolactone; a glycol ether ester solvent such as propyleneglycol monomethyl ether acetate; and an acyclic ester solvent such as ethyl lactate. These solvents may be used alone and a mixture thereof may be used.

The amount of the solvent is not limited, and practically, it is preferably 1 to 5 parts by weight relative to 1 part of all monomers or oligomers.

After competition of the polymerization reaction, the resin produced can be isolated, for example, by adding a solvent in which the present resin is insoluble or poorly soluble to the reaction mixture obtained and filtering the precipitated resin. If necessary, the isolated resin may be purified, for example, by washing with a suitable solvent.

The optionally substituted acrylic compound represented represented by the formula (Va) can be produced by reacting a compound represented by the formula (VIa):

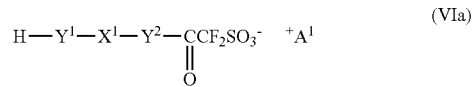

(VIa)

wherein $X^1$, $Y^1$, $Y^2$ and $^+A^1$ are the same as defined above, with a compound represented by the formula (VII):

(VII)

wherein $R^1$ is the same as defined above and $X^3$ represents a halogen atom.

The compound represented by the formula (VIa) can be produced, for example, according to the method described in JP 2006-257078 A. The compound represented by the formula (VII) is commercially available.

The amount of the compound represented by the formula (VII) to be used is usually 1 to 2 moles, preferably 1 to 1.5 moles relative to 1 mole of the compound represented by the formula (VIa).

The reaction of the compound represented by the formula (VIa) and the compound represented by the formula (VII) is usually carried out in the presence of a solvent. The solvent is not particularly limited as far as an inert solvent and examples thereof include an aromatic hydrocarbon solvent such as toluene and xylene; an ether solvent such as tetrahydrofuran; a halogenated hydrocarbon solvent such as chloroform and chlorobenzene; and an aprotic polar solvent such as N,N-dimethylformamide, dimethylsulfoxide. The amount of the solvent to be used is not particularly limited.

The reaction temperature is usually −30 to 200° C., preferably 0 to 150° C.

The reaction may be carried out in the presence of a base. Examples of the base include an organic base such as triethylamine, pyridine and 1-methylpyrrolidine; and an inorganic base such as sodium hydride, potassium carbonate and sodium hydroxide. These bases may be used alone and the mixture thereof may be used. The amount of the base to be used is usually 1 to 5 moles, preferably 1 to 3 moles relative to 1 mole of the compound represented by the formula (VIa).

The reaction may be also carried out in the presence of a phase transfer catalyst such as tetrabutylammonium bromide.

After competition of the reaction, the optionally substituted acrylic compound represented by the formula (Va) can be isolated, for example, by adding water and if necessary, a water-insoluble solvent to conducting extraction treatment, followed by concentrating the resulting organic layer. The optionally substituted acrylic compound represented by the formula (Va) isolated may be further purified by a conventional purification means such as chromatography, recrystalyzation and distillation.

The alicyclic compound represented by the formula (Vb) can be also produced according to the above-mentioned method.

Next, the present chemically amplified positive resist composition will be illustrated.

In the case that the present resin has the structural unit having the acid-labile group, the present chemically amplified positive resist composition comprises the present resin, preferably the present resin and the other resin containing a structural unit having an acid-labile group and no carbon-carbon unsaturated bond which itself is insoluble or poorly soluble in an alkali aqueous solution but becomes soluble in an alkali aqueous solution by the action of an acid.

In the case of the present resin has not the structural unit having the acid-labile group, the present chemically amplified positive resist composition comprises the present resin and the other resin containing a structural unit having an acid-labile group and no carbon-carbon unsaturated bond which itself is insoluble or poorly soluble in an alkali aqueous solution but becomes soluble in an alkali aqueous solution by the action of an acid. The other resin preferably contains a structural unit having a lactone ring and no carbon-carbon unsaturated bond and a structural unit having a hydroxyl group and no carbon-carbon unsaturated bond.

The present resin usually acts as an acid generator, and the acid generated by irradiation to the resin catalytically acts against acid-labile group in the present resin or the other resin, cleaves the acid-labile group, and the present resin or the other resin becomes soluble in an alkali aqueous solution.

Examples of the other resin containing a structural unit having an acid-labile group and no carbon-carbon unsaturated bond used in the present composition include a resin containing the structural unit having the acid-labile group described above, and preferred examples thereof include a resin containing the structural unit having the acid-labile group described above, the structural unit having the lactone ring described above and the structural unit having the hydroxyl group described above.

Preferred examples of the structural unit of the other resin include the followings:

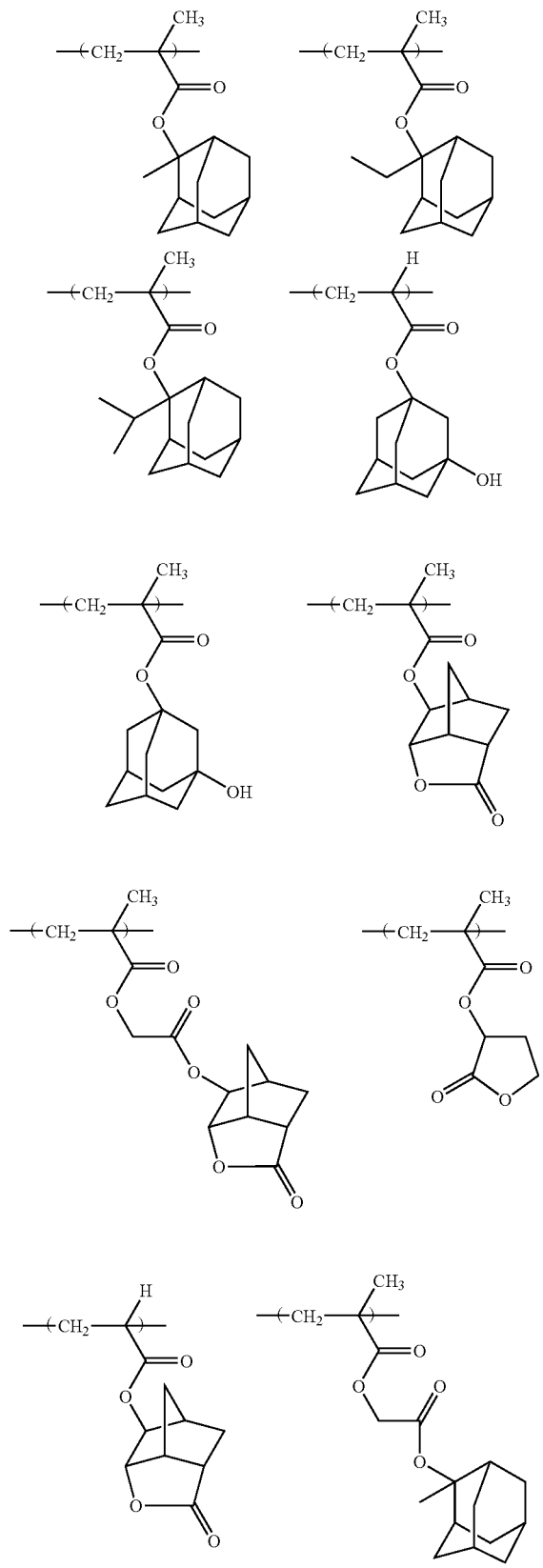

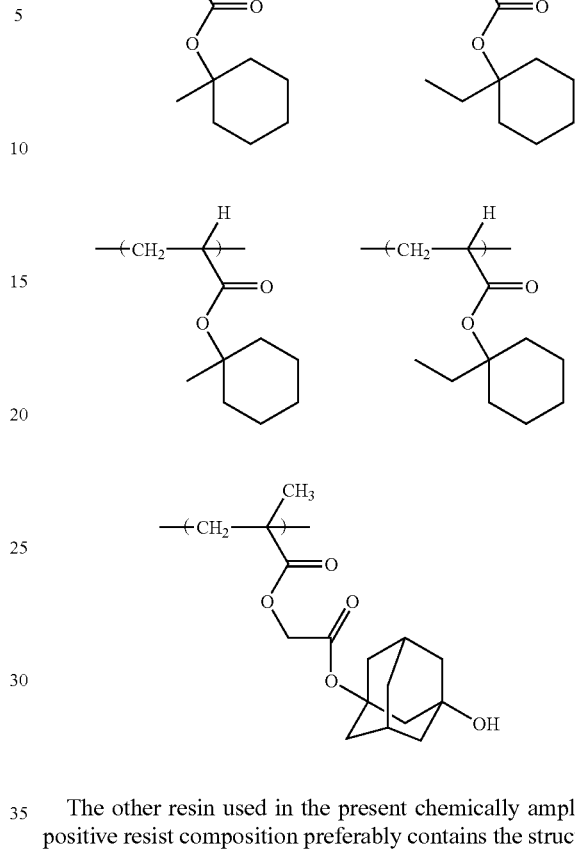

The other resin used in the present chemically amplified positive resist composition preferably contains the structural unit having the acid-labile group generally in a ratio of 10 to 80% by mol in all structural units of the other resin though the ratio varies depending on the kind of radiation for patterning exposure and the kind of the acid-labile group.

The present chemically amplified positive resist composition containing the present resin and the other resin usually contains the present resin in an amount of 1 to 100% by weight and the other resin in an amount of 0 to 99% by weight based on the total amount of the resin component, herein the resin component means the present resin and the other resin. It is preferred that the present chemically amplified positive resist composition contains the present resin in an amount of 10 to 90% by weight and the other resin in an amount of 10 to 90% by weight based on the total amount of the resin component, and it is more preferred that the present chemically amplified positive resist composition contains the present resin in an amount of 30 to 70% by weight and the other resin in an amount of 30 to 70% by weight based on the total amount of the resin component.

The other resin can be produced by polymerizing the corresponding monomer or monomers.

In the present resist composition, performance deterioration caused by inactivation of acid which occurs due to post exposure delay can be diminished by adding an organic base compound, particularly a nitrogen-containing organic base compound as a quencher.

Specific examples of the nitrogen-containing organic base compound include an amine compound represented by the following formulae:

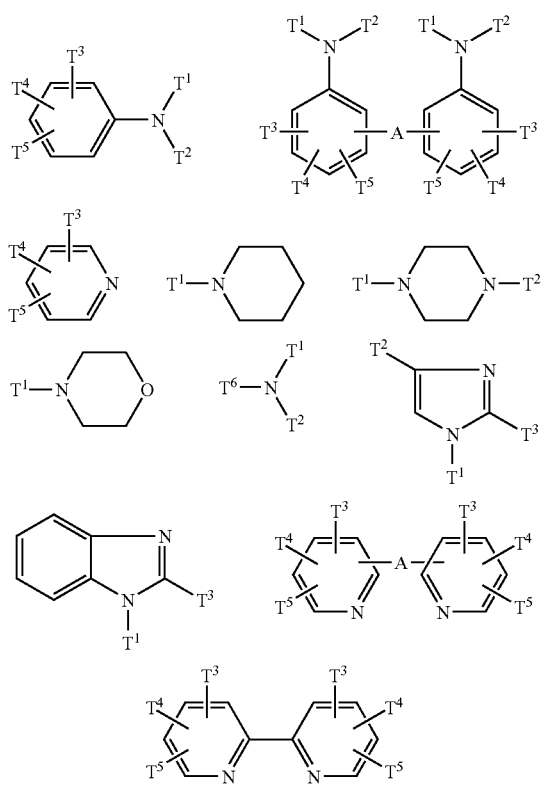

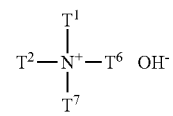

and a quaternary ammonium hydroxide represented by the following formula:

$$T^2-\underset{\underset{T^7}{|}}{\overset{\overset{T^1}{|}}{N^+}}-T^6 \quad OH^-$$

wherein $T^1$, $T^2$ and $T^6$ are the same as defined above, and $T^7$ represents a hydrogen atom, an alkyl group, a cycloalkyl group or an aryl group, and the alkyl and cycloalkyl groups are optionally substituted with at least one group selected from a hydroxyl group, an amino group which is optionally substituted with a C1-C4 alkyl group and a C1-C6 alkoxy group, and the aryl group is optionally substituted with at least one group selected from a hydroxyl group, an amino group which is optionally substituted with a C1-C4 alkyl group, a C1-C6 alkoxy group and a C1-C4 perfluoroalkyl group.

The alkyl group in $T^1$, $T^2$, $T^3$, $T^4$, $T^5$, $T^6$ and $T^7$ preferably has about 1 to 10 carbon atoms, and more preferably has about 1 to 6 carbon atoms.

Examples of the amino group which is optionally substituted with the C1-C4 alkyl group include an amino, methylamino, ethylamino, n-butylamino, dimethylamino and diethylamino group. Examples of the C1-C6 alkoxy group which is optionally substituted with the C1-C6 alkoxy group include a methoxy, ethoxy, n-propoxy, isopropoxy, n-butoxy, tert-butoxy, n-pentyloxy, n-hexyloxy and 2-methoxyethoxy group.

Specific examples of the alkyl group which is optionally substituted with at least one group selected from a hydroxyl group, an amino group which is optionally substituted with a C1-C4 alkyl group, and a C1-C6 alkoxy group which is optionally substituted with a C1-C6 alkoxy group include a methyl, ethyl, n-propyl, isopropyl, n-butyl, tert-butyl, n-pentyl, n-hexyl, n-octyl, n-nonyl, n-decyl, 2-(2-methoxyethoxy)ethyl, 2-hydroxyethyl, 2-hydroxypropyl, 2-aminoethyl, 4-aminobutyl and 6-aminohexyl group.

The cycloalkyl group in $T^1$, $T^2$, $T^3$, $T^4$, $T^5$, $T^6$ and $T^7$ preferably has about 5 to 10 carbon atoms. Specific examples of the cycloalkyl group which is optionally substituted with at least one group selected from a hydroxyl group, an amino group which is optionally substituted with a C1-C4 alkyl group and a C1-C6 alkoxy group include a cyclopentyl, cyclohexyl, cycloheptyl and cyclooctyl group.

The aryl group in $T^1$, $T^2$, $T^3$, $T^4$ and $T^5$ preferably has about 6 to 10 carbon atoms. Specific examples of the aryl group which is optionally substituted with at least one group selected from a hydroxyl group, an amino group which is optionally substituted with a C1-C4 alkyl group and a C1-C6 alkoxy group include a phenyl and naphthyl group.

The aryl group in $T^7$ preferably has about 6 to 10 carbon atoms. Specific examples of the aryl group which is optionally substituted with at least one group selected from a hydroxyl group, an amino group which is optionally substituted with a C1-C4 alkyl group, a C1-C6 alkoxy group and a C1-C4 perfluoroalkyl group include a phenyl, naphthyl and 3-trifluoromethylphenyl group.

The alkoxy group in $T^3$, $T^4$ and $T^5$ preferably has about 1 to 6 carbon atoms and specific examples thereof include a methoxy, ethoxy, n-propoxy, isopropoxy, n-butoxy, tert-butoxy, n-pentyloxy, n-hexyloxy group.

The alkylene and alkenylene groups in A preferably have 2 to 6 carbon atoms. Specific examples of the alkylene group wherein $T^1$ and $T^2$ independently represent a hydrogen atom, an alkyl group, a cycloalkyl group or an aryl group, and the alkyl, cycloalkyl and aryl groups are optionally substituted with at least one group selected from a hydroxyl group, an amino group which is optionally substituted with a C1-C4 alkyl group and a C1-C6 alkoxy group which is optionally substituted with a C1-C6 alkoxy group, $T^3$ and $T^4$ independently represent a hydrogen atom, an alkyl group, a cycloalkyl group, an aryl group or an alkoxy group, and the alkyl, cycloalkyl, aryl and alkoxy groups are optionally substituted with at least one group selected from a hydroxyl group, an amino group which is optionally substituted with a C1-C4 alkyl group and a C1-C6 alkoxy group, or $T^3$ and $T^4$ bond together with the carbon atoms to which they bond to form an aromatic ring, $T^5$ represent a hydrogen atom, an alkyl group, a cycloalkyl group, an aryl group, an alkoxy group or a nitro group, and the alkyl, cycloalkyl, aryl and alkoxy groups are optionally substituted with at least one group selected from a hydroxyl group, an amino group which is optionally substituted with a C1-C4 alkyl group and a C1-C6 alkoxy group, $T^6$ represents an alkyl or cycloalkyl group, and the alkyl and cycloalkyl groups are optionally substituted with at least one group selected from a hydroxyl group, an amino group which is optionally substituted with a C1-C4 alkyl group and a C1-C6 alkoxy group, and A represents —CO—, —NH—, —S—, —S—S—, an alkylene group of which at least one methylene group is optionally replaced with —O—, or an alkenylene group of which at least one methylene group is optionally replaced with —O—, include an ethylene, trimethylene, tetramethylene, methylenedioxy and ethylene-1,2-dioxy group, and specific examples of the alkenylene group include an ethane-1,2-diyl, 1-propene-1,3-diyl and 2-butene-1,4-diyl group.

Specific examples of the amine compound include n-hexylamine, n-heptylamine, n-octylamine, n-nonylamine, n-decylamine, aniline, 2-methylaniline, 3-methylaniline, 4-methylaniline, 4-nitroaniline, 1-naphthylamine, 2-naphthylamine, ethylenediamine, tetramethylenediamine, hexamethylendiamine, 4,4'-diamino-1,2-diphenylethane, 4,4'-diamino-3,3'-dimethyldiphenylmethane, 4,4'-diamino-3,3'-diethyldiphenylmethane, dibutylamine, dipentylamine, dihexylamine, diheptyamine, dioctylamine, dinonylamine, didecylamine, N-methylaniline, piperidine, diphenylamine, triethylamine, trimethylamine, tripropylamine, tributylamine, tripentylamine, trihexylamine, triheptylamine, trioctylamine, trinonylamine, tridecylamine, methyldibutylamine, methyldipentylamine, methyldihexylamine, methyldicyclohexylamine, methyldiheptylamine, methyldioctylamine, methyldinonylamine, methyldidecylamine, ethyldibutylamine, ethyldipentylamine, ethyldihexylamine, ethyldiheptylamine, ethyldioctylamine, ethyldinonylamine, ethyldidecyamine, dicyclohexylmethylamine, tris[2-(2-methoxyethoxy)ethyl]amine, triisopuropanolamine, N,N-dimethylaniline, 2,6-diisopropylaniline, imidazole, benzimidazole, pyridine, 4-methylpyridine, 4-methylimidazole, bipyridine, 2,2'-dipyridylamine, di-2-pyridyl ketone, 1,2-di(2-pyridyl)ethane, 1,2-di(4-pyridyl)ethane, 1,3-di(4-pyridyl)propane, 1,2-bis(2-pyridyl)ethylene, 1,2-bis(4-pyridyl)ethylene, 1,2-bis(4-pyridyloxy)ethane, 4,4'-dipyridyl sulfide, 4,4'-dipyridyl disulfide, 1,2-bis(4-pyridyl)ethylene, 2,2'-dipicolylamine and 3,3'-dipicolylamine.

Examples of the quaternary ammonium hydroxide include tetramethylammonium hydroxide, tetrabutylammonium hydroxide, tetrahexylammonium hydroxide, tetraoctylammonium hydroxide, phenyltrimethylammonium hydroxide, (3-trifluoromethylphenyl)trimethylammonium hydroxide and (2-hydroxyethyl)trimethylammonium hydroxide (so-called "choline").

A hindered amine compound having a piperidine skelton as disclosed in JP 11-52575 A1 can be also used as the quencher.

In the point of forming patterns having higher resolution, the quaternary ammonium hydroxide is preferably used as the quencher.

The present resist composition preferably includes 0.01 to 10% by weight of the quencher based on the amount of the resin component.

The present resist composition may include an acid generator other than the present resin. Examples of the acid generator include an onium salt compound, an organic halide compound, a sulfone compound and a sulfonate compound.

Examples of the onium salt compound include diphenyliodonium trifluoromethanesulfonate, 4-methoxyphenylphenyliodonium hexafluoroantimonate, 4-methoxyphenylphenyliodonium trifluoromethanesulfonate, bis(4-tert-butylphenyl)iodonium tetrafluoroborate, bis(4-tert-butylphenyl)iodonium hexafluorophosphate, bis(4-tert-butylphenyl)iodonium hexafluoroantimonate, bis(4-tert-butylphenyl)iodonium trifluoromethanesulfonate, triphenylsulfonium hexafluorophosphate, triphenylsulfonium hexafluoroantimonate, triphenylsulfonium adamantanemethoxycarbonyldifluoromethanesulfonate, triphenylsulfonium 1-(3-hydroxymethyladamantane)methoxycarbonyldifluoromethanesulfonate, triphenylsulfonium 1-(hexahydro-2-oxo-3,5-methano-2H-cyclopenta[b]furan-6-yloxycarbonyl)difluoromethanesulfonate, triphenylsulfonium 4-oxo-1-adamantyloxycarbonyldifluoromethanesulfonate, triphenylsulfonium 3-hydroxy-1-adamantylmethoxycarbonyldifluoromethanesulfonate, 4-methoxyphenyldiphenylsulfonium hexafluoroantimonate, 4-methoxyphenyldiphenylsulfonium trifluoromethanesulfonate, p-tolyldiphenylsulfonium trifluoromethanesulfonate, p-tolyldiphenylsulfonium heptadecafluorooctanesulfonate, 2,4,6-trimethylphenyldiphenylsulfonium trifluoromethanesulfonate, 4-tert-butylphenyldiphenylsulfonium trifluoromethanesulfonate, 4-phenylthiophenyldiphenylsulfonium hexafluorophosphate, 4-phenylthiophenyldiphenylsulfonium hexafluoroantimonate, 1-(2-naphthoylmethyl)thiolanium hexafluoroantimonate, 1-(2-naphthoylmethyl)thiolanium trifluoromethanesulfonate, 4-hydroxy-1-naphthyldimethylsulfonium hexafluoroantimonate and 4-hydroxy-1-naphthyldimethylsulfonium trifluoromethanesulfonate.

Examples of the organic halide compound include 2-methyl-4,6-bis(trichloromethyl)-1,3,5-triazine, 2,4,6-tris(trichloromethyl)-1,3,5-triazine, 2-phenyl-4,6-bis(trichloromethyl)-1,3,5-triazine, 2-(4-chlorophenyl)-4,6-bis(trichloromethyl)-1,3,5-triazine, 2-(4-methoxyphenyl)-4,6-bis(trichloromethyl)-1,3,5-triazine, 2-(4-methoxy-1-naphthyl)-4,6-bis(trichloromethyl)-1,3,5-triazine, 2-(benzo[d][1,3]dioxoran-5-yl)-4,6-bis(trichloromethyl)-1,3,5-triazine, 2-(4-methoxystyryl)-4,6-bis(trichloromethyl)-1,3,5-triazine, 2-(3,4,5-trimethoxystyryl)-4,6-bis(trichloromethyl)-1,3,5-triazine, 2-(3,4-dimethoxystyryl)-4,6-bis(trichloromethyl)-1,3,5-triazine, 2-(2,4-dimethoxyxtyryl)-4,6-bis(trichloromethyl)-1,3-triazine, 2-(2-methoxystyryl)-4,6-bis(trichloromethyl)-1,3,5-triazine, 2-(4-butoxystyryl)-4,6-bis(trichloromethyl)-1,3,5-triazine and 2-(4-pentyloxystyryl)-4,6-bis(trichloromethyl)-1,3,5-triazine.

Examples of the sulfone compound include diphenyl sulfone, di-p-tolyl sulfone, bis(phenylsulfonyl)diazomethane, bis(4-chlorophenylsulfonyl)diazomethane, bis(p-tolylsulfonyl)diazomethane, bis(4-tert-butylphenylsulfonyl)diazomethane, bis(2,4-xylylsulfonyl)diazomethane, bis(cyclohexylsulfonyl)diazomethane, (benzoyl)(phenylsulfonyl)diazomethane, N-(phenylsulfonyloxy)succinimide, N-(trifluoromethylsulfonyloxy)succinimide, N-(trifluoromethylsulfonyloxy)phthalimide, N-(trifluoromethylsulfonyloxy)-5-norbornene-2,3-dicarbodiimide, N-(trifluoromethylsulfonyloxy)naphthalimide and N-(10-canmphorsurufonyloxy)naphthalimide.

Examples of the sulfonate compound include 1-benzoyl-1-phenylmethyl p-toluenesulfonate, 2-benzoyl-2-hydroxy-2-phenylethyl o-toluenesulfonate, 1,2,3-benzenetriyl tris-methansulfonate, 2,6-dinitrobenzyl p-toluenesulfonate, 2-nitrobenzyl p-toluenesulfonate and 4-nitrobenzyl p-toluenesulfonate.

The present resist composition preferably includes 0.1 to 50% by weight of the other acid generator based on the amount of the resin component.

The present resist composition can contain, if necessary, a small amount of various additives such as a sensitizer, a solution suppressing agent, other polymers, a surfactant, a stabilizer and a dye as long as the effect of the present invention is not prevented.

The present resist composition is usually in the form of a resist liquid composition in which the above-mentioned ingredients are dissolved in a solvent and the resist liquid composition is applied onto a substrate such as a silicon wafer by a conventional process such as spin coating. The solvent used is sufficient to dissolve the above-mentioned ingredients, have an adequate drying rate, and give a uniform and smooth coat after evaporation of the solvent. Solvents generally used in the art can be used.

Examples of the solvent include a glycol ether ester such as ethyl cellosolve acetate, methyl cellosolve acetate and propylene glycol monomethyl ether acetate; an acyclic ester such as ethyl lactate, butyl acetate, amyl acetate and ethyl pyruvate; a ketone such as acetone, methyl isobutyl ketone, 2-heptanone and cyclohexanone; and a cyclic ester such as γ-butyrolactone. These solvents may be used alone and two or more thereof may be mixed to use.

A resist film applied onto the substrate and then dried is subjected to exposure for patterning, then heat-treated to facilitate a deblocking reaction, and thereafter developed with an alkali developer. The alkali developer used may be any one of various alkaline aqueous solution used in the art. Generally, an aqueous solution of tetramethylammonium hydroxide or (2-hydroxyethyl)trimethylammonium hydroxide (commonly known as "choline") is often used.

It should be construed that embodiments disclosed here are examples in all aspects and not restrictive. It is intended that the scope of the present invention is determined not by the above descriptions but by appended Claims, and includes all variations of the equivalent meanings and ranges to the Claims.

The present invention will be described more specifically by Examples, which are not construed to limit the scope of the present invention. The "%" and "part(s)" used to represent the content of any component and the amount of any material to be used in the following Examples are on a weight basis unless otherwise specifically noted. The weight-average molecular weight of any material in the following Examples is a value found by gel permeation chromatography [Column (Total 3 Columns): TSKgel GMH$_{HR}$-H (φ7.8 mm×300 mm, 2 Columns) and G2500-H$_{HR}$ (φ7.8 mm×300 mm, 1 Column) manufactured by TOSOH CORPORATION, Solvent: chloroform, Flow rate: 1.0 mm/min., Detector: RI Detector/UV Detector (254 nm), Column Temperature: 40° C., Injection volume: 200 µl] using polystyrene as a standard reference material.

Structures of compounds obtained were determined by NMR (EX-270 Type, manufactured by JEOL LTD.) and mass spectrometry (Liquid Chromatography: 1100 Type manufactured by AGILENT TECHNOLOGIES LTD., Mass Spectrometry: LC/MSD Type or LC/MSD TOF Type manufactured by AGILENT TECHNOLOGIES LTD.).

Monomers used in Examples are following monomers A to I.

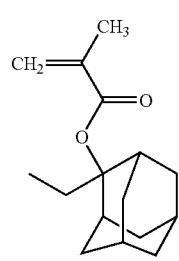

A

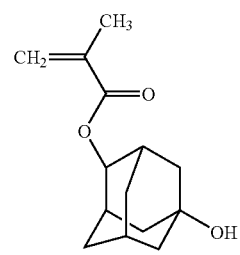

B

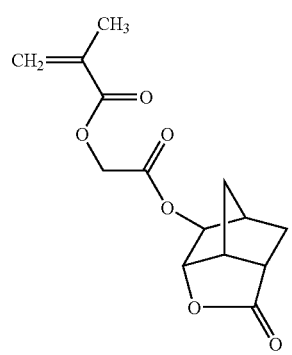

C

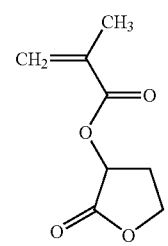

D

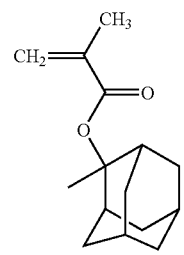

E

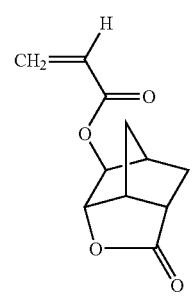

F

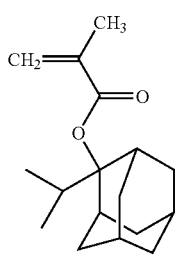

G

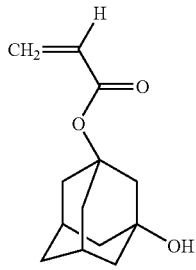

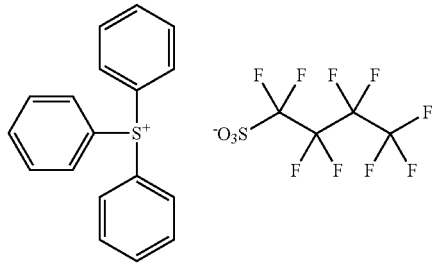 (unused position)

Acid generators, quenchers and solvents used in Examples are followings.

<Acid Generator>

Acid Generator B1: triphenylsulfonium perfuluorobutanesulfonate

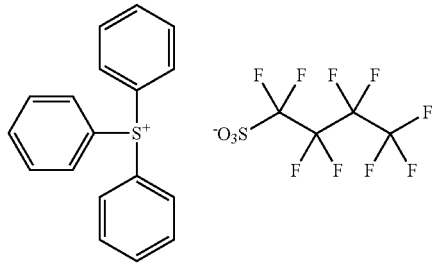

Acid Generator B2: triphenylsulfonium 4-oxo-1-adamantyloxycarbonyldifluoromethanesulfonate

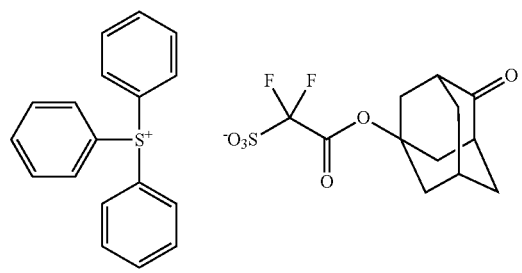

<Quencher>

Quencher Q1: tri-n-octylamine
Quencher Q2: 2,6-diisopropylaniline

<Solvent>

| Solvent Y1: | propylene glycol monomethyl ether acetate | 120.0 parts |
| --- | --- | --- |
|  | propylene glycol monomethyl ether | 60.0 parts |
|  | γ-butyrolactone | 20.0 parts |
| Solvent Y2: | propylene glycol monomethyl ether acetate | 100.0 parts |
|  | 2-heptanone | 25.0 parts |
|  | propylene glycol monomethyl ether | 20.0 parts |
|  | γ-butyrolactone | 9.0 parts |
| Solvent Y3: | propylene glycol monomethyl ether acetate | 130.0 parts |
|  | 2-heptanone | 25.0 parts |
|  | propylene glycol monomethyl ether | 20.0 parts |
|  | γ-butyrolactone | 10.0 parts |
| Solvent Y4: | propylene glycol monomethyl ether acetate | 110.0 parts |
|  | 2-heptanone | 25.0 parts |
|  | propylene glycol monomethyl ether | 20.0 parts |
|  | γ-butyrolactone | 15.0 parts |
| Solvent Y5: | propylene glycol monomethyl ether acetate | 120.0 parts |
|  | 2-heptanone | 20.0 parts |
|  | propylene glycol monomethyl ether | 40.0 parts |
|  | γ-butyrolactone | 15.0 parts |
| Solvent Y6: | propylene glycol monomethyl ether acetate | 90.0 parts |
|  | 2-heptanone | 20.0 parts |
|  | propylene glycol monomethyl ether | 60.0 parts |
|  | γ-butyrolactone | 25.0 parts |
| Solvent Y7: | propylene glycol monomethyl ether acetate | 120.0 parts |
|  | 2-heptanone | 20.0 parts |
|  | propylene glycol monomethyl ether | 40.0 parts |
|  | γ-butyrolactone | 60.0 parts |
| Solvent Y8: | propylene glycol monomethyl ether acetate | 110.0 parts |
|  | 2-heptanone | 20.0 parts |
|  | propylene glycol monomethyl ether | 80.0 parts |
|  | γ-butyrolactone | 40.0 parts |

MONOMER SYNTHESIS EXAMPLE 1

(1) Synthesis of triphenylsulfonium hydroxycarbonyldifluoromethanesulfonate

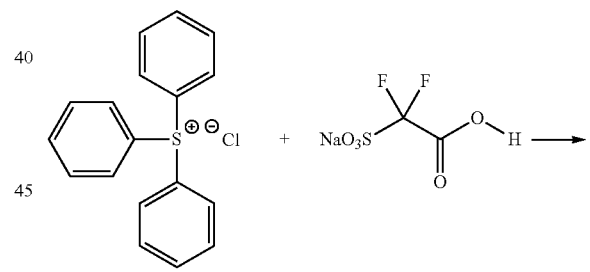

TPS-1

Into 2036 parts of 11.2% aqueous triphenylsulfonium chloride solution, 859 parts of 17.6% aqueous sodium difluorosulfoacetate solution was added and the resultant mixture was stirred at 25° C. for about 20 hours. The mixture was filtered to obtain white solid and white solid obtained was washed with 150 parts of ion-exchanged water. 506 Parts of tert-butyl methyl ether was added to white solid obtained. The resultant mixture was stirred and filtered to obtain solid. The solid obtained was dried to obtain 246.9 parts of triphenylsulfonium hydroxycarbonyldifluoromethanesulfonate, which is called as TPS-1.

$^1$H-NMR(dimethylsulfoxide-$d_6$, Internal Standard: tetramethylsilane): δ(ppm) 7.77-7.88 (m, 15H); 13.90 (br, 1H)

MS (ESI(+) Spectrum): M$^+$ 263.2 ($C_{18}H_{15}S^+$=263.09)

MS (ESI(−) Spectrum): M$^−$ 175.0 ($C_2HF_2O_5S^−$=174.95)

(2) Synthesis of triphenylsulfonium (2-hydroxyethoxycarbonyl)difluoromethanesulfonate

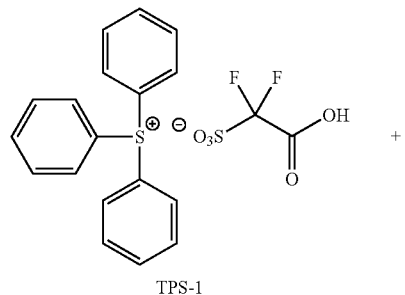

TPS-1

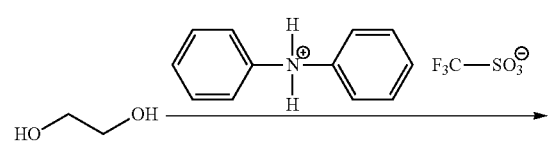

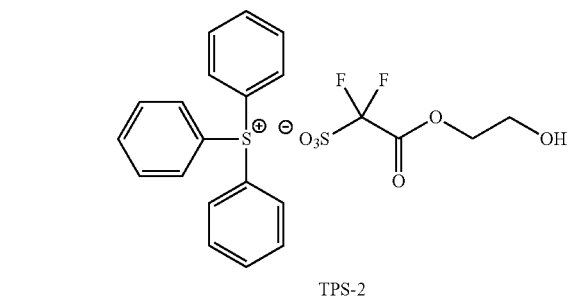

TPS-2

10.0 parts of TPS-1, 2.8 parts of ethylene glycol, 0.7 part of diphenylammonium triflate and 50 parts of monochlorobenzene were mixed and the resultant mixture was heated and stirred at 80° C. to effect reaction. After completion of the reaction, the reaction mixture was concentrated to remove monochlorobenzene and chloroform was added to the concentrate obtained. Ion-exchanged water was added thereto for extraction and an organic layer was separated. After repeatedly washing the organic layer with ion-exchange water, the organic layer obtained was concentrated. Ethyl acetate was added to the concentrate obtained and the mixture was filtered to obtain solid. The solid obtained was dried to obtain 3.7 parts of triphenylsulfonium (2-hydroxyethoxycarbonyl)difluoromethanesulfonate in the form of white solid, which is called as TPS-2.

$^1$H-NMR(dimethylsulfoxide-$d_6$, Internal Standard: tetramethylsilane): δ(ppm) 3.56-3.62 (m, 2H); 4.20 (t, 2H, J=4.9 Hz); 4.79 (t, 1H, J=5.7 Hz); 7.74-7.89 (m, 15H)

(3) Synthesis of triphenylsulfonium (2-methacryloyloxyethoxycarbonyl)difluoromethanesulfonate

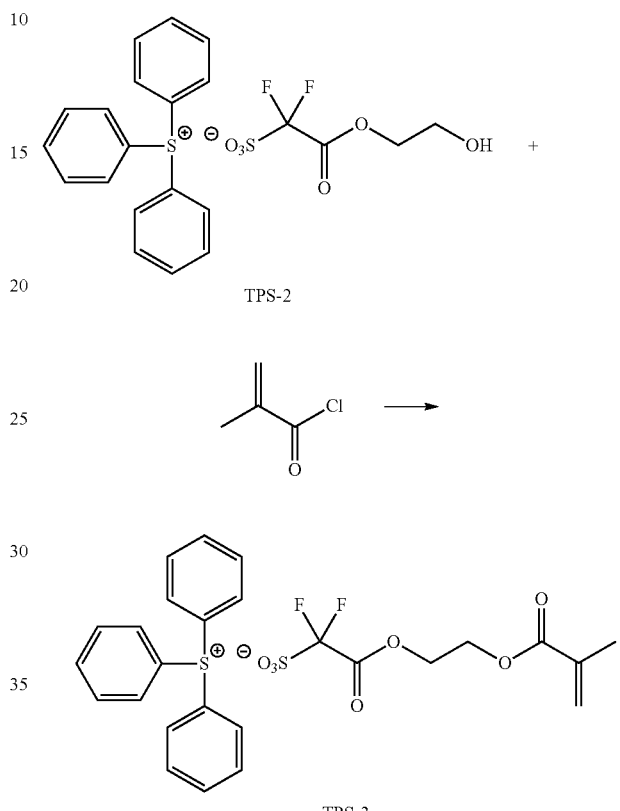

1.9 parts of TPS-2 and 0.8 part of 1-methylpyrrolidine were dissolved in 20 parts of chloroform. 0.6 Part of methacryl chloride was added dropwise to the solution in an ice bath and then the resultant mixture was gradually heated to room temperature to conduct the reaction. After completion of the reaction, the reaction mixture was diluted with 20 parts of chloroform and quenched with 21.7 parts of ion-exchanged water in an ice bath. A chloroform layer was separated and repeatedly washed with ion-exchanged water. The chloroform layer obtained was concentrated to obtain pale yellow oily matters. To the oily matters, tert-butyl methyl ether was added and the resultant mixture was stirred to conduct decantation. After repeating this operation, the residue obtained was dissolved with acetonitrile and the resultant solution was concentrated to obtain 1.3 parts of triphenylsulfonium (2-methacryloyloxyethoxycarbonyl)difluoromethansulfonate, which is called as TPS-3.

$^1$H-NMR(dimethylsulfoxide-$d_6$, Internal Standard: tetramethylsilane): δ(ppm) 1.84-1.85 (m, 3H); 4.28-4.32 (m, 2H); 4.45-4.49 (m, 2H); 5.65-5.68 (m, 1H); 6.03-6.04 (m, 1H); 7.74-7.89 (m, 15H)

MS (ESI(+) Spectrum): M$^+$ 263.2 ($C_{18}H_{15}S^+$=263.09)

MS (ESI(−) Spectrum): M$^−$ 287.0 ($C_8H_9F_2O_7S^−$=287.00)

MONOMER SYNTHESIS EXAMPLE 2 (SYNTHESIS OF TRIPHENYLSULFONIUM 1-((3-METHACRYLOYLOXYADAMANTYL)METHOXYCARBONYL)DIFLUOROMETHANESULFONATE)

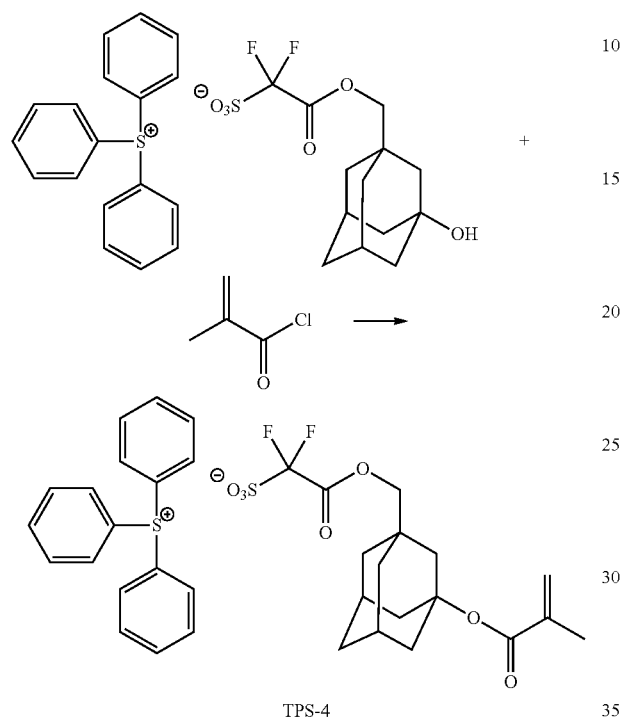

2.8 parts of triphenylsulfonium 1-((3-hydroxyadamantyl)methoxycarbonyl)difluoromethanesulfonate and 1.0 part of 1-methylpyrrolidine were dissolved in 30 parts of chloroform. A solution of 0.7 Part of methacryl chloride and 2.2 parts of chloroform was added dropwise to the solution at room temperature and then the resultant mixture was stirred at room temperature for about 3 days and at 40° C. for 7.5 hours. After cooling to room temperature, 1.0 part of 1-methylpyrrolidine was added to the reaction mixture and a solution of 0.7 part of methacryl chloride and 2.2 parts of chloroform was added thereto at room temperature. After reacting at room temperature for 14 hours, the reaction mixture was diluted with 30 parts of chloroform and quenched with 36 parts of ion-exchanged water in an ice bath. A chloroform layer was separated and repeatedly washed with ion-exchanged water. To the chloroform layer, 1.1 parts of active carbon was added and the mixture was stirred for 1 hour. The mixture was filtered and chloroform layer obtained was concentrated to obtain pale yellow oily matters. To the oily matters, tert-butyl methyl ether was added to stir and the mixture was filtered to obtain 2.8 parts of triphenylsulfonium 1-((3-methacryloyloxyadamantyl)methoxycarbonyl)difluoromethansulfonate in the form of white solid, which is called as TPS-4.

$^1$H-NMR(dimethylsulfoxide-$d_6$, Internal Standard: tetramethylsilane): δ(ppm) 1.45-2.18 (m, 17H); 3.91 (s, 2H); 5.57-5.58 (m, 1H); 5.91-5.92 (m, 1H); 7.74-7.89 (m, 15H)

MS (ESI(+) Spectrum): M$^+$ 263.1 ($C_{18}H_{15}S^+$=263.09)

MS (ESI(−) Spectrum): M$^−$ 407.1 ($C_{17}H_{21}F_2O_7S^−$=407.10)

MONOMER SYNTHESIS EXAMPLE 3

(1) Synthesis of triphenylsulfonium (8-hydroxyoctyloxycarbonyl)difluoromethanesulfonate

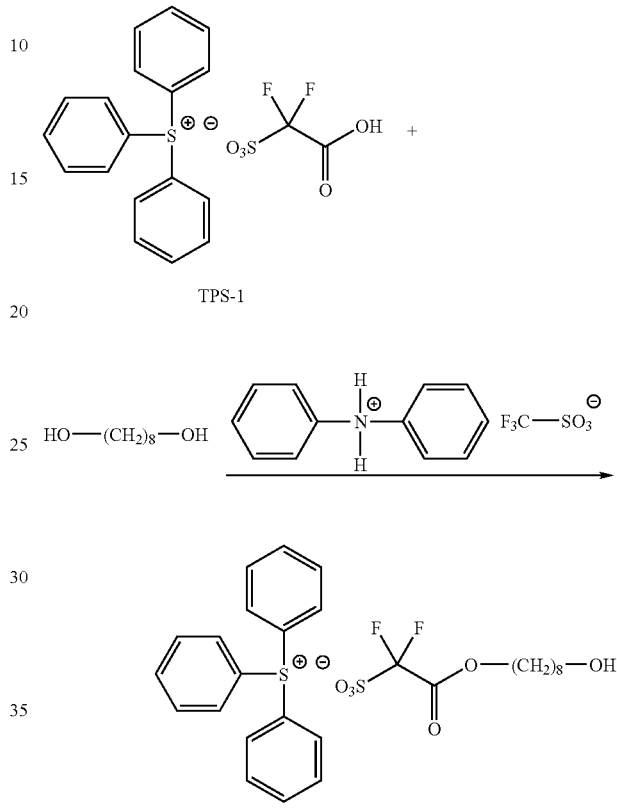

30.0 parts of TPS-1, 20.0 parts of octane-1,8-diol, 2.2 parts of diphenylammonium triflate and 210 parts of monochlorobenzene were mixed and the resultant mixture was stirred at 80° C. to effect reaction. After completion of the reaction, the reaction mixture was concentrated to remove monochlorobenzene. Chloroform was added to the concentrate obtained and ion-exchanged water was added thereto. A chloroform layer was separated. After repeatedly washing the chloroform layer with ion-exchange water, 4.2 parts of active carbon was added to the chloroform layer obtained to stir for 1 hour. The chloroform layer was filtered and concentrated to obtain pale yellow oily matters. Tetrahydrofuran was added to the oily matters to stir. The mixture was filtered and the filtrate obtained was concentrated. Ethyl acetate was added to the concentrate obtained and the resultant mixture was stirred to conduct decantation. After repeating this operation, the residue was concentrated to obtain 19.5 parts of triphenylsulfonium (8-hydroxyoctyloxycarbonyl)difluoromethanesulfonate in the form of pale yellow oil, which is called as TPS-5.

$^1$H-NMR(dimethylsulfoxide-$d_6$, Internal Standard: tetramethylsilane): δ(ppm) 1.24-1.38 (m, 10H); 1.55-1.60 (m, 2H); 3.34-3.39 (m, 2H); 4.17 (t, 2H, J=6.6 Hz); 4.31 (t, 1H, J=5.3 Hz); 7.74-7.89 (m, 15H)

(2) Synthesis of triphenylsulfonium (8-methacryloyloxyoctyloxycarbonyl)difluoromethanesulfonate

MONOMER SYNTHESIS EXAMPLE 4 (SYNTHESIS OF TRIPHENYLSULFONIUM (8-ACRYLOYLOXYOCTYLOXYCARBONYL)DIFLUOROMETHANESULFONATE)

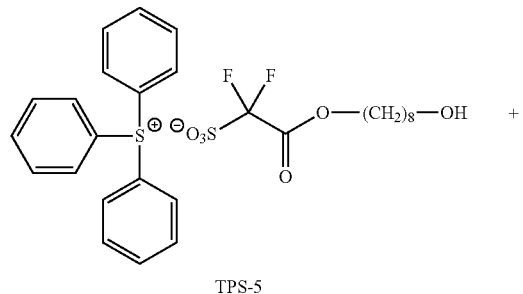

TPS-5

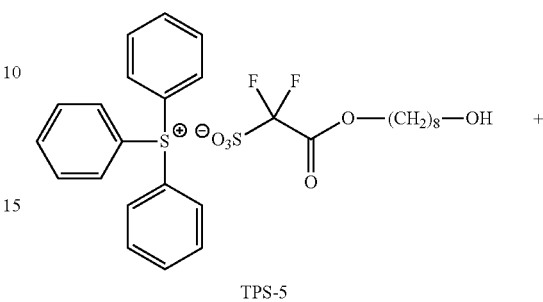

TPS-5

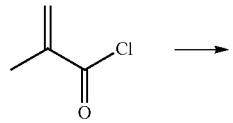

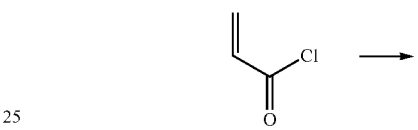

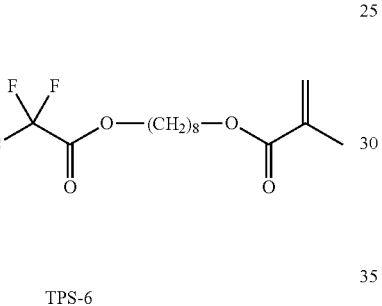

TPS-6

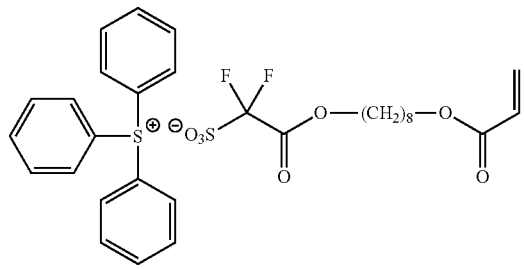

TPS-7

19.5 parts of TPS-5 and 7.3 parts of 1-methylpyrrolidine were dissolved in 206 parts of chloroform. 5.4 Parts of methacryl chloride were added dropwise to the solution in an ice bath and then the resultant mixture was gradually heated to room temperature to effect reaction. After completion of the reaction, the reaction mixture was quenched with 79.6 parts of ion-exchanged water in an ice bath. A chloroform layer was separated. After repeatedly washing the chloroform layer with ion-exchange water, 3.4 parts of active carbon was added to the chloroform layer obtained to stir for 1 hour. The mixture was filtered and the chloroform layer obtained was concentrated. To the orange oily matters obtained, tert-butyl methyl ether was added. The resultant mixture was stirred to conduct decantation. After repeating this operation, the residue was dissolved in acetonitrile and the solution was concentrated to obtain 15.3 parts of triphenylsulfonium (8-methacryloyloxyoctyloxycarbonyl)difluoromethansulfonate in the form of orange oil, which is called as TPS-6.

$^1$H-NMR(dimethylsulfoxide-d$_6$, Internal Standard: tetramethylsilane): δ(ppm) 1.22-1.27 (m, 8H); 1.56-1.59 (m, 4H); 1.86-1.87 (m, 3H); 4.07 (t, 2H, J=6.6 Hz); 5.63-5.66 (m, 1H); 5.99-6.00 (m, 1H); 7.74-7.89 (m, 15H)

MS (ESI(+) Spectrum): M$^+$ 263.0 (C$_{18}$H$_{15}$S$^+$=263.09)

MS (ESI(−) Spectrum): M$^-$ 371.2 (C$_{14}$H$_{21}$F$_2$O$_7$S$^-$=371.1)

14.0 parts of TPS-5 and 9.5 parts of 1-methylpyrrolidine were dissolved in 152 parts of chloroform. 6.7 Parts of acryl chloride were added dropwise to the solution in an ice bath and then the resultant mixture was gradually heated to room temperature to effect reaction. After completion of the reaction, the reaction mixture was quenched with 75.8 parts of ion-exchanged water in an ice bath. A chloroform layer was separated. After repeatedly washing the chloroform layer with ion-exchange water, 2.6 parts of active carbon was added to the chloroform layer obtained to stir for 1 hour. The mixture was filtered and the chloroform layer obtained was concentrated. To the tango oily matters obtained, tert-butyl methyl ether was added. The resultant mixture was stirred to conduct decantation. After repeating this operation, the residue was dissolved in acetonitrile and the solution was concentrated to obtain 11.3 parts of triphenylsulfonium (8-acryloyloxyoctyloxycarbonyl)difluoromethansulfonate in the form of tango oil, which is called as TPS-7.

$^1$H-NMR(dimethylsulfoxide-d$_6$, Internal Standard: tetramethylsilane): δ(ppm) 1.27 (bs, 8H); 1.56-1.61 (m, 4H); 4.08 (t, 2H, J=6.6 Hz); 4.17 (t, 2H, J=6.6 Hz); 5.91 (dd, 1H, J=10.0 Hz, 1.8 Hz); 6.15 (dd, 1H, J=17.3 Hz, 10.1 Hz); 6.31 (dd, 1H, J=17.3 Hz, 2.0 Hz); 7.74-7.89 (m, 15H)

MS (ESI(+) Spectrum): M$^+$ 263.2 (C$_{18}$H$_{15}$S$^+$=263.09)

MS (ESI(−) Spectrum): M$^-$ 357.0 (C$_{13}$H$_{19}$F$_2$O$_7$S$^-$=357.1)

MONOMER SYNTHESIS EXAMPLE 5 (SYNTHESIS OF TRIPHENYLSULFONIUM 1-((3-ACRYLOYLOXYADAMANTYL)METHOXYCARBONYL) DIFLUOROMETHANESULFONATE)

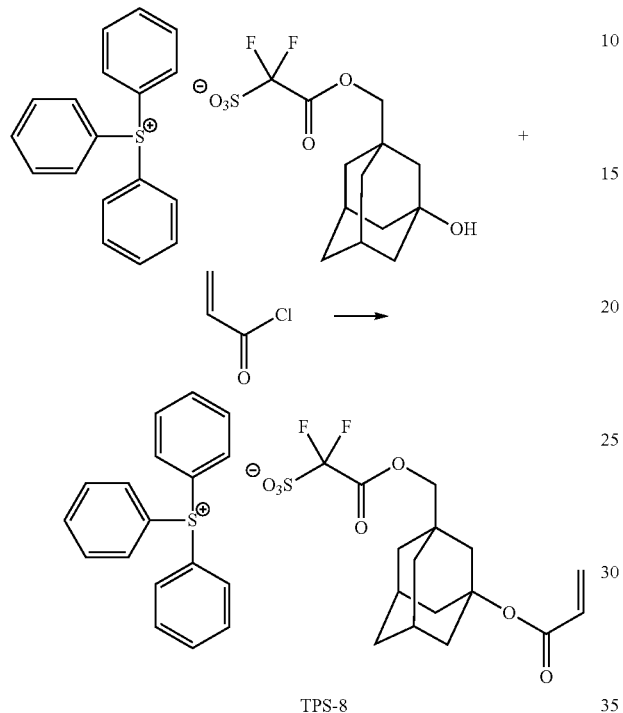

TPS-8

19.0 parts of 1-((3-hydroxyadamantyl)methoxycarbonyl)difluoromethanesulfonate and 12.1 parts of 1-methylpyrrolidine were dissolved in 200 parts of chloroform. 8.6 Parts of acryl chloride were added dropwise to the solution in an ice bath and then the resultant mixture was gradually heated to room temperature to effect reaction. The mixture was cooled again in an ice bath and 5.4 part of 1-methylpyrrolidine was added thereto and 5.7 parts of acryl chloride was added dropwise thereto to effect reaction. After completion of the reaction, the reaction mixture was quenched with 125.9 parts of ion-exchanged water in an ice bath. A chloroform layer was separated. After repeatedly washing the chloroform layer with ion-exchange water, 3.3 parts of active carbon was added to the chloroform layer obtained to stir for 1 hour. The mixture was filtered and the chloroform layer obtained was concentrated. To the tango oily matters obtained, tert-butyl methyl ether was added to stir and the resultant mixture was filtered to obtain orange solid. Ethyl acetate was added to the orange solid to stir and an ethyl acetate layer was separated. After repeating this operation, tetrahydrofuran was added to the solid to stir and a tetrahydrofuran layer was separated. Ethyl acetate layers and the tetrahydrofuran layer were mixed and concentrated. To the residue obtained, tert-butyl methyl ether was added. The resultant mixture was stirred to conduct decantation. This operation was repeated to obtain 5.0 parts of triphenylsulfonium 1-((3-acryloyloxyadamantyl)methoxycarbonyl)difluoromethansulfonate in the form of pale yellow oil, which is called as TPS-8.

$^1$H-NMR(dimethylsulfoxide-$d_6$, Internal Standard: tetramethylsilane): δ(ppm) 1.47-2.18 (m, 14H); 3.91 (s, 2H); 5.83 (dd, 1H, J=10.1 Hz, 2.1 Hz); 6.04 (dd, 1H, J=17.1 Hz, 10.0 Hz); 6.21 (dd, 1H, J=17.1 Hz, 2.0 Hz); 7.74-7.89 (m, 15H)

MS (ESI(+) Spectrum): M$^+$ 263.0 ($C_{18}H_{15}S^+$=263.09)

MS (ESI(−) Spectrum): M$^−$ 393.0 ($C_{16}H_{19}F_2O_7S^−$=393.08)

RESIN SYNTHESIS EXAMPLE 1 (SYNTHESIS OF RESIN A1)

12.07 parts of monomer A, 2.87 parts of monomer B, 2.70 parts of monomer I, 2.48 parts of monomer D and 5.35 parts of monomer TPS-3 were dissolved in 1.5 times amount of 1,4-dioxane as much as the amount of all monomers to be used (monomer ratio; monomer A: monomer B: monomer I: monomer D: monomer TPS-3=50:12.5:12.5:15:10). To the solution, 2,2'-azobisisobutyronitrile and 2,2'-azobis(2,4-dimethylvaleronitrile) were added as initiators in a ratio of 1.2 mol % and 3.6 mol % respectively based on all monomer molar amount, and the resultant mixture was heated at 73° C. for about 5 hours. The reaction solution was poured into large amount of methanol to cause precipitation. The precipitation was isolated and washed three times with large amount of methanol for purification. As a result, copolymer having a weight-average molecular weight of about 1,600 was obtained in a yield of 47%. This copolymer had the following structural units. This is called as resin A1.

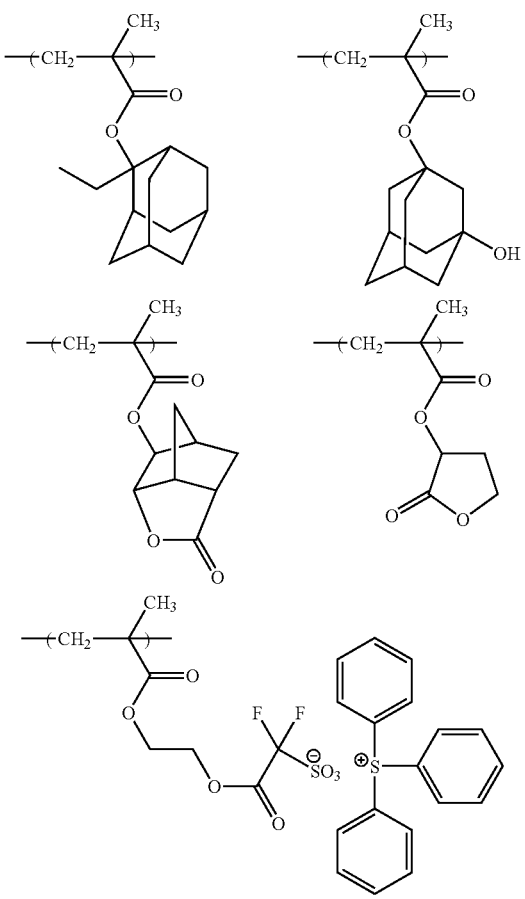

RESIN SYNTHESIS EXAMPLE 2 (SYNTHESIS OF RESIN A2)

10.00 parts of monomer A, 7.14 parts of monomer B, 3.43 parts of monomer D and 5.54 parts of monomer TPS-3 were dissolved in 1.5 times amount of 1,4-dioxane as much as the amount of all monomers to be used (monomer ratio; monomer A: monomer B: monomer D: monomer TPS-3=40:30:20:10). To the solution, 2,2'-azobisisobutyronitrile and 2,2'-azobis(2,4-dimethylvaleronitrile) were added as initiators in a ratio of 1.2 mol % and 3.6 mol % respectively based on all monomer molar amount, and the resultant mixture was heated at 73° C. for about 5 hours. The reaction solution was poured into large amount of methanol to cause precipitation. The precipitation was isolated and washed three times with large amount of methanol for purification. As a result, copolymer having a weight-average molecular weight of about 1,100 was obtained in a yield of 11%. This copolymer had the following structural units. This is called as resin A2.

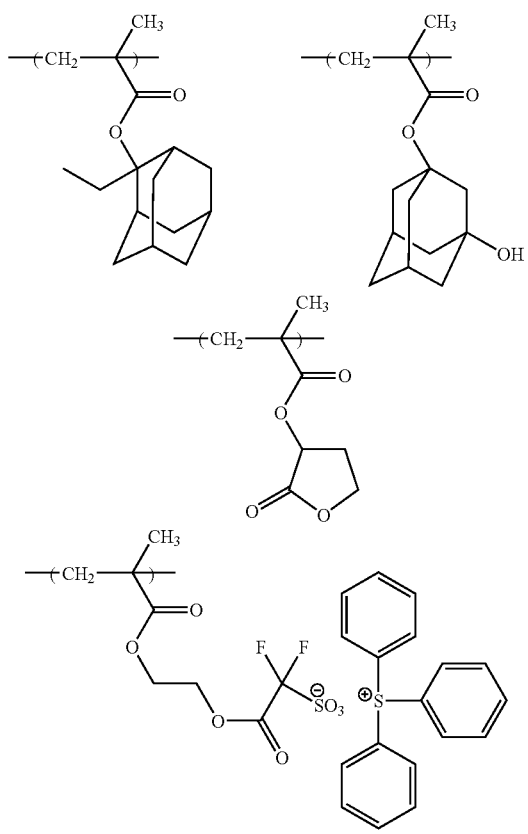

RESIN SYNTHESIS EXAMPLE 3 (SYNTHESIS OF RESIN A3)

10.00 parts of monomer A, 3.26 parts of monomer B, 7.42 parts of monomer C, 3.92 parts of monomer D and 7.72 parts of monomer TPS-4 were dissolved in 1.5 times amount of 1,4-dioxane as much as the amount of all monomers to be used (monomer ratio; monomer A: monomer B: monomer C: monomer D: monomer TPS-4=35:12:23:20:10). To the solution, 2,2'-azobisisobutyronitrile and 2,2'-azobis(2,4-dimethylvaleronitrile) were added as initiators in a ratio of 1.2 mol % and 3.6 mol % respectively based on all monomer molar amount, and the resultant mixture was heated at 73° C. for about 5 hours. The reaction solution was poured into large amount of methanol to cause precipitation. The precipitation was isolated and washed three times with large amount of methanol for purification. As a result, copolymer having a weight-average molecular weight of about 2,100 was obtained in a yield of 15%. This copolymer had the following structural units. This is called as resin A3.

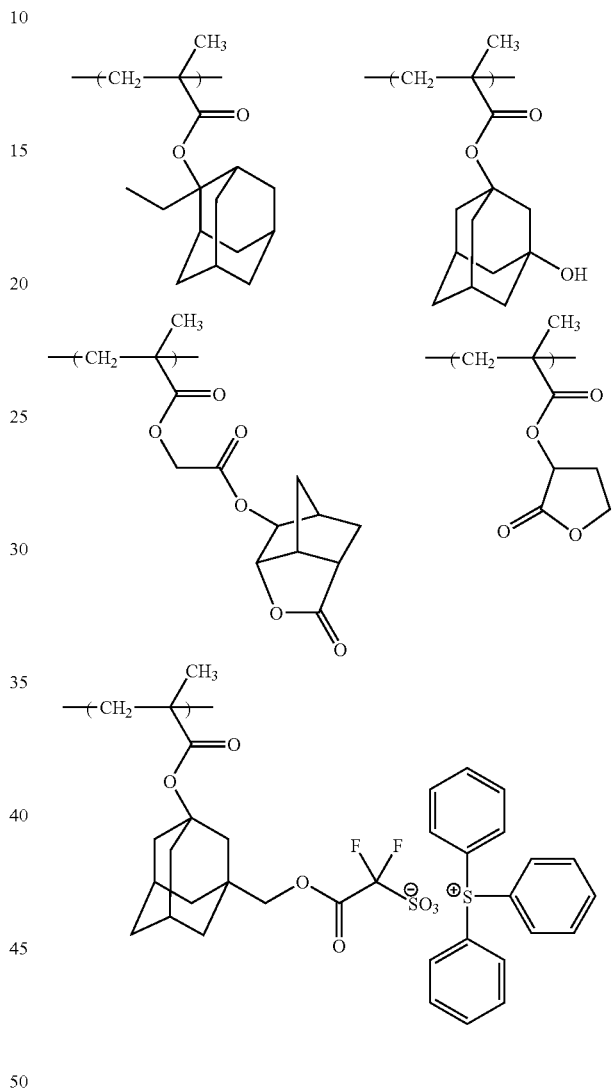

RESIN SYNTHESIS EXAMPLE 4 (SYNTHESIS OF Resin A4)

10.15 parts of monomer A, 3.31 parts of monomer B, 7.53 parts of monomer C, 3.97 parts of monomer D and 7.41 parts of monomer TPS-6 were dissolved in 1.5 times amount of 1,4-dioxane as much as the amount of all monomers to be used (monomer ratio; monomer A: monomer B: monomer C: monomer D: monomer TPS-6=35:12:23:20:10). To the solution, 2,2'-azobisisobutyronitrile and 2,2'-azobis(2,4-dimethylvaleronitrile) were added as initiators in a ratio of 1.2 mol % and 3.6 mol % respectively based on all monomer molar amount, and the resultant mixture was heated at 73° C. for about 5 hours. The reaction solution was poured into large amount of methanol to cause precipitation. The precipitation was isolated and washed three times with large amount of methanol for purification. As a result, copolymer having a weight-average molecular weight of about 1,600 was obtained in a yield of 63%. This copolymer had the following structural units. This is called as resin A4.

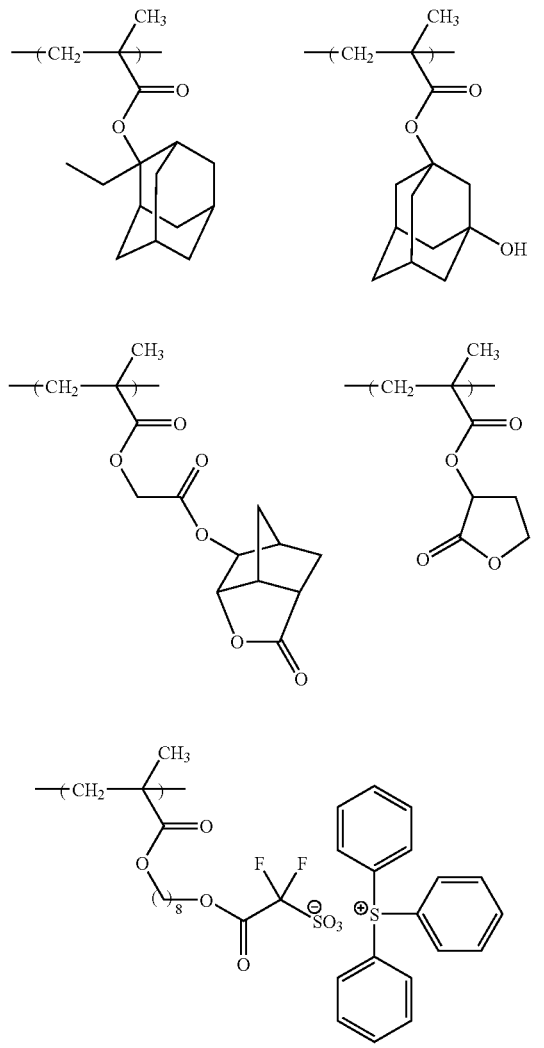

RESIN SYNTHESIS EXAMPLE 5 (SYNTHESIS OF RESIN A5)

9.00 parts of monomer A, 2.94 parts of monomer B, 6.67 parts of monomer C, 3.52 parts of monomer D and 6.43 parts of monomer TPS-7 were dissolved in 1.5 times amount of 1,4-dioxane as much as the amount of all monomers to be used (monomer ratio; monomer A: monomer B: monomer C: monomer D: monomer TPS-7=35:12:23:20:10). To the solution, 2,2'-azobisisobutyronitrile and 2,2'-azobis(2,4-dimethylvaleronitrile) were added as initiators in a ratio of 1.2 mol % and 3.6 mol % respectively based on all monomer molar amount, and the resultant mixture was heated at 73° C. for about 5 hours. The reaction solution was poured into large amount of methanol to cause precipitation. The precipitation was isolated and washed three times with large amount of methanol for purification. As a result, copolymer having a weight-average molecular weight of about 2,100 was obtained in a yield of 42%. This copolymer had the following structural units. This is called as resin A5.

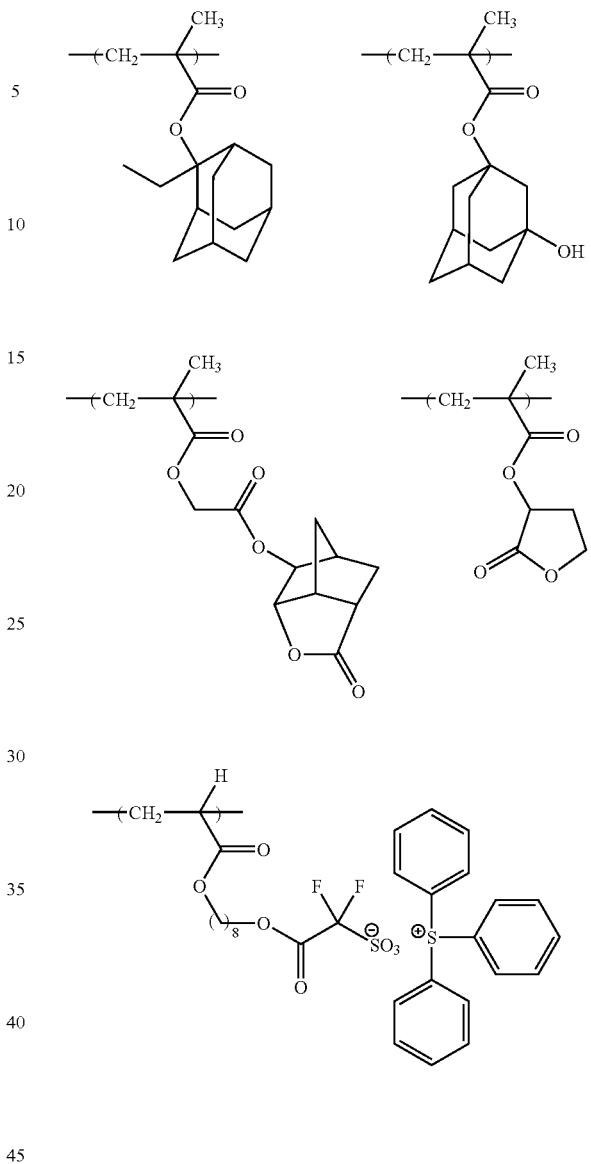

RESIN SYNTHESIS EXAMPLE 6 (SYNTHESIS OF RESIN A6)

12.40 parts of monomer E, 5.00 parts of monomer B, 4.41 parts of monomer F and 6.72 parts of monomer TPS-6 were dissolved in 1.5 times amount of 1,4-dioxane as much as the amount of all monomers to be used (monomer ratio; monomer E: monomer B: monomer F: monomer TPS-6=50:20:20:10). To the solution, 2,2'-azobisisobutyronitrile and 2,2'-azobis(2,4-dimethylvaleronitrile) were added as initiators in a ratio of 1.2 mol % and 3.6 mol % respectively based on all monomer molar amount, and the resultant mixture was heated at 73° C. for about 5 hours. The reaction solution was poured into large amount of methanol to cause precipitation. The precipitation was isolated and washed three times with large amount of methanol for purification. As a result, copolymer having a weight-average molecular weight of about 2,200 was obtained in a yield of 26%. This copolymer had the following structural units. This is called as resin A6.

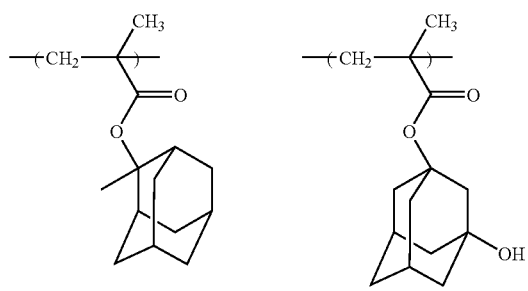
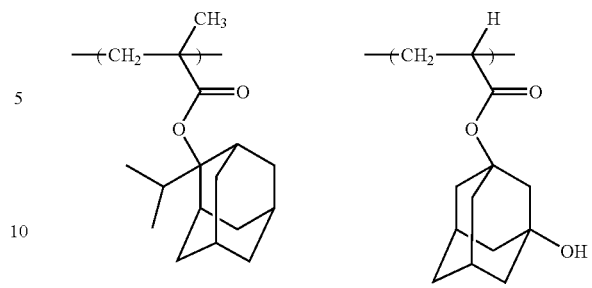
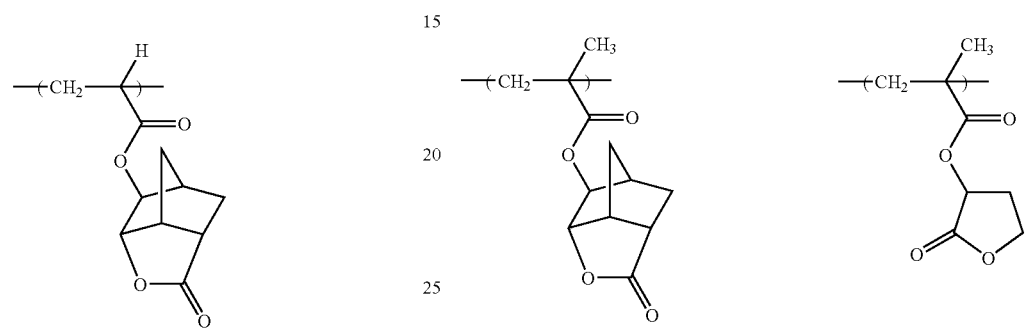
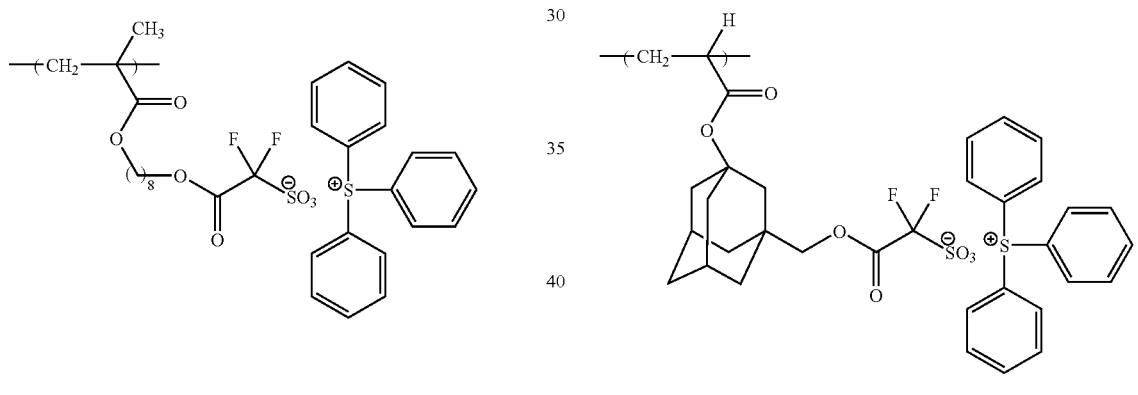

RESIN SYNTHESIS EXAMPLE 7 (SYNTHESIS OF RESIN A7)

10.00 parts of monomer G, 2.39 parts of monomer H, 4.54 parts of monomer I, 3.66 parts of monomer D and 4.24 parts of monomer TPS-8 were dissolved in 1.5 times amount of 1,4-dioxane as much as the amount of all monomers to be used (monomer ratio; monomer G: monomer H: monomer I: monomer D: monomer TPS-8=45:10:19:20:6). To the solution, 2,2'-azobisisobutyronitrile and 2,2'-azobis(2,4-dimethylvaleronitrile) were added as initiators in a ratio of 1.2 mol % and 3.6 mol % respectively based on all monomer molar amount, and the resultant mixture was heated at 73° C. for about 5 hours. The reaction solution was poured into large amount of methanol to cause precipitation. The precipitation was isolated and washed three times with large amount of methanol for purification. As a result, copolymer having a weight-average molecular weight of about 1,900 was obtained in a yield of 48%. This copolymer had the following structural units. This is called as resin A7.

RESIN SYNTHESIS EXAMPLE 8 (SYNTHESIS OF RESIN A8)

30.00 parts of monomer A, 14.27 parts of monomer B and 10.28 parts of monomer D were dissolved in 2.6 times amount of methyl isobutyl ketone as much as the amount of all monomers to be used (monomer ratio; monomer A: monomer B: monomer D=50:25:25). To the solution, 2,2'-azobisisobutyronitrile was added as an initiator in a ratio of 2 mol % based on all monomer molar amount, and the resultant mixture was heated at 87° C. for about 6 hours. The reaction solution was poured into large amount of a mixed solvent of methanol and water to cause precipitation. The precipitation was isolated and washed three times with large amount of a mixed solvent of methanol and water for purification. As a result, copolymer having a weight-average molecular weight of about 9,400 was obtained in a yield of 47%. This copolymer had the following structural units. This is called as resin A8.

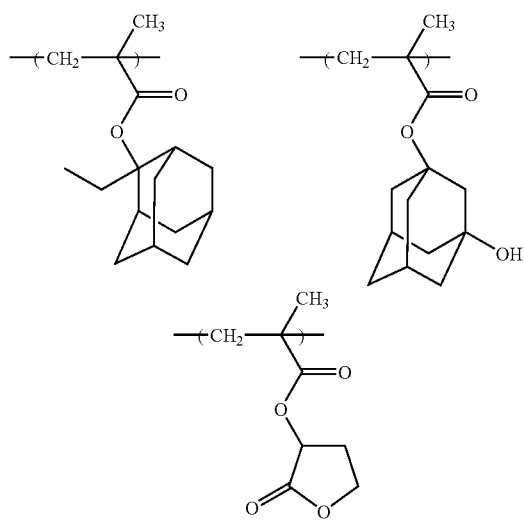

RESIN SYNTHESIS EXAMPLE 9 (SYNTHESIS OF RESIN A9)

15.00 parts of monomer A, 4.89 parts of monomer B, 3.36 parts of monomer I and 5.14 parts of monomer D were dissolved in 1.5 times amount of 1,4-dioxane as much as the amount of all monomers to be used (monomer ratio; monomer A: monomer B: monomer I: monomer D=50:12.5:12.5: 25). To the solution, 2,2'-azobisisobutyronitrile and 2,2'-azobis(2,4-dimethylvaleronitrile) were added as initiators in a ratio of 1 mol % and 3 mol % respectively based on all monomer molar amount, and the resultant mixture was heated at 77° C. for about 5 hours. The reaction solution was poured into large amount of a mixed solvent of methanol and water to cause precipitation. The precipitation was isolated and washed three times with large amount of a mixed solvent of methanol and water for purification. As a result, copolymer having a weight-average molecular weight of about 8,100 was obtained in a yield of 78%. This copolymer had the following structural units. This is called as resin A9.

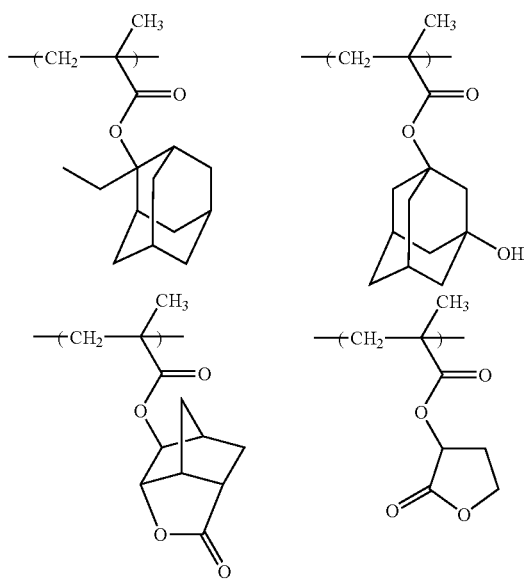

EXAMPLES 1 TO 16 AND COMPARATIVE EXAMPLE 1

The following components were mixed to give a solution, and the solution was further filtrated through a fluorine resin filter having a pore diameter of 0.2 μm, to prepare resist liquid.

Resin (kind and amount are described in Table 1)
Acid generator (kind and amount are described in Table 1)
Quencher (kind and amount are described in Table 1)
Solvent (kind and amount are described in Table 1)

TABLE 1

| Ex. No. | Resin (kind/ amount(part)) | Acid generator (kind/amount(part)) | Quencher (kind/ amount(part)) | Solvent |
|---|---|---|---|---|
| Ex. 1 | A1/1.5 A8/8.5 | B1/0.25 | Q1/0.03 | Y1 |
| Ex. 2 | A2/1.5 A8/8.5 | B1/0.25 | Q1/0.03 | Y1 |
| Ex. 3 | A3/1.5 A8/8.5 | B1/0.25 | Q1/0.03 | Y1 |
| Ex. 4 | A4/1.5 A8/8.5 | B1/0.25 | Q1/0.03 | Y1 |
| Ex. 5 | A5/1.5 A8/8.5 | B1/0.25 | Q1/0.03 | Y1 |
| Ex. 6 | A6/1.5 A8/8.5 | B1/0.25 | Q1/0.03 | Y1 |
| Ex. 7 | A6/1.5 A8/8.5 | B1/0.25 | Q1/0.03 | Y1 |
| Ex. 8 | A1/10 | B1/0.25 | Q1/0.03 | Y2 |
| Ex. 9 | A1/5 | None | None | Y3 |
| Ex. 10 | A1/3 | None | None | Y4 |
| Ex. 11 | A1/3 | None | None | Y4 |
| Ex. 12 | A1/1.5 | None | Q2/0.025 | Y4 |
| Ex. 13 | A1/1.5 | B2/0.25 | None | Y5 |
| Ex. 14 | A1/1.5 | B2/0.25 | Q2/0.025 | Y5 |
| Ex. 15 | A3/1.5 | B2/0.25 | Q2/0.07 | Y6 |
| Ex. 16 | A4/1.5 | B2/0.25 | Q2/0.07 | Y5 |
| Comp. Ex. 1 | A8/10 | B2/0.25 | Q2/0.07 | Y1 |

Silicon wafers were each coated with "ARC-95", which is an organic anti-reflective coating composition available from Nissan Chemical Industries, Ltd., and then baked under the conditions: 205° C. and 60 seconds, to form a 780 Å-thick organic anti-reflective coating. Each of the resist liquids prepared as above was spin-coated over the anti-reflective coating to give a film thickness after drying of that shown in Table 2. After application of each of the resist liquids, the silicon wafers thus coated with the respective resist liquids were each prebaked on a direct hotplate at a temperature shown in the column of "PB" in Table 2 for 60 seconds. Using an ArF excimer stepper ("FPA5000-AS3" manufactured by CANON INC., NA=0.75, 3/4 Annular), each wafer on which the respective resist film had been thus formed was exposed to a line and space pattern, while changing stepwise the exposure quantity.

After the exposure, each wafer was subjected to post-exposure baking on a hotplate at a temperature shown in the column of "PEB" in Table 2 for 60 seconds and then to paddle development with an aqueous solution of 2.38% by weight tetramethylammonium hydroxide.

TABLE 2

| Ex. No. | PB (° C.) | PEB (° C.) | Film Thickness (nm) |
|---|---|---|---|
| Ex. 1 | 100 | 115 | 120 |
| Ex. 2 | 100 | 115 | 120 |
| Ex. 3 | 100 | 115 | 120 |

TABLE 2-continued

| Ex. No. | PB (° C.) | PEB (° C.) | Film Thickness (nm) |
|---|---|---|---|
| Ex. 4 | 100 | 115 | 120 |
| Ex. 5 | 100 | 115 | 120 |
| Ex. 6 | 100 | 115 | 120 |
| Ex. 7 | 100 | 115 | 120 |
| Ex. 8 | 100 | 110 | 120 |
| Ex. 9 | 90 | 110 | 120 |
| Ex. 10 | 100 | 125 | 150 |
| Ex. 11 | 100 | 125 | 150 |
| Ex. 12 | 100 | 115 | 150 |
| Ex. 13 | 100 | 115 | 150 |
| Ex. 14 | 100 | 115 | 150 |
| Ex. 15 | 100 | 115 | 150 |
| Ex. 16 | 100 | 115 | 150 |
| Comp. Ex. 1 | 100 | 115 | 120 |

Each of a dark field pattern developed on the organic anti-reflective coating substrate after the development was observed with a scanning electron microscope, and the results of which are shown in Table 3. The term "dark field pattern", as used herein, means a pattern obtained by exposure and development through a reticle comprising a chromium base layer (light-shielding layer) and linear glass surface (light-transmitting portion) formed in the chromium base layer and aligned with each other. Thus, the dark field pattern is such that, after exposure and development, resist layer surrounding the line and space pattern remains on substrate.

Effective Sensitivity (ES): It is expressed as the amount of exposure that the line pattern (light-shielding layer) and the space pattern (light-transmitting portion) become 1:1 after exposure through 130 nm line and space pattern mask and development.

Resolution: It is expressed as the minimum size of space pattern which gave the space pattern split by the line pattern at the exposure amount of the effective sensitivity.

Pattern Profile: Wall surfaces of resist patterns after conducting a lithography process were observed by a scanning electron microscope, and when the pattern is closer to a perpendicular than that of Comparative Examples 1 or the bulge of top of pattern is shorter than that of Comparative Examples 1, its evaluation is marked by "○", when there is no change, its evaluation is marked by "Δ", and when the pattern is not closer to a perpendicular than that of Comparative Examples 1 or the bulge of top of pattern is not shorter than that of Comparative Examples 1, its evaluation is marked by "×".

Line Edge Roughness: Wall surfaces of resist patterns after conducting a lithography process were observed by a scanning electron microscope, and when smoother than comparative Example 1, its evaluation is marked by "○", when there is no change, its evaluation is marked by "Δ", and when not smoother than comparative Example 1, its evaluation is marked by "×".

TABLE 3

| Ex. No. | ES (mJ/cm$^2$) | Resolution (nm) | Pattern Profile | Line Edge Roughness |
|---|---|---|---|---|
| Ex. 1 | 10 | 115 | ○ | ○ |
| Ex. 2 | 12 | 100 | ○ | ○ |
| Ex. 3 | 12 | 125 | Δ | Δ |
| Ex. 4 | 9 | 125 | Δ | Δ |
| Ex. 5 | 12 | 110 | ○ | ○ |
| Ex. 6 | 12 | 100 | ○ | Δ |
| Ex. 7 | 10 | 115 | ○ | ○ |
| Ex. 8 | 10 | 85 | Δ | ○ |
| Ex. 9 | 22 | 85 | Δ | ○ |
| Ex. 10 | 12 | 90 | ○ | ○ |
| Ex. 11 | 21 | 90 | ○ | ○ |
| Ex. 12 | 4 | 85 | ○ | ○ |
| Ex. 13 | 13 | 85 | ○ | ○ |
| Ex. 14 | 36 | 85 | ○ | ○ |
| Ex. 15 | 44 | 85 | ○ | ○ |
| Ex. 16 | 36 | 85 | ○ | ○ |
| Comp. Ex. 1 | 6 | 115 | Δ | Δ |

Apparent from the results shown in Table 3, while keeping equivalent or greater effective sensitivity and resolution, patterns obtained by Examples 1 to 16 corresponding to the present invention show better pattern profile and line edge roughness than those of Comparative Example 1.

EXAMPLE 17 AND COMPARATIVE 2

The following components were mixed to give a solution, and the solution was further filtrated through a fluorine resin filter having a pore diameter of 0.2 μm, to prepare resist liquid.

Resin (kind and amount are described in Table 4)
Acid generator (kind and amount are described in Table 4)
Quencher (kind and amount are described in Table 4)
Solvent (kind and amount are described in Table 4)

TABLE 4

| Ex. No. | Resin (kind/amount(part)) | Acid generator (kind/amount(part)) | Quencher (kind/amount(part)) | Solvent |
|---|---|---|---|---|
| Ex. 17 | A4/2.5 A9/7.5 | None | Q2/0.03 | Y1 |
| Comp. Ex. 2 | A9/10 | B1/0.40 | Q2/0.03 | Y1 |

Each of the resist liquids prepared as above was spin-coated over Silicon wafers having diameter of 100 mm to give a film thickness after drying of 0.15 μm. After application of each of the resist liquids, the silicon wafers thus coated with the respective resist liquids were each prebaked on a direct hotplate at 100° C. for 60 seconds. Onto the silicon wafers thus coated with the respective resist liquids, 20 mL of ultra-pure water was added and the resist film on the silicon wafer was immersed in ultrapure water. At immersion time shown in Table 5, a part of ultrapure water was taken and each of water taken was analyzed with liquid-Chromatography-mass spectrometry method to give elution amounts of cation and anion components. The results were showed in Table 5.

TABLE 5

| Ex. No. | Elution Time(sec.) | Elution amount of cation component (mol/cm$^2$) | Elution amount of anion component (mol/cm$^2$) |
|---|---|---|---|
| Ex. 17 | 10 | $2.96 * 10^{-13}$ | Below detectable limit[#] |
| | 30 | $3.96 * 10^{-13}$ | Below detectable limit[#] |
| | 60 | $1.13 * 10^{-12}$ | Below detectable limit[#] |
| | 300 | $1.94 * 10^{-12}$ | Below detectable limit[#] |
| Comp. Ex. 2 | 10 | $2.91 * 10^{-12}$ | $5.74 * 10^{-12}$ |
| | 30 | $3.54 * 10^{-12}$ | $6.08 * 10^{-12}$ |
| | 60 | $6.34 * 10^{-12}$ | $9.53 * 10^{-12}$ |
| | 300 | $8.58 * 10^{-12}$ | $1.16 * 10^{-11}$ |

[#]Detectable limit: $1.00 * 10^{-13}$ mol/cm$^2$

Apparent from the results shown in Table 5, resist composition obtained in Example 17 corresponding to the present invention show lower elution amount of cation and anion components than those of Comparative Example 2.

EXAMPLES 18 TO 22

The following components were mixed to give a solution, and the solution was further filtrated through a fluorine resin filter having a pore diameter of 0.2 μm, to prepare resist liquid.

Resin (kind and amount are described in Table 6)
Acid generator (kind and amount are described in Table 6)
Quencher (kind and amount are described in Table 6)
Solvent (kind and amount are described in Table 6)

TABLE 6

| Ex. No. | Resin (kind/ amount(part)) | Acid generator (kind/amount(part)) | Quencher (kind/ amount(part)) | Solvent |
|---|---|---|---|---|
| Ex. 18 | A1/5 A9/5 | None | None | Y7 |
| Ex. 19 | A4/5 A9/5 | None | None | Y7 |
| Ex. 20 | A1/2 A9/8 | B2/0.90 | Q2/0.07 | Y8 |
| Ex. 21 | A3/2 A9/8 | B2/0.90 | Q2/0.07 | Y8 |
| Ex. 22 | A4/2 A9/8 | B2/0.90 | Q2/0.07 | Y8 |

Silicon wafers were each contacted with hexamethyldisilazane at 90° C. for 60 seconds and each of the resist liquids prepared as above was spin-coated over the silicon wafer to give a film thickness after drying of 0.12 μm. After application of each of the resist liquids, the silicon wafers thus coated with the respective resist liquids were each prebaked on a direct hotplate at a temperature shown in the column of "PB" in Table 7 for 60 seconds. Using a writing electron beam lithography system ("HL-800D" manufactured by Hitachi, Ltd., 50 KeV), each wafer on which the respective resist film had been thus formed was exposed to a line and space pattern, while changing stepwise the exposure quantity.

After the exposure, each wafer was subjected to post-exposure baking on a hotplate at a temperature shown in the column of "PEB" in Table 7 for 60 seconds and then to paddle development with an aqueous solution of 2.38% by weight tetramethylammonium hydroxide.

TABLE 7

| Ex. No. | PB (° C.) | PEB (° C.) | Film Thickness (nm) |
|---|---|---|---|
| Ex. 18 | 110 | 130 | 120 |
| Ex. 19 | 110 | 130 | 120 |
| Ex. 20 | 110 | 110 | 120 |
| Ex. 21 | 110 | 110 | 120 |
| Ex. 22 | 110 | 110 | 120 |

Each of a pattern developed on the silicon substrate after the development was observed with a scanning electron microscope, and the results of which are shown in Table 8.

Effective Sensitivity (ES): It is expressed as the amount of exposure that the line pattern (un-exposed portion) and the space pattern (EB exposed portion) become 1:1 after exposure through 0.10 μm line and space pattern mask and development.

Resolution: It is expressed as the minimum size of space pattern which gave the space pattern split by the line pattern at the exposure amount of the effective sensitivity.

Pattern Profile: when pattern profile is very good, its evaluation is marked by "○", when pattern profile is good, its evaluation is marked by "Δ", and when pattern profile is bad, its evaluation is marked by "×".

Line Edge Roughness: when line edge roughness is very good, its evaluation is marked by "○", when line edge roughness is good, its evaluation is marked by "Δ", and when line edge roughness is bad, its evaluation is marked by "×".

TABLE 8

| Ex. No. | ES (μC/cm²) | Resolution (nm) | Pattern Profile | Line Edge Roughness |
|---|---|---|---|---|
| Ex. 18 | 50 | 70 | ○ | ○ |
| Ex. 19 | 42 | 80 | ○ | ○ |
| Ex. 20 | 44 | 50 | ○ | ○ |
| Ex. 21 | 42 | 50 | ○ | ○ |
| Ex. 22 | 38 | 50 | ○ | ○ |

Apparent from the results shown in Table 8, patterns obtained by Examples 18 to 22 corresponding to the present invention show very good pattern profile and line edge roughness.

The present resin is suitably used for an acid generator for chemically amplified positive resist composition, and using the same can suppress the elution of the cation and anion components to water or a solvent having a high refractive index. The present composition provides excellent resist pattern in resolution and pattern profiles and is especially suitable for ArF excimer laser lithography, extreme ultraviolet (EUV) lithography and electron lithography.

What is claimed is:

1. A resin which generates an acid by irradiation and is a salt of an organic cation and an anionic polymer wherein the anionic polymer has no carbon-carbon unsaturated bond, and the anionic polymer comprises a structural unit represented by the formula (Ia):

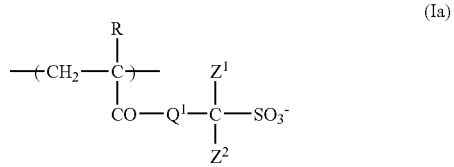

(Ia)

wherein R represents a hydrogen atom, a C1-C4 alkyl group or a C1-C4 perfluoroalkyl group, $Q^1$ represents a divalent connecting group having no carbon-carbon unsaturated bond, and $Z^1$ and $Z^2$ are the same or different and each independently represent a fluorine atom or a C1-C4 perfluoroalkyl group, or a structural unit represented by the formula (Ib):

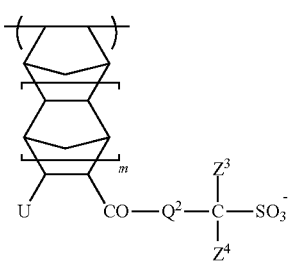

wherein $Q^2$ represents a divalent connecting group having no carbon-carbon unsaturated bond, $Z^3$ and $Z^4$ are the same or different and each independently represent a fluorine atom or a C1-C4 perfluoroalkyl group, U represents a hydrogen atom, a C1-C4 alkyl group, a monovalent polar group having at least one atom selected from the group consisting of an oxygen atom and a nitrogen atom and no carbon-carbon unsaturated bond, and m represents 0, 1 or 2, and the organic cation is a cation represented by the formula (IIa):

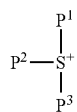

wherein $P^1$, $P^2$ and $P^3$ each independently represent a C1-C20 alkyl group which is optionally substituted with at least one selected from the group consisting of a hydroxyl group and a C1-C12 alkoxy group, or a C3-C30 cyclic hydrocarbon group which is optionally substituted with at least one selected from the group consisting of a hydroxyl group and a C1-C12 alkoxy group, a cation represented by the formula (IIb):

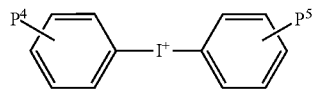

wherein $P^4$ and $P^5$ each independently represent a hydrogen atom, a hydroxyl group, a C1-C12 alkyl group or a C1-C12 alkoxy group, a cation represented by the formula (IIc):

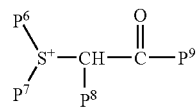

wherein $P^6$ and $P^7$ each independently represent a C1-C12 alkyl group or a C3-C12 cycloalkyl group, or $P^6$ and $P^7$ bond to form a C3-C12 divalent hydrocarbon group which forms a ring together with the adjacent $S^+$, and at least one —$CH_2$— in the divalent hydrocarbon group is optionally replaced with —CO—, —O— or —S—, $P^8$ represents a hydrogen atom, $P^9$ represents a C1-C12 alkyl group, a C3-C12 cycloalkyl group, a phenyl group, a tolyl group, a xylyl group, a naphthyl group, a methoxyphenyl group, a nitrophenyl group, a butylphenyl group, an isobutylphenyl group, a tert-butylphenyl group, a cyclohexylphenyl group, a phenylphenyl group or a 1-adamantylcarbonyloxyphenyl group, or $P^8$ and $P^9$ bond to form a divalent hydrocarbon group which forms a 2-oxocycloalkyl group together with the adjacent —CHCO—, and at least one —$CH_2$— in the divalent hydrocarbon group is optionally replaced with —CO—, —O— or —S—, or a cation represented by the formula (IId):

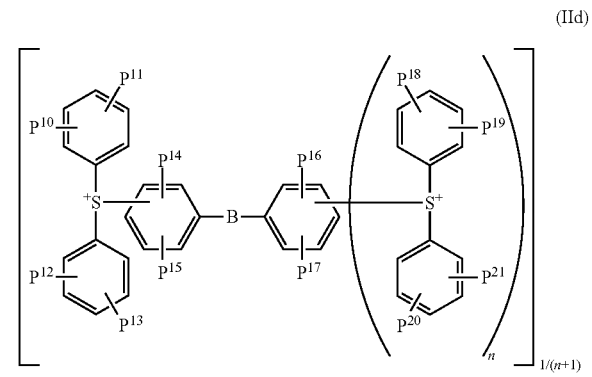

wherein $P^{10}$, $P^{11}$, $P^{12}$, $P^{13}$, $P^{14}$, $P^{15}$, $P^{16}$, $P^{17}$, $P^{18}$, $P^{19}$, $P^{20}$, and $P^{21}$ each independently represent a hydrogen atom, a hydroxyl group, a C1-C12 alkyl group or a C1-C12 alkoxy group, B represents a sulfur or oxygen atom and n represents 0 or 1.

2. The resin according to claim 1, wherein the structural unit represented by the formula (Ia) is a structural unit represented by the formula (IIIa):

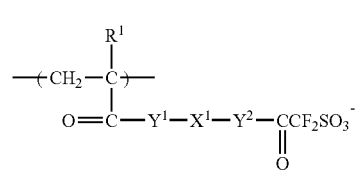

wherein $R^1$ represents a hydrogen atom, a methyl group or a trifluoromethyl group, $X^1$ represents a C1-C20 alkylene group in which at least one —$CH_2$— other than terminal —$CH_2$— may be replaced with a divalent saturated cyclic group, —CO—, —O—, —S—, and —$NR^{11}$— in which $R^{11}$ represents a hydrogen atom or a C1-C6 alkyl group, and $Y^1$ and $Y^2$ each independently represent —O—, —S— or —$NR^{12}$— in which $R^{12}$ represents a hydrogen atom or an alkyl group having 1 to 6 carbon atoms.

3. The resin according to claim 1 or 2, wherein the anionic polymer comprises a structural unit having at least one selected from the group consisting of an acid-labile group, a lactone ring and a hydroxyl group and no carbon-carbon unsaturated bond, in addition to the structural unit represented by the formula (Ia) or the structural unit represented by the formula (Ib) or the structural unit represented by the formula (IIIa).

4. The resin according to claim 1 or 2, wherein the anionic polymer comprises a structural unit having an acid-labile group, in addition to the structural unit represented by the formula (Ia) or the structural unit represented by the formula (Ib) or the structural unit represented by the formula (IIIa), and the resin is insoluble or poorly soluble in an alkali aqueous solution but becomes soluble in an alkali aqueous solution by the action of an acid generated by irradiation to the resin.

5. The resin according to claim 1, wherein the cation represented by the formula (IIa) is a cation of the formula (IIf), (IIg) or (IIh):

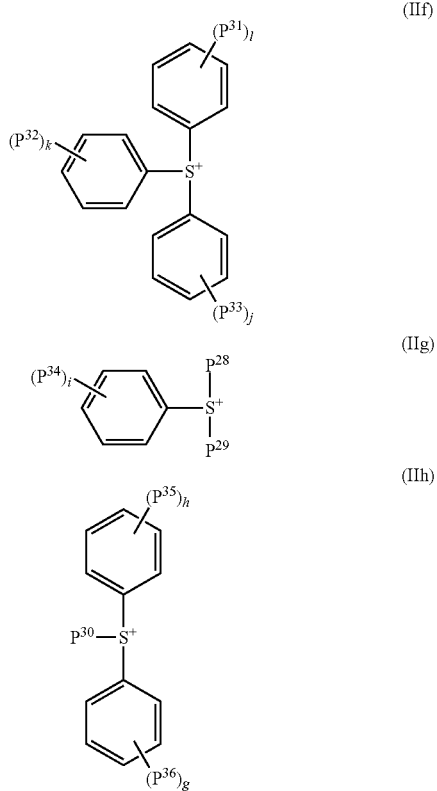

wherein $P^{28}$, $P^{29}$ and $P^{30}$ each independently represent a C1-C20 alkyl group which may be substituted with at least one selected from the group consisting of a hydroxyl group and a C1-C12 alkoxy group, or a C3-C30 cyclic hydrocarbon group except a phenyl group which may be substituted with at least one selected from the group consisting of a hydroxyl group and a C1-C12 alkoxy group; and $P^{31}$, $P^{32}$, $P^{33}$, $P^{34}$, $P^{35}$ and $P^{36}$ each independently represent a hydroxyl group, a C1-C12 alkyl group, a C1-C12 alkoxy group or a C3-C12 cyclic hydrocarbon group;

and l, k, j, i, h and g each independently represent an integer of 0 to 5.

6. The resin according to claim 1, wherein the cation represented by the formula (IIa) is a cation of the formula (IIi):

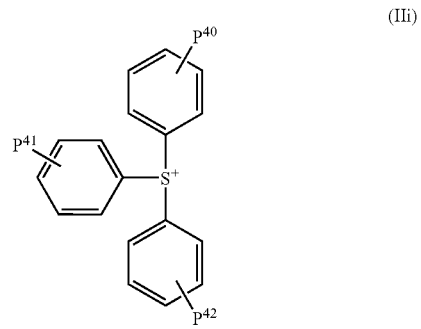

wherein $P^{40}$, $P^{41}$ and $P^{42}$ each independently represent a hydrogen atom, a hydroxyl group, a C1-C12 alkyl group or a C1-C12 alkoxy group.

7. The resin according to claim 6, wherein the cation represented by the formula (IIi) is a cation of the formula (IIj):

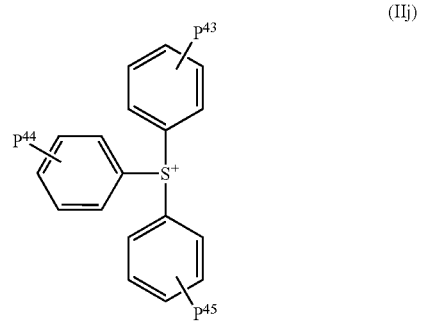

wherein $P^{43}$, $P^{44}$ and $P^{45}$ each independently represent a hydrogen atom or a C1-C4 alkyl group.

* * * * *